(12) United States Patent
Hamada

(10) Patent No.: US 6,996,302 B2
(45) Date of Patent: Feb. 7, 2006

(54) OPTICAL DEMULTIPLEXER, OPTICAL MULTI-/DEMULTIPLEXER, AND OPTICAL DEVICE

(75) Inventor: Hidenobu Hamada, Amagasaki (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 138 days.

(21) Appl. No.: 10/716,057

(22) Filed: Nov. 19, 2003

(65) Prior Publication Data

US 2004/0105677 A1    Jun. 3, 2004

(30) Foreign Application Priority Data

Nov. 29, 2002   (JP) ............................. 2002-348661

(51) Int. Cl.
*G02B 6/12* (2006.01)
*H04J 14/02* (2006.01)

(52) U.S. Cl. ............................ 385/14; 385/27; 385/31; 385/129; 385/130; 398/79; 398/81

(58) Field of Classification Search ................. 385/24, 385/31, 14, 42, 129, 130, 131, 27, 28, 49; 398/79, 81
See application file for complete search history.

(56) References Cited

U.S. PATENT DOCUMENTS

| 5,862,288 A | 1/1999 | Tayag et al. ............... 385/14 X |
| 6,266,464 B1 * | 7/2001 | Day et al. ........................ 385/37 |
| 6,580,844 B2 * | 6/2003 | Leuthold ........................ 385/15 |
| 2002/0053678 A1 * | 5/2002 | Shiba et al. .................... 257/98 |
| 2002/0154849 A1 | 10/2002 | Leuthold ........................ 385/15 |
| 2004/0105677 A1 * | 6/2004 | Hamada ......................... 398/79 |
| 2004/0247235 A1 * | 12/2004 | Jenkins ........................... 385/15 |
| 2005/0013330 A1 * | 1/2005 | Kish et al. ...................... 372/26 |

FOREIGN PATENT DOCUMENTS

| JP | 63-33707 | 2/1988 | ............... 385/14 X |
| JP | 2-244105 | 9/1990 | ............... 385/14 X |
| JP | 8-201648 | 8/1996 | ............... 385/14 X |
| JP | 11-109149 | 4/1999 | ............... 385/14 X |
| JP | 2002-286952 | 10/2002 | ............... 385/14 X |
| WO | 95/12828 | 5/1995 | ............... 385/14 X |

OTHER PUBLICATIONS

W-C, Chuang et al., "Integrated-Optic Multimode-Interference Wavelength Division Multiplexer for Optical Communication", Fiber and Integrated Optics, Taylor & Francis, London, GB, vol. 18, No. 2, 1999, pp. 93-104, XP-000905967.

(Continued)

*Primary Examiner*—Brian M. Healy
(74) *Attorney, Agent, or Firm*—Wenderoth, Lind & Ponack, L.L.P.

(57) ABSTRACT

The present invention provides an optical demultiplexer and an optical multi-/demultiplexer at low cost without reducing performance capabilities. The optical demultiplexer includes a multi-mode waveguide having such an optical path length as to cause a difference between first and second wavelengths with respect to a phase difference between zero- and first-order modes to become an integral multiple of π, an input waveguide optically connected to the input side of the multi-mode waveguide such that the optical axis thereof is offset from the center line of the multi-mode waveguide, and two output waveguides optically coupled to the multi-mode waveguide at different positions of the output side of the multi-mode waveguide. The two output waveguides are located in such a manner as to maximize the extinction ratio.

61 Claims, 29 Drawing Sheets

OTHER PUBLICATIONS

F. Rottmann, A. Neyer, W. Mevenkamp, and E. Voges, "Integrated-Optic Wavelength Multiplexers on Lithium Niobate Based on Two-Mode Interference", Journal of Lightwave Technology, vol. 6, No. 6, Jun. 1988, pp. 946-953.

M. R. Paiam, C. F. Janz, R. I. MacDonald, J. N. Broughton, "Compact Planar 980/1550-nm Wavelength Multi-Demultiplexer Based on Multimode Interference", IEEE Photonics Technology Letters, vol. 7, No. 10, Oct. 1995, pp. 1180-1183.

K. C. Lin and W. Y. Lee, "Guided-wave 1.3/1.55 $\mu$m wavelength division multiplexer based on multimode interference", IEEE Electronics Letters, vol. 32, No. 14, Jul. 1996, pp. 1259-1261.

Baojun Li, Guozheng Li, Enke Liu, Zuimin Jiang, Jie Qin, and Xun Wang, "Low-Loss 1×2 Multimode Interference Wavelength Demultiplexer in Silicon-Germanium Alloy", IEEE Photonics Technology Letters, vol. 11, No. 5, May 1999, pp. 575-577.

* cited by examiner

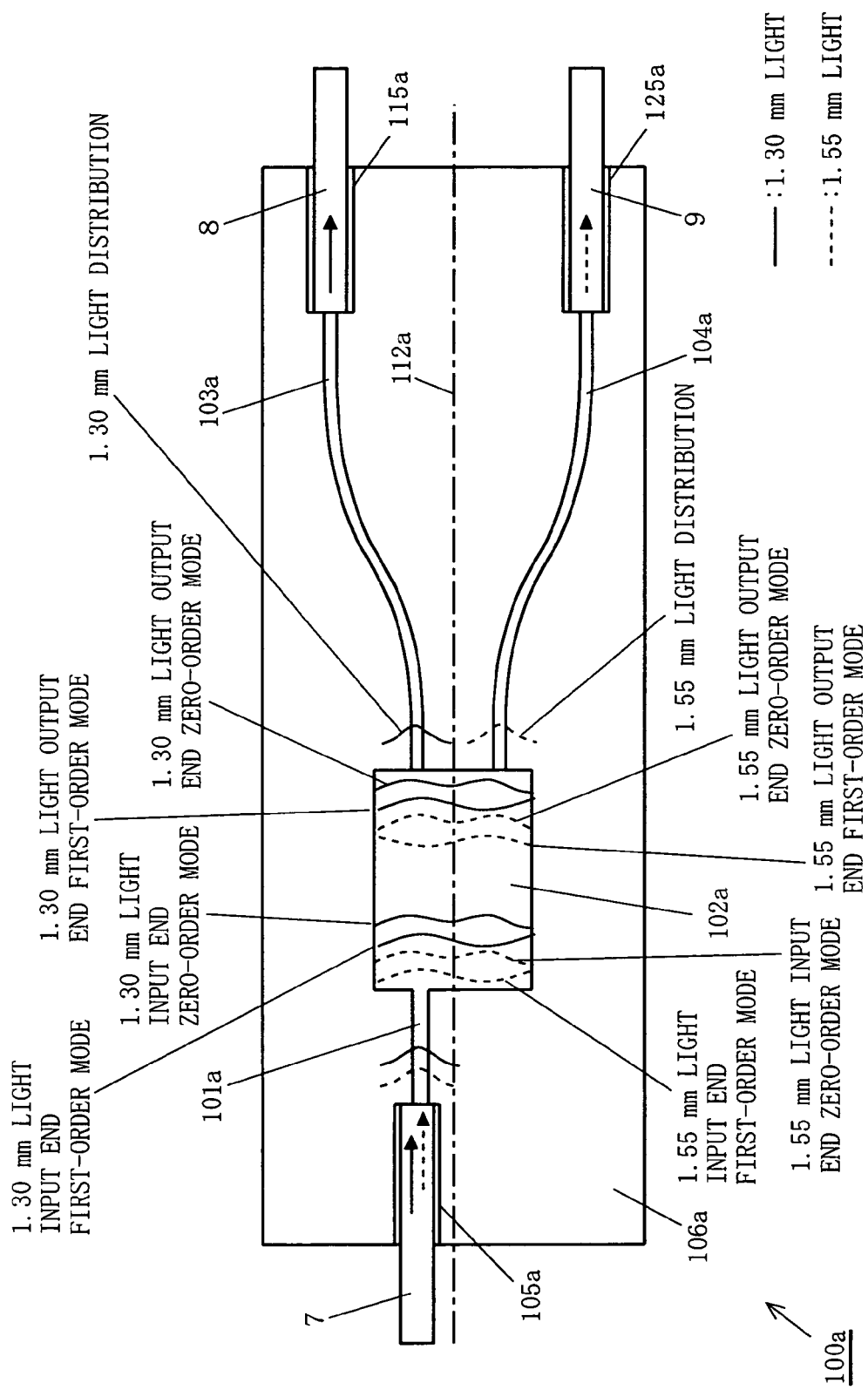

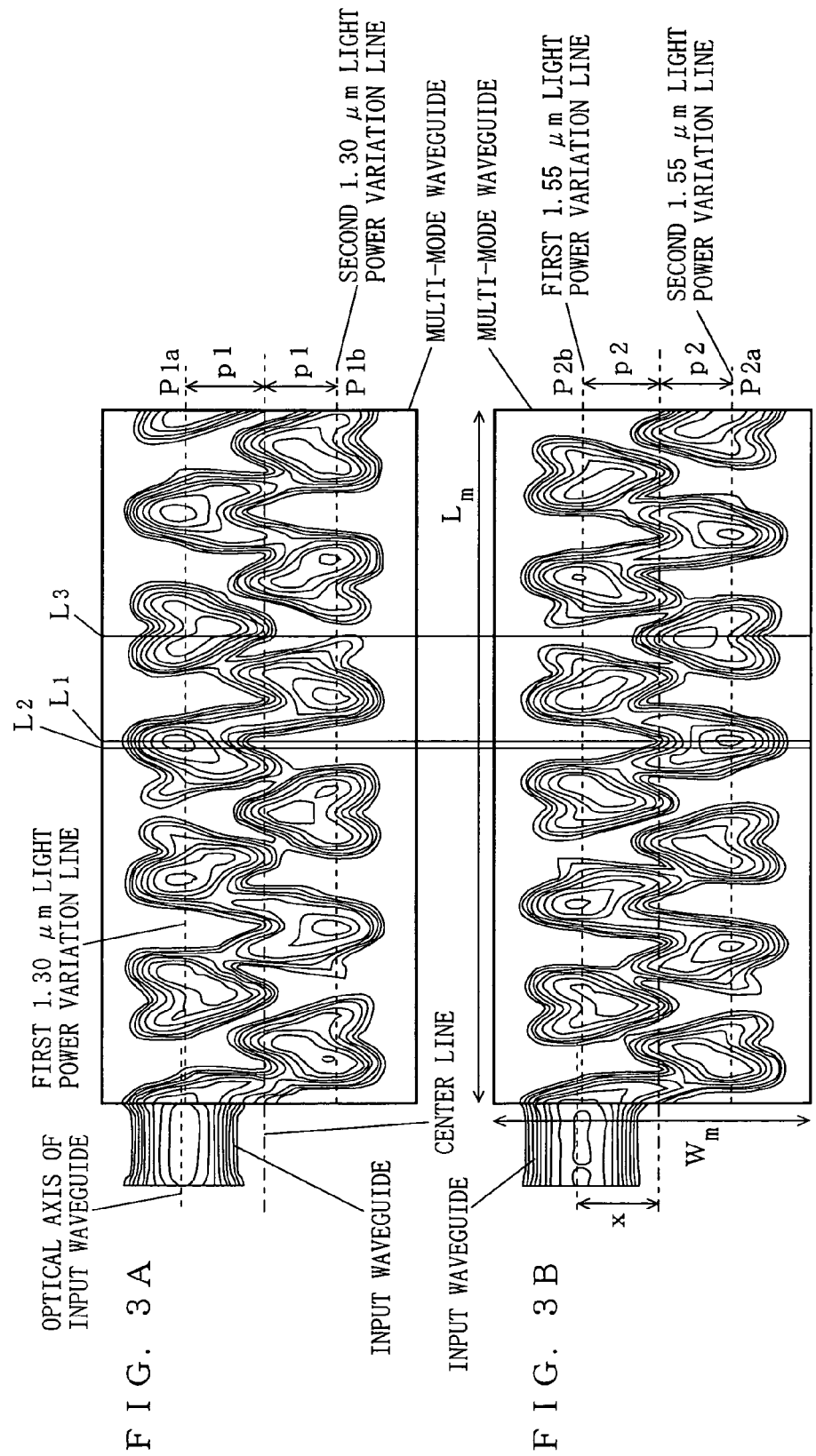

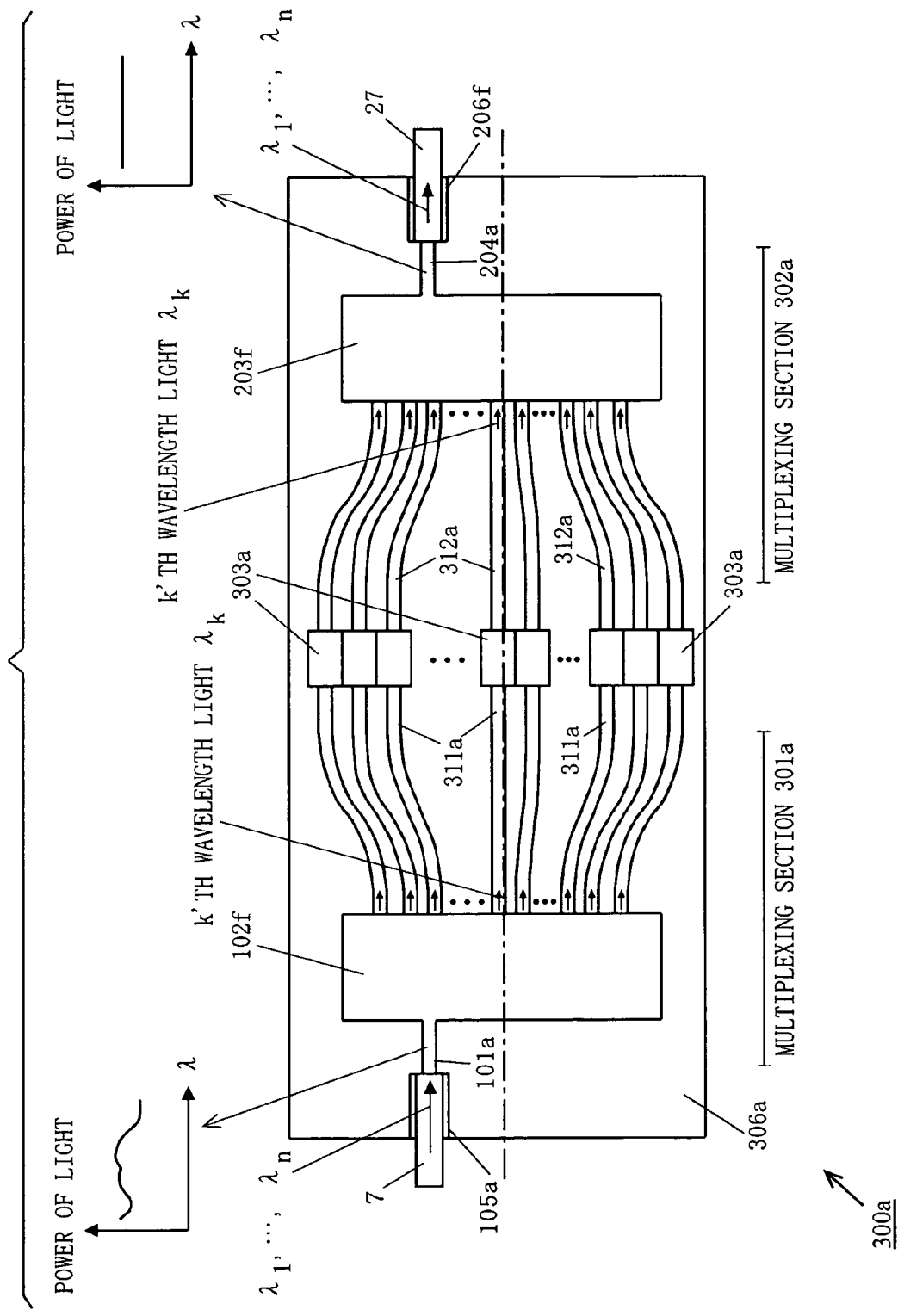
F I G. 2 3

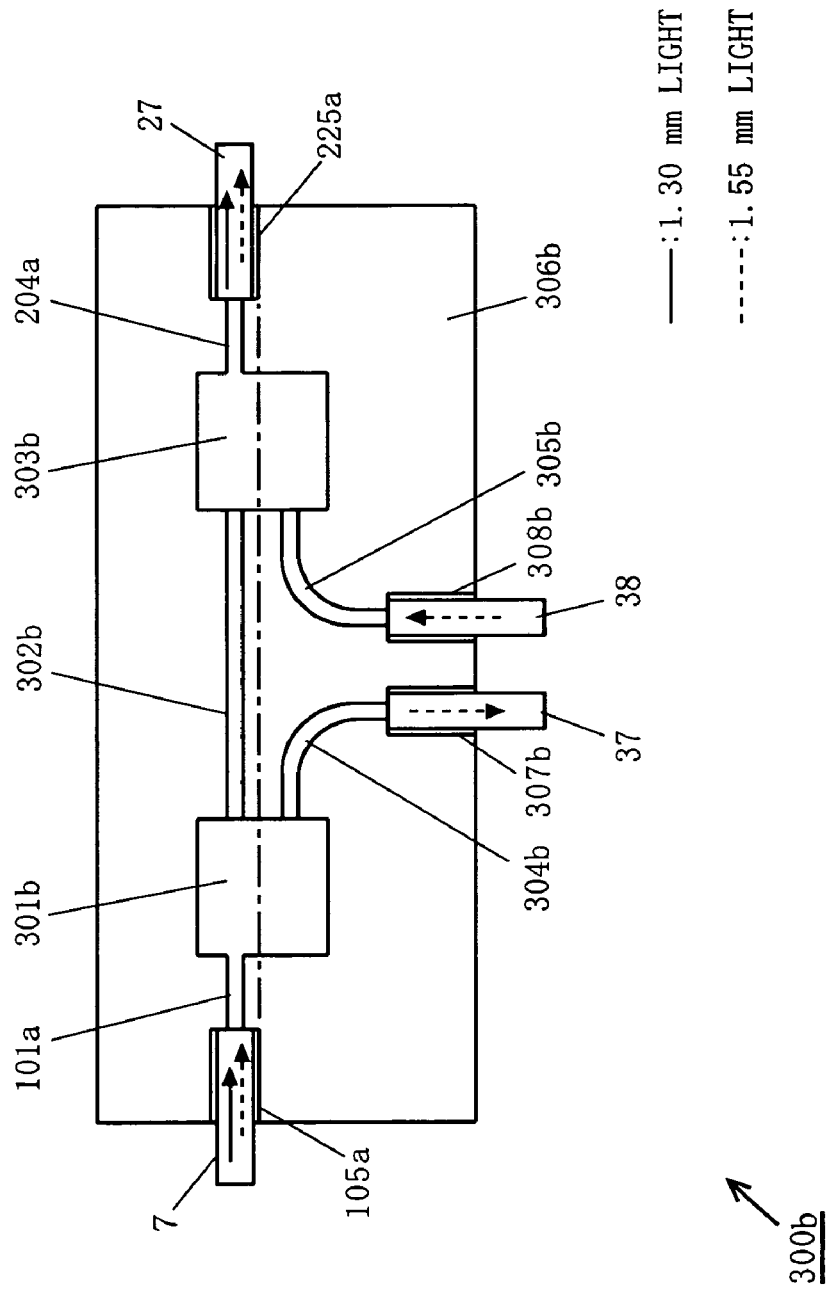

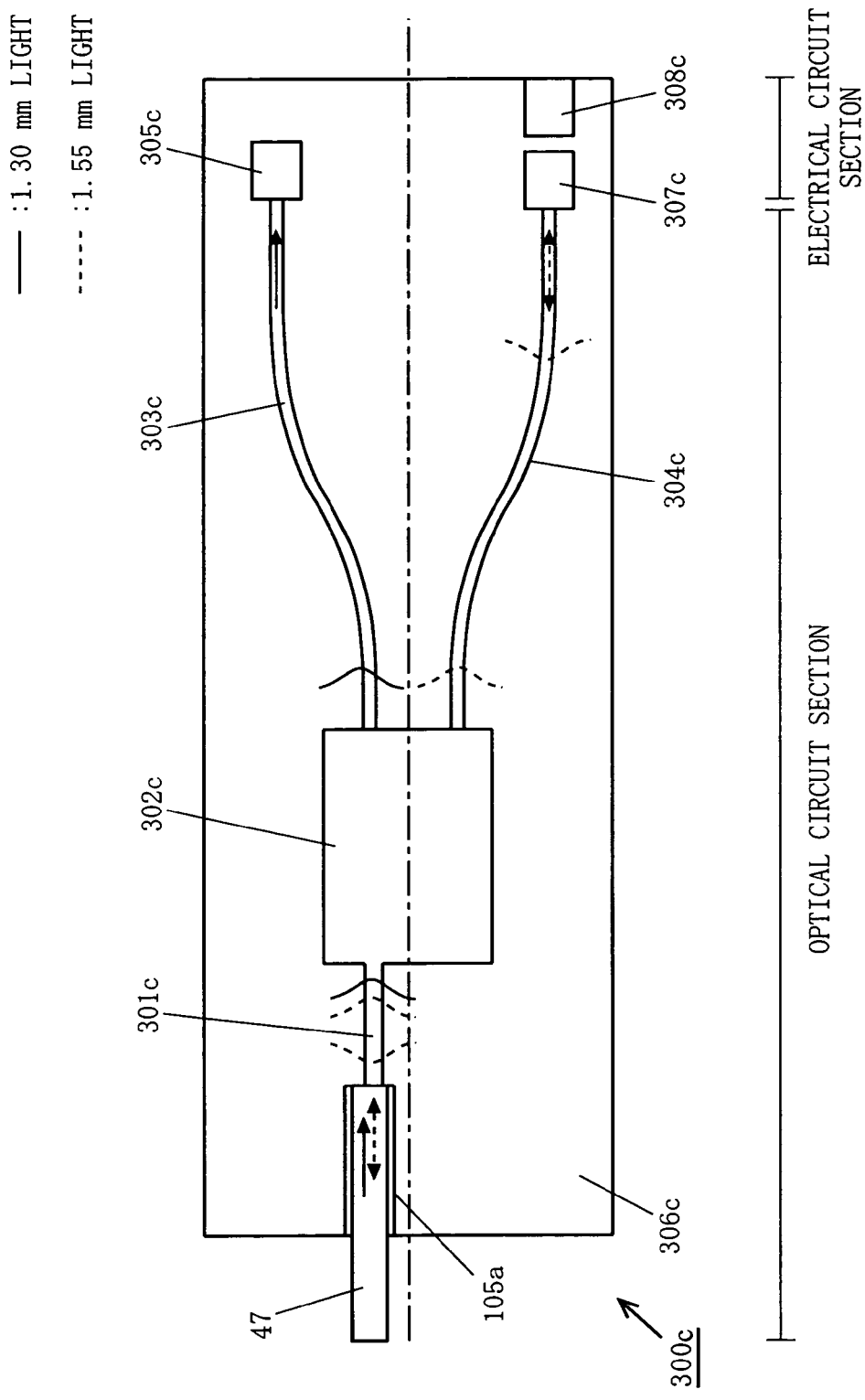

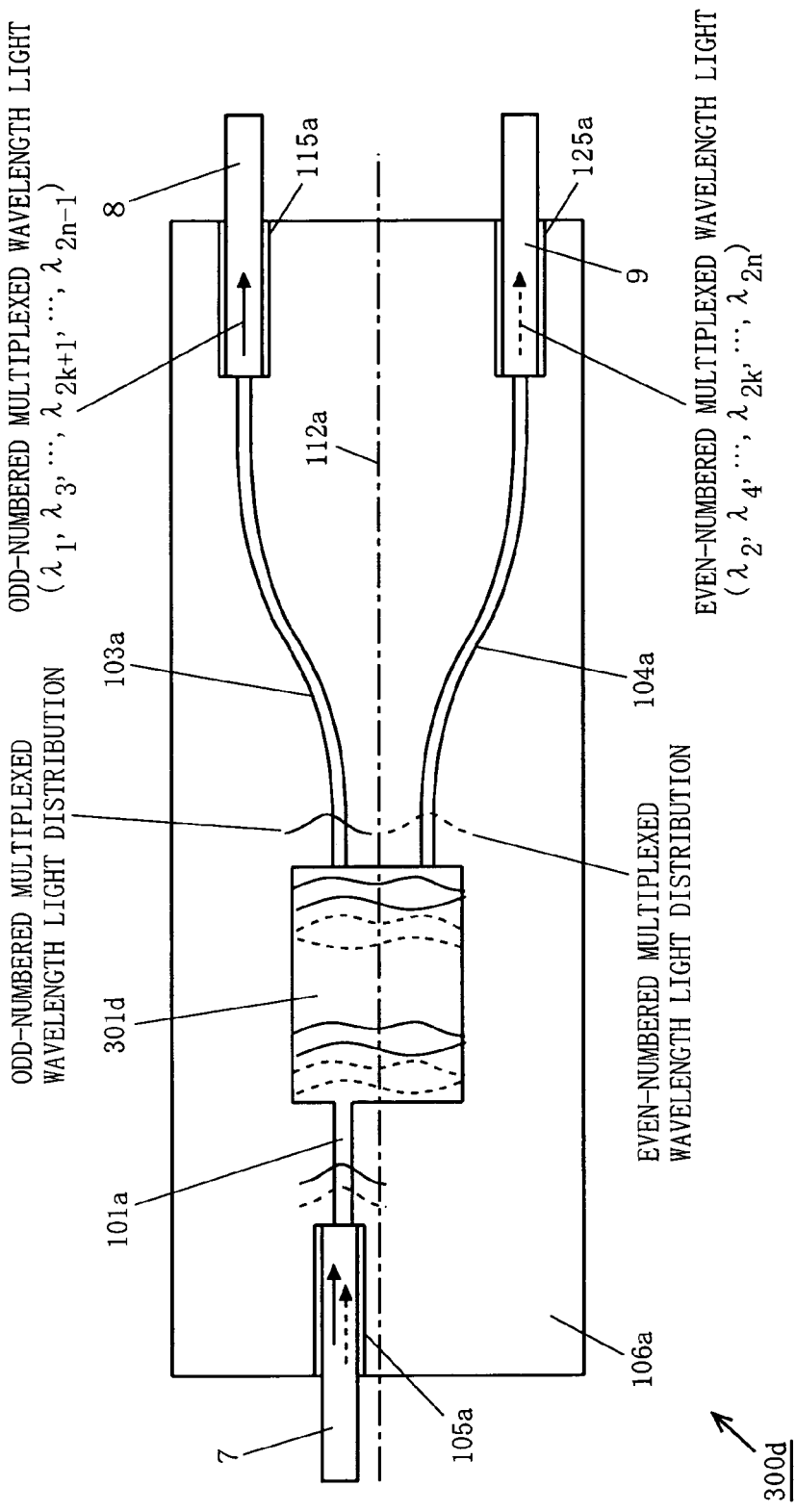

OPTICAL DEMULTIPLEXER, OPTICAL MULTI-/DEMULTIPLEXER, AND OPTICAL DEVICE

BACKGROUND OF THE INVENTION

1. Field of the Invention

The present invention relates to an optical demultiplexer and an optical multi-demultiplexer, which are used in wavelength division multiplex communication, and also relates to an optical device using the optical demultiplexer or the optical multi-demultiplexer. More specifically, the present invention relates to an optical demultiplexer and an optical multi-demultiplexer, which are based on multi-mode interference (MMI), and also relates to an optical device using such an optical demultiplexer or optical multi-demultiplexer.

2. Description of the Background Art

In the field of optical communication, in order to increase communication capacity, there is currently proposed a system called a wavelength division multiplexing (WDM) scheme for multiplexing a plurality of signals into an optical signal, such that the plurality of signals are carried on different wavelengths of the optical signal, and for transmitting the optical signal via a single optical fiber. In the WDM scheme, important roles are played by an optical demultiplexer, which separates light into components of light of different wavelengths, and an optical multiplexer, which combines light of different wavelengths.

There is a conventional waveguide WDM optical demultiplexer or multi-demultiplexer which includes: an optical waveguide having a Y-shaped branching portion formed in a silicon substrate; a groove formed across the Y-shaped branching portion; and a dielectric multilayer film filter inserted into the groove (see, for example, pp. 1–4 and FIG. 3 of Japanese Patent Laid-Open Publication No. 63-33707).

Further, there is another conventional waveguide WDM optical demultiplexer or multi-demultiplexer using an arrayed waveguide grating (AWG) which includes: two input/output ends; two two-dimensional optical waveguides; and a plurality of elongated three-dimensional optical waveguides having different lengths (see, for example, pp. 1–6 and FIG. 1 of Japanese Patent Laid-Open Publication No. 2-244105).

Furthermore, there is still another conventional optical multi-demultiplexer for separating and combining light of a plurality of wavelengths using dual-wavelength optical multi-demultiplexers connected in series each including two MMI couplers and two parallel single-mode waveguides (see, for example, pp. 2–10 and FIG. 16 of Japanese Patent Laid-Open No. 2002-286952).

Further still, there is still another conventional optical multi-demultiplexer in which an input optical waveguide for allowing light of two different wavelengths to propagate therethrough is coupled to an input end of a multi-mode interference optical coupler, and the width and length of the multi-mode interference optical coupler are set such that components of the light of two different wavelengths are focused onto different locations on an output end of the multi-mode interference optical coupler (see, for example, pp. 2–5 and FIG. 11 of Japanese Patent Laid-Open Publication No. 8-201648; F. Rottmann, A. Neyer, W. Mevenkamp, and E. Voges, "Integrated-Optic Wavelength Multiplexers on Lithium Niobate Based on Two-Mode Interference", Journal of Lightwave Technology, Vol. 6, No. 6, June 1988 (hereinafter, referred to as the "Document 1"); M. R. Paiam, C. F. Janz, R. I. MacDonald, J. N. Broughton, "Compact Planar 980/1550-nm Wavelength Multi/Demultiplexer Based on Multimode Interference", IEEE Photonics Technology Letters, Vol. 7, No. 10, October 1995 (hereinafter, referred to as the "Document 2"); K. C. Lin and W. Y. Lee, "Guided-wave 1.3/1.55 $\mu$m wavelength division multiplexer based on multimode Interference", IEEE Electronics Letters, Vol. 32, No. 14, 4 Jul. 1996 (hereinafter, referred to as the "Document 3"); and Baojun Li, Guozheng Li, Enke Liu, Zuimin Jiang, Jie Qin, and Xun Wang, "Low-Loss 1×2 Multimode Interference Wavelength Demultiplexer in Silicon-Germanium Alloy", IEEE Photonics Technology Letters, Vol. 11, No. 5, May 1999 (hereinafter, referred to as the "Document 4").

A conventional optical demultiplexer or multi-demultiplexer as disclosed in Japanese Patent Laid-Open Publication No. 63-33707 requires not only the optical waveguide but also an additional element, i.e., the dielectric multilayer film filter. Moreover, a process for producing such an optical demultiplexer or multi-demultiplexer requires subprocesses for forming the groove in the optical waveguide and inserting the dielectric multilayer film filter into the groove with high precision. The conventional optical demultiplexer or multi-demultiplexer separates or combines light by allowing light of different wavelengths to be reflected by or propagate through the dielectric multilayer film filter. Accordingly, it is necessary to provide an element for receiving separated light (e.g., a photodiode) and an element for emitting multiplexed light (e.g., a laser diode) at opposite ends of the conventional optical demultiplexer or multi-demultiplexer. Thus, in the case where the conventional optical demultiplexer or multi-demultiplexer is provided as a module including electric circuitry, it is necessary to form the electric circuitry in a position opposite to optical demultiplexer or multi-demultiplexer circuitry with respect to optical circuitry, i.e., optical waveguides, resulting in a module having a complicated structure.

Further, another conventional optical demultiplexer or multi-demultiplexer as disclosed in Japanese Patent Laid-Open Publication No. 2-244105 is developed for use in high density WDM of eight or more wavelengths, and therefore is expensive while being highly precise. Accordingly, when using such a conventional optical demultiplexer or multi-demultiplexer for low density WDM of about two to four wavelengths, the cost effectiveness is low as compared to the case of using the conventional optical demultiplexer or multi-demultiplexer as disclosed in Japanese Patent Laid-Open Publication No. 63-33707.

Furthermore, still another conventional optical multi-demultiplexer as disclosed in Japanese Patent Laid-Open Publication No. 2002-286952 is configured to separate and combine light of a plurality of wavelengths using the dual-wavelength optical multi-demultiplexer circuits connected in series each including two MMI couplers and two parallel single-mode waveguides. Accordingly, the structure of such a conventional optical multi-demultiplexer becomes complicated, and the optical path thereof is required to be lengthened, making it difficult to provide a compact optical multi-demultiplexer. Moreover, a significant loss of light is resulted from the lengthened optical path.

Further still, in still another conventional optical multi-demultiplexer of a first type, as disclosed in Document 1, a Y-like input waveguide and a Y-like output waveguide are respectively connected at the input and output sides of a multi-mode waveguide. In still another conventional optical multi-demultiplexer of a second type, as disclosed in Japanese Patent Laid-Open Publication No. 8-20164 and Documents 2 through 4, input and output waveguides are respectively connected at the input and output sides of the multimode waveguide so as to be parallel with each other. These two types of conventional optical multi-demultiplexers differ from each other in terms of shapes of the input and output waveguides. However, both types are alike in that the shape of the multi-mode waveguide is designed such that components of light of two different wavelengths are focused at (and outputted from) their respective output positions (i.e., output waveguide connecting positions as described later) determined in such a manner as to allow one wavelength to be in a bar-coupled state, while allowing the other wavelength to be in a cross-coupled state, thereby allowing the powers of the components to be maximized.

Accordingly, in both types of conventional optical multi-demultiplexers, although the power of light at each wavelength is maximized at the output position, an extinction ratio, which is a ratio between powers of light of a desired wavelength and another wavelength, is not always maximized at the output position. This is because distribution of the power of light at an output end is determined by the width of a fundamental mode at the wavelength of the light, and a position at which the power of light is maximized or minimized (hereinafter, referred to as the "maximum light power position" or "minimum light power position") moves outwards within the multi-mode waveguide as the wavelength becomes longer. That is, at each output position, the power of light of one wavelength desired to be outputted is maximized, while the power of light of the other wavelength to be cut off is not minimized, and therefore the extinction ratio is not maximized at the output positions of a conventional optical multi-demultiplexer of any one of the types described above.

The term "extinction ratio" as used herein refers to a ratio which indicates the power of light of a desired wavelength to be outputted at one output position with respect to the power of light of a wavelength to be cut off at the same output position. Note that Documents 2 through 4 present the concept of the "ratio between powers of light" (i.e., the "contrast" or the "extinction ratio") which indicates a ratio between powers of light at the same wavelength in different output positions. Thus, the concept as presented by Documents 2 through 4 is completely different from the concept of the extinction ratio as described herein which indicates the ratio between powers of light of different wavelengths in the same output position.

It depends on the use of the demultiplexer or multi-demultiplexer whether prime importance is placed on the ratio between powers of light of different wavelengths in the same output position or on the ratio between powers of light at the same wavelength in different output positions. If the demultiplexer or multi-demultiplexer is used for simply separating two wavelengths in one direction, prime importance may be placed on the ratio between powers of light at the same wavelength in different output positions as in the case of Documents 2 through 4. However, in the great majority of cases, e.g., as in the case of bidirectional communication, a transmitting device, as well as a light receiving device, is actually provided at the output side of the optical demultiplexer. Therefore, it is not practical to employ the conventional optical demultiplexer or multi-demultiplexer which is limited to the use for simply separating two wavelengths in one direction. In the case of using such a conventional optical demultiplexer or multi-demultiplexer, light of a wavelength other than a desired wavelength enters the transmitting device, leading to a malfunction or performance degradation of the conventional optical demultiplexer or multi-demultiplexer. Particularly, in the case of bidirectional WDM transmission, when light of a wavelength different from the transmitting wavelength enters a transmitting and light emitting section, such as a laser, a critical problem might be caused. Therefore, prime importance should be placed on the ratio between powers of light of different wavelengths in the same output position, rather than on the ratio between powers of light at the same wavelength in different output positions.

However, the wavelength dependence of the output position at the output end of the multi-mode waveguide is significantly influenced by the width of the multi-mode waveguide. As in the case of Japanese Patent Laid-Open Publication No. 8-201648 and Documents 2 through 4, when the width of the multi-mode waveguide is narrow, e.g., 5 $\mu$m to 12.6 $\mu$m, the width of the fundamental mode of a wavelength is also narrow. Accordingly, the distribution of the power of light at each output position on the output end is such that the maximum light power position of a desired wavelength to be outputted is close to the minimum light power position at a wavelength to be cut-off. Accordingly, a satisfactory extinction ratio can be obtained at the maximum light power position of the desired wavelength. As a result, there has been no necessity to discuss the issue concerning the position where the extinction ratio is maximized (hereinafter, referred to as the "maximum extinction ratio position").

Further, in Japanese Patent Laid-Open Publication No. 8-201648 and Documents 1 through 4, it is not assumed that light of a wavelength different from the transmitting wavelength enters a transmitting and light emitting section, such as a laser, of a WDM transmitting/receiving module, and therefore the extinction ratio is not considered as an issue of further improvement. However, in the case where the width of the multi-mode waveguide is equal to or more than about 20 $\mu$m, there appears a remarkable difference between the maximum light power position of the desired wavelength and the maximum extinction ratio position, and therefore the issue concerning the maximum extinction ratio position can not be ignored.

SUMMARY OF THE INVENTION

Therefore, an object of the present invention is to provide: an optical demultiplexer, an optical multiplexer, and an optical multi-demultiplexer, which can be simply structured for use in low density WDM of about two to four wavelengths and can be provided at low cost; and an optical device using such an optical demultiplexer and such an optical multiplexer, or using such an multi-demultiplexer.

Further, another object of the present invention is to provide: an optical demultiplexer, an optical multiplexer, and an optical multi-demultiplexer, which can extract only a desired wavelength and cut off other wavelengths; and an optical device using such an optical demultiplexer and such an optical multiplexer, or using such a multi-demultiplexer.

The present invention has the following features to attain the objects mentioned above.

A first aspect of the present invention is directed to an optical demultiplexer for separating input wavelength-multiplexed light of first and second wavelengths. The optical demultiplexer includes a multi-mode propagation portion, an input portion, and first and second output portions. The multi-mode propagation portion allows multi-mode propagation of light of the first and second wavelengths, and separates powers of the light of first and second wavelengths by causing internal mode interference. The input portion inputs light to the multi-mode propagation portion from such an input position as to cause separation of the powers of light in the multi-mode propagation portion. The first and second output portions output the light of first and second wavelengths from the multi-mode propagation portion via such positions on an output end face as to cause separation of the powers of the light of first and second wavelengths and maximize an extinction ratio indicating the size of the power of light of a desired wavelength with respect to the power of light of a wavelength to be cut off.

When a value of the extinction ratio corresponds to ten times the natural logarithm of the quotient obtained by dividing the power of light of the desired wavelength by the power of light of the wavelength to be cut off, the extinction ratio is equal to or more than 30 dB at a position where the extinction ratio is maximized. Preferably, a refractive index of the multi-mode propagation portion is less than or equal to 2.0. More specifically, the first output portion is located in a position where the power of light of the second wavelength is minimized, and the second output portion is located in a position where the power of light of the first wavelength is minimized.

In the case where a phase difference between zero- and first-order modes of the first wavelength is $\theta_1$ and a phase difference between zero- and first-order modes of the second wavelength is $\theta_2$, it is preferred that the multi-mode propagation portion has such an optical path length in a propagation direction as to cause a difference between $\theta_1$ and $\theta_2$ to be in the range of $m\pi \pm \pi/2$, where m is a natural integer.

Alternatively, the multi-mode propagation portion may have such an optical path length in the propagation direction as to cause at least one of the powers of the light of first and second wavelengths to be minimized or maximized at an output end of each of the first and second wavelengths. Alternatively still, the multi-mode propagation portion may have such an optical path length in the propagation direction as to cause the difference between $\theta_1$ and $\theta_2$ to become an integral multiple of $\pi$. Alternatively still, the multi-mode propagation portion may have such an optical path length in the propagation direction as to cause the powers of the light of first and second wavelengths to become minimum or maximum values inverted with respect to each other at the output end of each of the first and second wavelengths. Alternatively still, the multi-mode propagation portion may have such an optical path length in the propagation direction as to cause the extinction ratio at the output end of each of the first and second wavelengths to become equal to or more than 30 dB. Alternatively still, the multi-mode propagation portion may have such an optical path length in the propagation direction as to cause the difference between $\theta_1$ and $\theta_2$ to become an integral multiple of $\pi$.

In one embodiment, the multi-mode propagation portion is formed by one multi-mode waveguide, the center line of the multi-mode waveguide corresponds to an optical axis of the multi-mode propagation portion, and the input position is offset from the optical axis. Alternatively, the multi-mode propagation portion may be formed by two single-mode waveguides, an axis of symmetry between the two multi-mode waveguides corresponds to an optical axis of the multi-mode propagation portion, and the input position is an input end of either of the two single-mode waveguides.

In one embodiment, the multi-mode propagation portion includes: a first optical path length portion having an optical path length in a propagation direction such that, in the case where a phase difference between zero- and first-order modes of the first wavelength is $\theta_1$ and a phase difference between zero- and first-order modes of the second wavelength is $\theta_2$, a difference between $\theta_1$ and $\theta_2$ is in the range of $m\pi \pm \pi/2$, where m is a natural integer; and a second optical path length portion having an optical path length in the propagation direction such that the difference between $\theta_1$ and $\theta_2$ is in the range of $m\pi \pm \pi/2$. In this case, light of the first wavelength is outputted from the first optical path length portion, light of the second wavelength is outputted from the second optical path length portion, and the first and second optical path length portions have different optical path lengths. Preferably, the first optical path length portion has such an optical path length in the propagation direction as to cause the difference between $\theta_1$ and $\theta_2$ to become an integral multiple of $\pi$, and the second optical path length portion has such an optical path length in the propagation direction as to cause the difference between $\theta_1$ and $\theta_2$ to become an integral multiple of $\pi$. Further, the multi-mode propagation portion may be formed by one multi-mode waveguide, the center line of the multi-mode waveguide may correspond to an optical axis of the multi-mode propagation portion, and the input position may be offset from the optical axis. Alternatively, the multi-mode propagation portion may be formed by two single-mode waveguides having different lengths, and an axis of symmetry between the two multi-mode waveguides may correspond to an optical axis of the multi-mode propagation portion.

In one embodiment, the multi-mode propagation portion has an optical path length in a propagation direction such that, in the case where a phase difference between zero- and first-order modes of the first wavelength is $\theta_1$ and a phase difference between zero- and first-order modes of the second wavelength is $\theta_2$, a difference between $\theta_1$ and $\theta_2$ is in the range of $m\pi \pm \pi/2$, where m is a natural integer, and the multi-mode propagation portion includes: a first multi-mode region capable of transmitting therethrough only multi-mode light of a shorter one of the first and second wavelengths; and a second multi-mode region capable of transmitting therethrough multi-mode light of the first and second wavelengths, the second multi-mode region being present downstream in a traveling direction of light from the first multi-mode region. In this case, the multi-mode propagation portion may have such an optical path length in the propagation direction as to cause the difference between $\theta_1$ and $\theta_2$ to become an integral multiple of $\pi$. Further, the multi-mode propagation portion may be formed by one multi-mode waveguide, and the first and second multi-mode regions may be formed by cutting out a portion having a rectangular solid-shape from the input side of the multi-mode waveguide, such that the first multi-mode region becomes partially narrower than the second multi-mode region. Furthermore, the input position may be offset from the optical axes of the first and second multi-mode regions.

Alternatively, the first multi-mode region may be formed by two former-stage single-mode waveguides used as a former-stage multi-mode region, the second multi-mode region may be formed by two latter-stage single-mode waveguides used as a latter-stage multi-mode region, and a space between the former-stage single-mode waveguides may be narrower than a space between the latter-stage single-mode waveguides.

Further, the centers of the axes of the first and second multi-mode regions may be offset from each other.

In one embodiment, in the case where a phase difference between zero- and first-order modes of the first wavelength is $\theta_1$ and a phase difference between zero- and first-order modes of the second wavelength is $\theta_2$, the multi-mode propagation portion may have such an optical path length in a propagation direction as to cause a difference between $\theta_1$ and $\theta_2$ to be in the range of $m\pi \pm \pi/2$, where m is a natural integer, and the width of the multi-mode propagation portion may vary along a direction of an optical axis of the optical demultiplexer. In this case, the multi-mode propagation portion may have such an optical path length in the propagation direction as to cause the difference between $\theta_1$ and $\theta_2$ to become an integral multiple of $\pi$. Further, the multi-mode propagation portion may be formed by one multi-mode waveguide, and the center line of the multi-mode waveguide may correspond to an optical axis of the multi-mode propagation portion. Alternatively, the multi-mode propagation portion may be formed by two single-mode waveguides, and an axis of symmetry between the two multi-mode waveguides may correspond to an optical axis of the multi-mode propagation portion.

In one embodiment, the optical demultiplexer may further include: a first latter-stage multi-mode propagation portion provided at an output end of the first output portion, the first latter-stage multi-mode propagation portion having the same characteristic as that of the multi-mode propagation portion; a second latter-stage multi-mode propagation portion provided at an output end of the second output portion, the second latter-stage multi-mode propagation portion having the same characteristic as that of the multi-mode propagation portion; a first latter-stage output portion for outputting light of the first wavelength to be separated by the first latter-stage multi-mode propagation portion; and a second latter-stage output portion for outputting light of the second wavelength to be separated by the second latter-stage multi-mode propagation portion.

For example, the optical demultiplexer may further include an external electric field control section for applying an external electric field to the multi-mode propagation portion, and the multi-mode propagation portion is formed of an electro-optic material. In this case, the external electric field control section may include: a pair of electrodes provided on a surface of the multi-mode propagation portion; and an external voltage control section for controlling a voltage between the pair of electrodes.

For example, the optical demultiplexer may further include an external temperature control section for controlling the temperature of the multi-mode propagation portion, and the multi-mode propagation portion may be formed of a thermo-optic material having a temperature dependence. In this case, the external temperature control section may include: a heat conducting member provided on a surface of the multi-mode propagation portion; and a temperature control member for controlling the temperature of the multi-mode propagation portion by heating and/or cooling the heat conducting portion. Further, the external temperature control section may include: a Peltier device provided on a surface of the multi-mode propagation portion; and a temperature control member for controlling the temperature of the multi-mode propagation portion by applying a current to the Peltier device.

Preferably, the input portion may be a waveguide optically coupled to the input side of the multi-mode propagation portion, and each of the first and second output portions may be a waveguide optically coupled to the output side of the multi-mode propagation portion.

A second aspect of the present invention is directed to an optical device for transmitting/receiving light of first and second wavelengths. The optical device includes: a multi-mode propagation portion, an input portion, first and second output portions, a first optical element, and a second optical element. The multi-mode propagation portion allows multi-mode propagation of light of the first and second wavelengths and separates powers of the light of first and second wavelengths by causing internal mode interference. The input portion inputs light to the multi-mode propagation portion from such an input position as to cause separation of the powers of light in the multi-mode propagation portion. The first and second output portions output the light of first and second wavelengths from the multi-mode propagation portion via such positions on an output end face as to cause separation of the powers of the light of first and second wavelengths and maximize an extinction ratio indicating the size of the power of light of a desired wavelength with respect to the power of light of a wavelength to be cut off. The first optical element receives and/or emits light of the first wavelength, the first optical element being provided at an output end of the first output portion. The second optical element receives and/or emits light of the second wavelength, the second optical element being provided at an output end of the second output portion.

In one embodiment, the second optical element includes: a light emitting portion for emitting light of the second wavelength; and a light receiving portion for receiving light of the second wavelength.

A third aspect of the present invention is directed to an optical demultiplexer for separating input wavelength-multiplexed light of n types of different wavelengths, where n is a natural integer. The optical demultiplexer includes: a multi-mode propagation portion, an input portion, and n output portions. The multi-mode propagation portion allows multi-mode propagation of the input wavelength-multiplexed light of n types of different wavelengths and separates powers of the light of n types of different wavelengths by causing internal mode interference. The input portion inputs light to the multi-mode propagation portion from such an input position as to cause separation of the powers of light in the multi-mode propagation portion. The n output portions output the light of n types of different wavelengths from the multi-mode propagation portion via such positions on an output end face as to cause separation of the powers of the light of n types of different wavelengths and maximize an extinction ratio indicating the size of the power of light of a desired wavelength with respect to the power of light of a wavelength to be cut off.

In the case where $i=0,1,\ldots,n$ and $k=1, 2, \ldots, n-1$, when a phase difference between i'th- and i+1'th-order modes of a k'th wavelength $\lambda_k$ is $\theta_k$ and a phase difference between i'th- and i+1'th-order modes of a k+1'th wavelength $\lambda_{k+1}$ is $\theta_{k+1}$, it is preferred that the multi-mode propagation portion has such an optical path length in a propagation direction as to cause a difference between $\theta_k$ and $\theta_{k+1}$ as to be in the range of $m\pi\pm\pi/2$, where m is a natural integer.

In one embodiment, the multi-mode propagation portion may be formed by one multi-mode waveguide, the center line of the multi-mode waveguide may correspond to an optical axis of the multi-mode propagation portion, and the input position may be offset from the optical axis.

Alternatively, the multi-mode propagation portion may be formed by n single-mode waveguides, and an axis of symmetry between outermost single-mode waveguides among the n single-mode waveguides may correspond to an optical axis of the multi-mode propagation portion. Further, the n single-mode waveguides may be equally spaced. Furthermore, the n types of different wavelengths may be equally spaced.

A fourth aspect of the present invention is directed to an optical multi-demultiplexer for combining/separating light of first and second wavelengths or n types of different wavelengths, where n is a natural integer. The optical multi-demultiplexer is realized by using an optical demultiplexer of the present invention as an optical multiplexer.

A fifth aspect of the present invention is directed to an optical device for adjusting wavelength-multiplexed light of n types of wavelengths, where n is a natural integer. The optical device includes: a demultiplexing section for separating the light of n types of wavelengths; a multiplexing section for combining the light of n types of wavelengths; and n adjusting sections for adjusting light of the n types of wavelengths separated by the demultiplexing section and inputting the light of the n types of wavelengths to the multiplexing section. The demultiplexing section includes a demultiplexer multi-mode propagation portion allowing multi-mode propagation of the light of n types of wavelengths and separating powers of the light of n types of wavelengths by causing internal mode interference. The multiplexing section includes a multiplexer multi-mode propagation portion allowing multi-mode propagation of the light of n types of wavelengths and combining powers of light of the n types of wavelengths by causing internal mode interference. In the case where i=0,1, . . . ,n and k=1, 2, . . . ,n−1, when a phase difference between i'th- and i+1'th-order modes of a k'th wavelength $\lambda_k$ is $\theta_k$ and a phase difference between i'th- and i+1'th-order modes of a k+1'th wavelength $\lambda_{k+1}$ is $\theta_{k+1}$, each of the demultiplexer and multiplexer multi-mode propagation portions has such an optical path length in a propagation direction as to cause a difference between $\theta_k$ and $\theta_{k+1}$ to be in the range of $m\pi\pm\pi/2$, where m is a natural integer.

Preferably, each of the n adjusting sections may adjust at least one of a gain, a phase, and a polarized status for each wavelength.

The optical device may further include an external control section, wherein the external control section is able to communicate with each of the n adjusting sections so as to dynamically adjust at least one of a gain, a phase, and a polarized status for each wavelength.

Alternatively, the optical device may further include: an external control section; and a monitor section for monitoring the output of the multiplexer multi-mode propagation portion. The external control section may be able to communicate with each of the n adjusting sections and the monitor section and to feed back an output status of the multiplexer multi-mode propagation portion so as to dynamically adjust at least one of a gain, a phase, and a polarized status for each wavelength.

A sixth aspect of the present invention is directed to an optical device having an add/drop function of extracting one of two wavelengths multiplexed in light and recombining the two wavelengths. The optical device includes: a demultiplexer for separating light of the two wavelengths; a multiplexer for combining light of the two wavelengths; a relay waveguide for relaying light of a first wavelength in wavelength-multiplexed light to the multiplexer, the relay waveguide being connected to the output side of the demultiplexer; a drop waveguide for guiding light of a second waveguide in the wavelength-multiplexed light to the outside of the demultiplexer, the drop waveguide being connected to the output side of the demultiplexer; and an add waveguide for guiding the light of the second wavelength back into the demultiplexer and relaying the light to the multiplexer. The demultiplexer includes a demultiplexer multi-mode propagation portion allowing multi-mode propagation of light of the first and second wavelengths and separating powers of the light of the first and second wavelengths by causing internal mode interference. The multiplexer includes a multiplexer multi-mode propagation portion allowing multi-mode propagation of the light of the first and second wavelengths and combining the powers of the light of the first and second wavelengths by causing internal mode interference. In the case where a phase difference between zero- and first-order modes of the first wavelength is $\theta_1$ and a phase difference between zero- and first-order modes of the second wavelength is $\theta_2$, each of the demultiplexer and multiplexer multi-mode propagation portions has such an optical path length in a propagation direction as to cause a difference between $\theta_1$ and $\theta_2$ to be in the range of $m\pi\pm\pi/2$, where m is a natural integer.

A seventh aspect of the present invention is directed to an optical demultiplexer for separating, into two groups of wavelengths, input wavelength-multiplexed light of 2n types of different wavelengths $\lambda_1, \ldots, \lambda_{2n}$, where n is a natural integer. The optical demultiplexer includes: a multi-mode propagation portion allowing multi-mode propagation of light of the 2n types of different wavelengths in the input wavelength-multiplexed light and separating powers of light of the two groups of wavelengths by causing internal mode interference; an input portion for inputting light to the multi-mode propagation portion from such an input position as to cause separation of powers of light in the multi-mode propagation portion; and two output portions for outputting the light of the two groups of wavelengths from such positions as to cause separation of the powers of the light of the two groups of wavelengths. The two groups of wavelengths consist of the group of odd-numbered multiplexed wavelengths and the group of even-numbered multiplexed wavelengths.

In the case where k=1, 2, . . . ,n−1, when a phase difference between zero- and first-order modes of a 2k−1'th wavelength $\lambda_{2k-1}$ is $\theta_{2k-1}$ and a phase difference between zero- and first-order modes of a 2k'th wavelength $\lambda_{2k}$ is $\theta_{2k}$, it is preferred that the multi-mode propagation portion has such an optical path length in a propagation direction as to cause a difference between $\theta_{2k-1}$ and $\theta_{2k}$ to be in the range of $m\pi\pm\pi/2$, where m is a natural integer.

Preferably, the multi-mode propagation portion may be formed by one multi-mode waveguide, the center line of the multi-mode waveguide may correspond to an optical axis of the multi-mode propagation portion, and the input position may be offset from the optical axis.

Alternatively, the multi-mode propagation portion may be formed by two single-mode waveguides having different lengths, and an axis of symmetry between the two single-mode waveguides may correspond to an optical axis of the multi-mode propagation portion.

In the case where k=1, 2, . . . ,n−1, when a phase difference between zero- and first-order modes of a 2k−1'th wavelength $\lambda_{2k-1}$ is $\theta_{2k-1}$ and a phase difference between zero- and first-order modes of a 2k'th wavelength $\lambda_{2k}$ is $\theta_{2k}$, the multi-mode propagation portion includes: a first optical path length portion having such an optical path length in a propagation direction as to cause a difference between $\theta_{2k-1}$ and $\theta_{2k}$ to be in the range of $m\pi\pm\pi/2$, where m is a natural integer; and a second optical path length portion having such an optical path length in the propagation direction as to a difference between $\theta_{2k-1}$ and $\theta_{2k}$ to be in the range of $m\pi\pm\pi/2$. The group of the odd-numbered multiplexed wavelengths may be outputted from the first optical path length portion, the group of the even-numbered multiplexed wavelengths may be outputted from the second optical path length portion, and the first and second optical path length portions may have different optical path lengths.

Further, the multi-mode propagation portion may be formed by one multi-mode waveguide, the center line of the multi-mode waveguide may correspond to an optical axis of the multi-mode propagation portion, and the input position may be offset from the optical axis.

Alternatively, the multi-mode propagation portion may be formed by two single-mode waveguides having different lengths, and an axis of symmetry between the two single-mode waveguides may correspond to an optical axis of the multi-mode propagation portion.

Preferably, the 2n types of wavelengths may be equally spaced.

Preferably, a refractive index of the multi-mode propagation portion may be in linear relationship with a wavelength in at least n types of wavelength ranges.

Preferably, n is a number which satisfies n=4k, where k is a natural integer, and the optical demultiplexer may further include: a first latter-stage multi-mode propagation portion optically connected to an output end of the output portion for guiding the group of odd-numbered multiplexed wavelengths and having the same characteristic as that of the multi-mode propagation portion; a second latter-stage multi-mode propagation portion optically connected to the output end of the output portion for guiding the group of even-numbered multiplexed wavelengths and having the same characteristic as that of the multi-mode propagation portion; a first latter-stage output portion for outputting the group of 4k−3'th wavelengths separated by the first latter-stage multi-mode propagation portion; a second latter-stage output portion for outputting the group of 4k−1'th wavelengths separated by the first latter-stage multi-mode propagation portion; a third latter-stage output portion for outputting the group of 4k−2'th wavelengths separated by the second latter-stage multi-mode propagation portion; and a fourth latter-stage output portion for outputting the group of 4k'th wavelengths separated by the second latter-stage multi-mode propagation portion.

An eighth aspect of the present invention is directed to an optical demultiplexer for separating input wavelength-multiplexed light of first and second wavelengths. The optical demultiplexer includes: a first multi-mode propagation portion for separating powers of light of third and fourth wavelengths by causing internal mode interference, the third wavelength being offset from the first wavelength by a prescribed wavelength, the fourth wavelength being offset from the second wavelength by a prescribed wavelength, an input portion for inputting light to the first multi-mode propagation portion from such an input position as to cause separation of powers of light in the first multi-mode propagation portion; a first output portion provided to an output end face of the first multi-mode propagation portion in such a position as to cause separation of the powers of light of the third and fourth wavelengths and maximize an extinction ratio indicating the size of the power of light of the fourth wavelength with respect to the power of light of the third wavelength; a second output portion provided to the output end face of the first multi-mode propagation portion in such a position as to cause separation of the powers of light of the third and fourth wavelengths and maximize the extinction ratio indicating the size of the power of light of the fourth wavelength with respect to the power of light of the third wavelength; second and third multi-mode propagation portions each separating powers of light of fifth and sixth wavelengths by causing internal mode interference, the fifth wavelength being offset from the first wavelength by a prescribed wavelength in a direction opposite to a direction of the offset of the third wavelength, the sixth wavelength being offset from the second wavelength by a prescribed wavelength in a direction opposite to a direction of the offset of the fourth wavelength; a third output portion provided to an output end face of the second multi-mode propagation portion in such a position as to cause separation of powers of light of the fifth and sixth wavelengths and maximize the extinction ratio indicating the size of the power of light of the sixth wavelength with respect to the power of light of the fifth wavelength; and a fourth output portion provided to an output end face of the third multi-mode propagation portion in such a position as to cause separation of the powers of light of the fifth and sixth wavelengths and maximize the extinction ratio indicating the size of the power of light of the sixth wavelength with respect to the power of light of the fifth wavelength.

Preferably, the third and fifth wavelengths may be symmetric with respect to the first wavelength, and the forth and sixth wavelengths may be symmetric with respect to the second wavelength.

In the present invention, distribution of powers of light is changed within the multi-mode propagation portion by causing mode interference therein, thereby separating the powers of light of a plurality of wavelengths to be outputted. Accordingly, it is possible to provide a low-cost optical demultiplexer or optical multi-demultiplexer simply structured with the multi-mode propagation portion consisting of waveguides without using a dielectric film filter or the like. Moreover, the light of first and second wavelengths are outputted from such positions as to maximize the extinction ratio, and therefore it is possible to provide an optical demultiplexer or optical multi-demultiplexer capable of separating only light of a desired wavelength, while cutting off unnecessary wavelengths.

Further, by configuring the multi-mode propagation portion so as to have a refractive index of 2.0 or more, or the width of 15 μm, a position at which the power of light of the desired wavelength is maximized is made apart from a position at which the extinction ratio is maximized. Accordingly, it is possible to identify a position at which a satisfactory extinction ratio can be obtained. Thus, it is made easy to provide an optical demultiplexer or optical multi-demultiplexer capable of separating only light of a desired wavelength, while cutting off unnecessary wavelengths.

Furthermore, by configuring the multi-mode propagation portion so as to have such an optical path length which is in the range of $m\pi \pm \pi/2$, where m is a natural integer, mode interference between zero- and first-order modes is caused within the multi-mode propagation portion, so that the powers of light alternately move up and down in a traveling direction of the light. In the case where an optical path length is provided such that a phase difference between two wavelengths is caused to be in the range of $m\pi \pm \pi/2$ due to chromatic dispersion resulted from the mode interference, i.e., due to the wavelength dependence of propagation coefficients for changing the powers of light, the powers of light are distributed so as to become almost symmetric with respect to the center line of the multi-mode propagation portion. By outputting light of the two wavelengths from positions where the powers of light of the two wavelengths are almost separated, it is made possible to readily separate the two wavelengths. Accordingly, it is possible to provide an optical demultiplexer or optical multi-demultiplexer simply structured with the multi-mode propagation portion consisting of waveguides without using a dielectric film filter or the like.

Further still, by configuring the multi-mode propagation portion so as to have such an optical path length as to cause at least one of the powers of light of the first and second wavelengths to be maximized or minimized at an output end of each of the first and second wavelengths, it is made possible to enhance the extinction ratio at each output end.

Further still, by configuring the multi-mode propagation portion so as to have such an optical path length as to cause the difference between the phase differences $\theta_1$ and $\theta_2$ to become an integral multiple of $\pi$, the optical path length itself is also caused to become an integral multiple of $\pi$. As a result, the powers of light of the first and second wavelengths are completely separated at each output end of the wavelengths, and therefore it is possible to perform an optical demultiplexing operation with higher precision.

Further still, by configuring the multi-mode propagation portion so as to have such an optical path length as to cause the powers of the light of first and second wavelengths to become inverted extremums, the power of light of the first wavelength is caused to be maximized at the output end of the first wavelength and the power of light of the second wavelength is caused to be minimized at the output end of the first wavelength. Moreover, at the output end of the second wavelength, the powers of light of the first and second wavelengths are caused to become minimum and maximum, respectively. Thus, it is possible to obtain a higher extinction ratio.

There are no problems for practical use of the optical multi-mode propagation portion having such an optical path length as to cause the extinction ratio to become 30 dB or more at each output end of the first and second wavelengths.

In this case, the optical path length is caused to become an integral multiple of $\pi$. As a result, the power of light of the first and second wavelengths are completely separated at each output end of the wavelengths, and therefore it is possible to perform an optical demultiplexing operation with higher precision.

By forming the multi-mode propagation portion with one multi-mode waveguide, it is possible to simply structure the optical demultiplexer.

Alternatively, by forming the multi-mode propagation portion with two single-mode waveguides, it is possible to simply structure the optical demultiplexer.

Further, by providing the first and second optical path length portions having different lengths, it is made possible to separate the powers of light with a shorter optical path length, thereby making it possible to provide a compact optical demultiplexer.

Furthermore, by causing mode interference of a shorter wavelength in the first multi-mode region, it is made possible to shorten the optical path length required for a final phase difference in variation of the power of light, thereby making it possible to provide a compact optical demultiplexer.

Further still, by cutting out a portion having a rectangular solid-shape from the input side of the multi-mode waveguide, mode interference of the shorter wavelength is caused to occur first in a narrowed region of the multi-mode waveguide, thereby making it possible to make the optical demultiplexer more compact.

Further still, by forming the first and second multi-mode regions such that their respective centers of optical axes become offset from each other, it is made possible to shorten the optical path length required for a final phase difference in variation of the power of light.

Further still, by providing two former-stage single-mode waveguides used as a former-stage multi-mode region, such that mode interference of the shorter wavelength is caused to occur first, it is made possible to make the optical demultiplexer more compact.

Further still, by forming the first and second multi-mode regions such that their respective center axes become offset from each other, it is made possible to shorten the optical path length required for a final phase difference in variation of the power of light.

Further still in the multi-mode propagation portion having such an optical path length as to cause a difference between $\theta_1$ and $\theta_2$ to be in the range of $m\pi \pm \pi/2$ and having such a width as to vary along a direction of an optical axis of the optical demultiplexer, mode interference of the shorter wavelength is caused to occur first, thereby making it possible to make the optical demultiplexer more compact.

Further still, by providing two stages of multi-mode propagation portions, it is made possible to separate wavelengths with higher precision, thereby making it possible to enhance the extinction ratio.

Further still, by providing the external electric field control section, it is made possible to dynamically change the refractive index, etc., of the multi-mode propagation portion, thereby making it possible to provide an optical demultiplexer capable of dynamically controlling the extinction ratio.

Further still, by providing the external electric field control section, it is made possible to provide a simply structured optical demultiplexer capable of dynamically control the extinction ratio.

Further still, by providing the external temperature control section, it is made possible to dynamically change the refractive index, etc., of the multi-mode propagation portion, thereby making it possible to provide an optical demultiplexer capable of dynamically controlling the extinction ratio.

Further still, by providing the external temperature control section, it is made possible to provide a simply structured optical demultiplexer capable of dynamically controlling the extinction ratio.

Further still, by using waveguides as input and output portions, it is made possible to provide a simply structured optical demultiplexer.

Further still, by integrally providing optical and electrical circuits as a unit, it is made possible to provide an optical device capable of performing an optical demultiplexing operation, while performing receiving/transmitting operations.

Further still, by providing two stages of multi-mode propagation portions separating wavelengths which are offset from a center wavelength by a prescribed wavelength, it is made possible to provide an optical demultiplexer obtaining a higher extinction ratio.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram schematically illustrating the structure of an optical demultiplexer 100a according to a first embodiment of the present invention;

FIG. 3A illustrates a BPM simulation result showing a detailed distribution of the power of light of a wavelength propagating through a multi-mode waveguide 102a;

FIG. 3B illustrates a BPM simulation result showing a detailed distribution of the power of light of another wavelength propagating through the multi-mode waveguide 102a;

FIG. 5 is a graph illustrating a distribution of the power of light at output positions of the multi-mode waveguide 102a;

FIG. 23 is a diagram schematically illustrating the structure of a WDM gain adjuster 300a according to a thirteenth embodiment of the present invention;

FIG. 24 is a diagram illustrating the structure of a WDM add/drop 300b according to a fourteenth embodiment of the present invention;

FIG. 25 is a diagram schematically illustrating a WDM transmitter/receiver module 300c according to a fifteenth embodiment of the present invention;

FIG. 26 is a diagram schematically illustrating a WDM interleaver 300d according to a sixteenth embodiment of the present invention;

DETAILED DESCRIPTION OF THE PREFERRED EMBODIMENTS

Figure 2A:
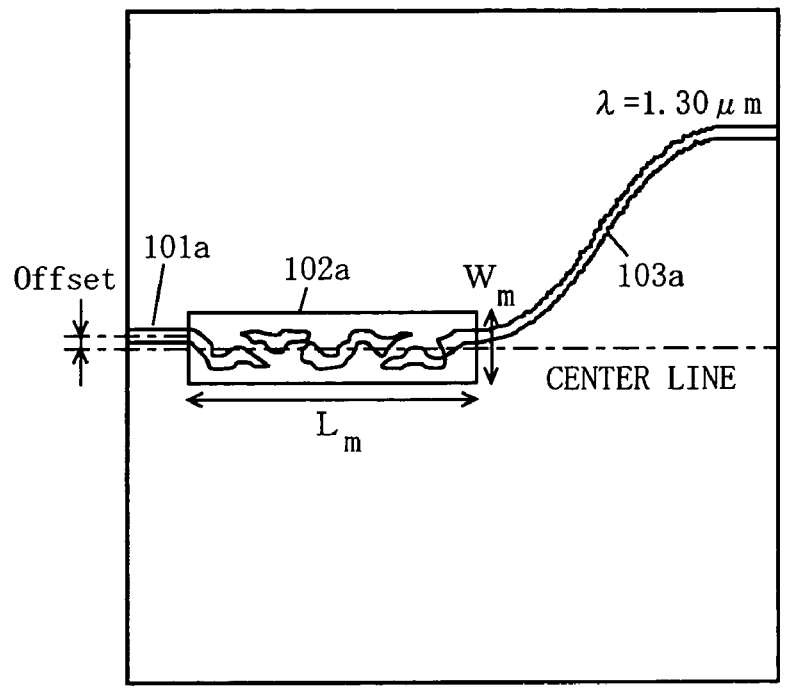
FIG. 2A illustrates a simulation result obtained by a beam propagation method (BPM) which shows how light of a wavelength of 1.30 μm is separated in the optical demultiplexer 100a illustrated in FIG. 1.

Hereinafter, embodiments of the present invention will be described with reference to drawings.

(First Embodiment)

FIG. 1 is a diagram schematically illustrating the structure of an optical demultiplexer 100a according to a first embodiment of the present invention. Note that in FIG. 1, waveguide modes (hereinafter, simply referred to as "modes") of light propagating through the waveguide are schematically illustrated such that the behavior of the propagating light is clearly understood.

In FIG. 1, modes at a wavelength of 1.30 μm are indicated by bold curves, and modes at a wavelength of 1.55 μm are indicated by dotted curves. In the figure, the orders of the modes are clearly distinguished by the shapes of the curves and labels. Note that the bold and dotted curves are not intended to specify exact modes at the positions on the waveguide where the curves are illustrated. Accordingly, in order to specify which curve indicates a mode at what position on the waveguide, positions of the modes are indicated by the labels. For example, in FIG. 1, the label "1.30 μm light input end zero-order mode" represents the zero-order mode light of a wavelength of 1.30 μm at the input end of a multi-mode waveguide 102a. Also, in other figures related to other embodiments, similar labels are added in order to provide similar indications, except if otherwise specified.

In FIG. 1, the optical demultiplexer 100a includes: a single-mode input waveguide 101a; the multi-mode waveguide 102a; a first single-mode output waveguide 103a; a second single-mode output waveguide 104a; a substrate 106a; and V-grooves 105a, 115a, and 125a formed in the substrate 106a.

In the case where a phase difference between zero- and first-order modes at a wavelength of 1.30 μm is $\theta_1$ and a phase difference between zero- and first-order modes at a wavelength of 1.55 μm is $\theta_2$, the multi-mode waveguide 102a has such an optical path length as to cause a difference between $\theta_1$ and $\theta_2$ to become substantially an integral multiple of π. The term "optical path length" as used herein refers to the length of an optical path in a direction along which light propagates, e.g., the longitudinal length of the multi-mode waveguide 102a in FIG. 1. The reason why the multi-mode waveguide 102a has such an optical path length as described above will be described later.

The single-mode input waveguide 101a is optically connected to the input side of the multi-mode waveguide 102a in such a position that the optical axis of the single-mode input waveguide 101a becomes offset from a center line 112a which indicates the optical axis of the multi-mode waveguide 102a.

The first and second single-mode output waveguides 103a and 104a are provided on the substrate 106a in opposite positions with respect to the center line 112a of the multi-mode waveguide 102a, and optically connected to the output side of the multi-mode waveguide 102a. The first and second single-mode output waveguides 103a and 104a are spaced apart from each other so as not to couple light of a wavelength of 1.30 μm to the second single-mode output waveguide 104a and so as not to couple light of a wavelength of 1.55 μm to the first single-mode output waveguide 103a.

The substrate 106a is provided for securing the single-mode input waveguide 101a, the multi-mode waveguide 102a, and the first and second single-mode output waveguides 103a and 104a.

The V-groove 105a is formed in the substrate 106a in order to align and connect a single-mode input optical fiber 7 with the input end of the single-mode input waveguide 101. The V-groove 115a is formed in the substrate 106a in order to align and connect a first single-mode output optical fiber 8 with the output end of the first single-mode output waveguide 103a. The V-groove 125a is formed in the substrate 106a in order to align and connect a second single-mode output optical fiber 9 with the output end of the second single-mode output waveguide 104a.

In the following description, the terms "waveguide" and "optical fiber" refer to the "single-mode waveguide" and the "single-mode optical fiber", respectively, except if specified as the "multi-mode waveguide" or the "multi-mode optical fiber". Accordingly, hereinafter, the single-mode input waveguide 101a, the first single-mode output waveguide 103a, the second single-mode output waveguide 104a, the single-mode input optical fiber 7, the first single-mode output optical fiber 8, and the second single-mode output optical fiber 9 are simply referred to as the "input waveguide 101a", the "first output waveguide 103a", the "second output waveguide 104a", the "input optical fiber 7", the "first output optical fiber 8", and the "second output optical fiber 9", respectively.

Figure 2B:
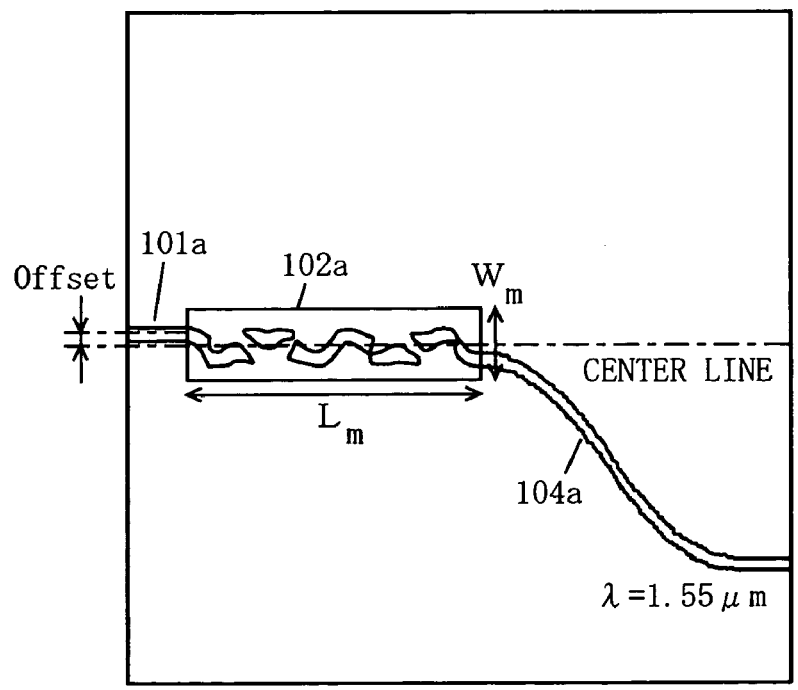
FIG. 2B illustrates a BPM simulation result showing how light of a wavelength of 1.55 μm is separated in the optical demultiplexer 100a illustrated in FIG. 1.

FIGS. 2A and 2B are simulation results obtained by a beam propagation method (BPM) which show how light of wavelengths of 1.30 μm and 1.55 μm are separated in the optical demultiplexer 100a. The behavior of light in the optical demultiplexer 100a will be briefly described below with reference to FIGS. 1, 2A, and 2B.

The dimensions of the waveguides used in the BPM simulations of FIGS. 2A and 2B are as follows: multi-mode waveguide length Lm: about 6550 μm; multi-mode waveguide width Wm: about 19.5 μm; input waveguide axial offset x: about 5.7 μm; output waveguide spacing: about 10 μm; waveguide cladding refractive index: about 1.500; core refractive index: about 1.505.

In FIG. 2A, the behavior of light of a wavelength of 1.30 μm is shown. Consider a case where single-mode light of a wavelength of 1.30 μm enters from the input waveguide 101a connected to the multi-mode waveguide 102a in such a position that the optical axis thereof becomes offset from the center line 112a. In the multi-mode waveguide 102a illustrated in FIG. 2A, the light of a wavelength of 1.30 μm is divided into light under the zero- and first-order modes characteristic of the multi-mode waveguide 102a. Due to modal dispersion between the zero- and first-order modes, i.e., mode interference resulted from a difference in propagation coefficients between the zero- and first-order modes, the light of a wavelength of 1.30 μm propagates through the multi-mode waveguide 102a in accordance with a specific propagation coefficient, such that the power of the light of a wavelength of 1.30 μm alternately moves up and down to the right in FIG. 2A. Thereafter, the light of a wavelength of 1.30 μm enters the first output waveguide 103a and propagates therethrough.

In FIG. 2B, the behavior of light of a wavelength of 1.55 μm is shown. Similar to the light of a wavelength of 1.30 μm, in the multi-mode waveguide 102a illustrated in FIG. 2B, light of a wavelength of 1.55 μm is divided into light under the zero- and first-order modes. Due to the modal dispersion, the light of a wavelength of 1.55 μm propagates through the multi-mode waveguide 102a, such that the power thereof alternately moves up and down to the right in FIG. 2B. Thereafter, the light of a wavelength of 1.55 μm enters the second output waveguide 104a and propagates therethrough.

The propagation coefficients for the movement of the power of light differ between the wavelengths of 1.30 μm and 1.55 μm due to chromatic dispersion resulted from modal dispersion of each wavelength, i.e., due to wavelength characteristics of propagation coefficients of all modes of wavelengths. Accordingly, in the case of an optical path length which causes the powers of light of wavelengths of 1.30 μm and 1.55 μm to move in opposite phases (i.e., the phase difference between the powers is substantially an integral multiple of π), the light of wavelengths of 1.30 μm and 1.55 μm is separated in the vertical direction and both the powers of the light of 1.30 μm and 1.55 μm become maximum at an output end face of the multi-mode waveguide 102a. The length of the multi-mode waveguide 102a corresponds to the optical path length as described above, and therefore, as shown in FIGS. 2A and 2B, the light of wavelengths of 1.30 μm and 1.55 μm is separated in the vertical direction.

Accordingly, in the case of the optical demultiplexer 100a, the optical path length of the multi-mode waveguide 102a is determined such that the first output waveguide 103a, which guides light of a wavelength of 1.30 μm, and the second output waveguide 104a, which guides light of a wavelength of 1.55 μm, are provided in the vicinity of the location at which light of wavelengths of 1.30 μm and 1.55 μm is separated into light of a wavelength of 1.30 μm and light of a wavelength of 1.55 μm. As described below, the first and second output waveguides 103a and 104a are connected to the output end of the multi-mode waveguide 102a at positions $X_1$ and $X_2$, respectively. By determining the optical path length of the multi-mode waveguide 102a as described above, it is made possible to allow the optical demultiplexer 100a simply structured with the waveguides to separate the light of wavelengths of 1.30 μm and 1.55 μm into light of a wavelength of 1.30 μm and light of a wavelength of 1.55 μm.

Next a detailed description is provided as to how the optical length of the multi-mode waveguide 102a is determined. FIGS. 3A and 3B are diagrams representing BPM simulation results showing a detailed distribution of the powers of light of wavelengths of 1.30 μm and 1.55 μm propagating through the multi-mode waveguide 102a. Specifically, in FIG. 3A, distribution of the power of light of a wavelength of 1.30 μm is shown, while in FIG. 3B a distribution of the power of light of a wavelength of 1.55 μm is shown.

The dimensions of the waveguides used in the BPM simulations of FIGS. 3A and 3B are as follows: multi-mode waveguide length Lm: about 10000 μm; multi-mode waveguide width Wm: about 19.5 μm; input waveguide axial offset x: about 5.7 μm; first output waveguide axial offset $p_1$: about 4.6 μm; second output waveguide axial offset $p_2$: about 5.1 μm; waveguide cladding refractive index: about 1.500; core refractive index: about 1.505.

Figure 4:
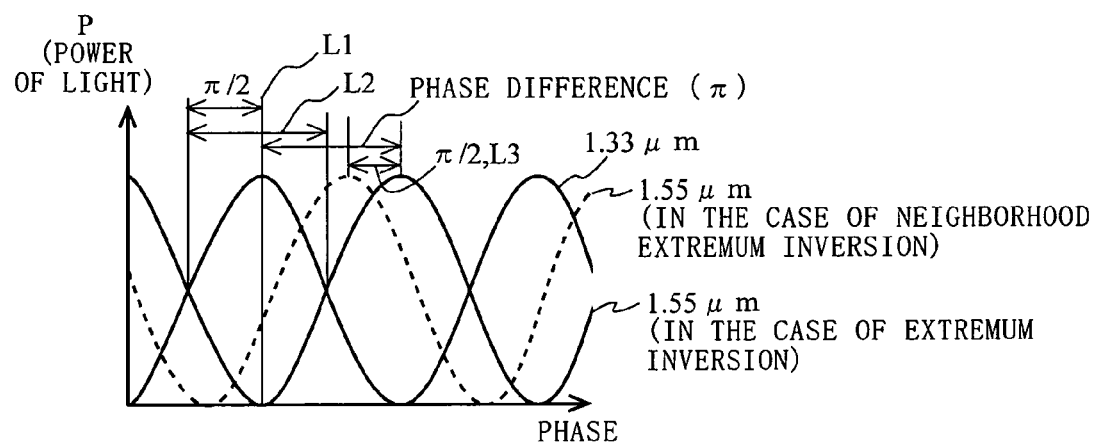
FIG. 4 is a graph used for describing that a phase difference in movement between powers of light is set so as to become substantially an integral multiple of π.

FIG. 4 is a graph used for describing that a phase difference in movement between powers of light is set so as to become substantially an integral multiple of π. Note that in order to study an optimum optical path length, the simulation results of FIGS. 3A and 3B are produced in the state where the length of the multi-mode waveguide 102a is set so as to be longer than an estimated optimum optical path length. Hereinbelow, referring to FIGS. 1, 3A and 3B, the description as to how the optical path length of the multi-mode waveguide 102a is determined is provided, following the detailed description of the mechanism of wavelength separation.

As in the case shown in FIG. 1, when single-mode light of wavelengths of 1.30 μm and 1.55 μm is inputted from an input position of the multi-mode input end, i.e., the input waveguide 101a provided such that the optical axis thereof becomes offset from the center line 112a of the multi-mode waveguide 102a, the zero- and first-order modes at each wavelength interfere with each other, i.e., mode interference occurs between the zero- and first-order modes for each wavelength. Note that in Table 1 shown below, the input position is denoted by X. As shown in FIG. 3A, the power of light of a wavelength of 1.30 μm propagating through the multi-mode waveguide 102a is caused by the mode interference to vary such that maximum and minimum values of the power of the light alternately appear on two straight lines, i.e., a first 1.30 μm light power variation line which passes a multi-mode waveguide output end point $P_{1a}$ so as to be parallel to the center line 112a, and a second 1.30 μm light power variation line which passes point $P_{1b}$ symmetric to $P_{1a}$ with respect to the center line 112a so as to be parallel to the center line 112a. Moreover, the power of light varies across the two straight lines such that the maximum and minimum values are inversely-correlated with each other. Accordingly, the power of light of a wavelength of 1.30 μm appears as if it propagates through the multi-mode waveguide 102a while moving alternately on the two straight lines.

Similar to the light of a wavelength of 1.30 μm, as shown in FIG. 3B, the power of light of a wavelength of 1.55 μm propagating through the multi-mode waveguide 102a is caused by the mode interference to vary such that maximum and minimum values of the power of light alternately appear on two straight lines, i.e., a second 1.55 μm light power variation line which passes a multi-mode waveguide output end point $P_{2a}$ so as to be parallel to the center line 112a, and a first 1.55 μm light power variation line which passes point $P_{2b}$ symmetric to $P_{2a}$ with respect to the center line 112a so as to be parallel to the center line 112a. Moreover, the power of light varies across the two straight lines such that the maximum and minimum values are inversely-correlated with each other. Accordingly, the power of the light of a wavelength of 1.55 μm appears as if it propagates through the multi-mode waveguide 102a while moving alternately on the two straight lines. In this case, $P_{1a} \neq P_{2b}$ and $P_{2a} \neq P_{1b}$. The reason for this is that spreading distribution in the width direction of the multi-mode waveguide 102a differs between the wavelengths, and the longer wavelength spreads wider.

In the case where a propagation coefficient of the zero-order mode at a wavelength of 1.30 μm is $\beta_{i0}$, a propagation coefficient of the first-order mode at a wavelength of 1.30 μm is $\beta_{i1}$, a propagation coefficient of the zero-order mode at a wavelength of 1.55 μm is $\beta_{j0}$, and a propagation coefficient of the first-order mode at a wavelength of 1.55 μm is $\beta_{j1}$, as is apparent from Table 1 shown below, mode addition conditions and mode cancellation conditions on the first variation lines are set such that phase differences between the modes (i.e., $\theta_1 = (\beta_{i0} - \beta_{i1}) \times L_{im}$ and $\theta_2 = (\beta_{j0} - \beta_{j1}) \times L_{jm}$) appear in a cycle corresponding to an integral multiple of π based on differences in propagation coefficients between the modes (($\beta_{i0} - \beta_{i1}$) and ($\beta_{j0} - \beta_{j1}$)).

TABLE 1 mode interference conditions of wavelengths (m: integer)

| wavelength | propagation coefficient 0-order mode | propagation coefficient 1st-order mode | mode addition conditions of wavelengths on 1st variation lines | mode cancellation conditions of wavelengths on 1st variation lines |
|---|---|---|---|---|
| $\lambda_i$ | $\beta_{i0}$ | $\beta_{i1}$ | $(\beta_{i0} - \beta_{i1})L_{im} = 2m\pi$ | $(\beta_{i0} - \beta_{i1})L_{im} = (2m+1)\pi$ |
| $\lambda_j$ | $\beta_{j0}$ | $\beta_{j1}$ | $(\beta_{j0} - \beta_{j1})L_{jm} = m\pi$ | $(\beta_{j0} - \beta_{j1})L_{jm} = (2m+1)\pi$ |

Note that $\lambda_i = 1.30$ μm, $\lambda_j = 1.55$ μm, and $L_{im}$ and $L_{jm}$ denote optical path lengths for $\lambda_i$ and $\lambda_j$.

In order to separate light of wavelengths of 1.30 μm and 1.55 μm, it is necessary to substantially satisfy a light power extremum inversion condition such that "extremums, i.e., maximum values, of the powers of light of the wavelengths of 1.30 μm and 1.55 μm are inverted at the output end of the multi-mode waveguide 102a".

Next, the optical path length of the multi-mode waveguide 102a is specifically calculated. An optical path length L, which satisfies the "light power extremum inversion condition", is obtained from the following Expression 1, which is a system of simultaneous equations, and the following Expression 2.

$$(\beta_{i0} - \beta_{i1})L = 2m\pi (\beta_{j0} - \beta_{j1})L = (2m+1)\pi \quad \text{Expression 1}$$

$$m = INT\left[\frac{1}{2}\frac{\beta_{i0} - \beta_{i1}}{\beta_{j0} - \beta_{j1} - (\beta_{i0} - \beta_{i1})} + \frac{1}{2}\right] = \quad \text{Expression 2}$$

$$INT\left[\frac{1}{2}\frac{\beta_{j0} - \beta_{j1}}{\beta_{j0} - \beta_{j1} - (\beta_{i0} - \beta_{i1})}\right],$$

where the value of INT[ ] is an integer rounded toward zero.

Accordingly, the optical path length L of the multi-mode waveguide 102a, which satisfies the "light power extremum inversion condition", is represented by the following Expression 3.

$$L = \frac{2\pi}{\beta_{i0} - \beta_{i1}} INT\left[\frac{1}{2} \frac{\beta_{j0} - \beta_{j1}}{\beta_{j0} - \beta_{j1} - (\beta_{i0} - \beta_{i1})}\right] \quad \text{Expression 3}$$

In the examples shown in FIGS. 3A and 3B, m=3. In accordance with the following Expression 4, the optical path length L (e.g., $L_1$ shown in FIGS. 3A and 3B) is obtained so as to effect the inversion of the phase difference between the extremums of the powers of light of the wavelengths of 1.30 μm and 1.55 μm, i.e., the phase difference becomes an integral multiple of π.

$$L = \frac{6\pi}{\beta_{i0} - \beta_{i1}} = \frac{7\pi}{\beta_{j0} - \beta_{j1}} \quad \text{Expression 4}$$

In this case, at point $P_{1a}$ on the first 1.30 μm light power variation line, the power of the light of a wavelength of 1.30 μm is maximized, while the power of the light of a wavelength of 1.55 μm is minimized. On the other hand, at point $P_{2a}$ on the second 1.30 μm light power variation line, the power of the light of a wavelength of 1.30 μm is minimized, while the power of the light of a wavelength of 1.55 μm is maximized.

As described above, in the case of the optical path length L, which satisfies the light power extremum inversion condition, components of light of wavelengths of 1.30 μm and 1.55 μm are present on the first 1.30 μm light power variation line and the second 1.55 μm light power variation line, respectively. Accordingly, in the case where the optical path length of the multi-mode waveguide is L, when $X_1 \approx P_{1a}$ and $X_2 \approx P_{2a}$, it is possible to separate the wavelengths 1.30 μm and 1.55 μm.

As described above, in the first embodiment, in the case where a phase difference between the zero- and first-order modes at a wavelength of 1.30 μm is $\theta_1$ and a phase difference between the zero- and first-order modes at a wavelength of 1.55 μm is $\theta_2$, the multi-mode waveguide 102a has such an optical path length as to cause a difference between $\theta_1$ and $\theta_2$ to become substantially an integral multiple of π. Further, the input waveguide is connected to the multi-mode waveguide 102a in such a position that the optical axis thereof becomes offset from the center line 112a of the multi-mode waveguide 102a, and the first and second output waveguides 103a and 104a are provided in opposite positions with respect to the center line 112a. Thus, it is possible to separate light of wavelengths of 1.30 μm and 1.55 μm. The optical demultiplexer according to the first embodiment is simply structured with the multi-mode optical waveguide, and therefore can be provided at low cost.

Further, the optical demultiplexer according to the first embodiment can achieve wavelength separation performance similar to that achieved by a conventional demultiplexer.

Furthermore, in the first embodiment, the extinction ratio can be enhanced by completely satisfying the light power extremum inversion condition, and therefore highly precise light separation can be realized.

Note that the mode propagation coefficient β at each wavelength is determined by, for example, the shape and material refractive index of the multi-mode waveguide, and therefore by optimizing the shape and material refractive index of the multi-mode waveguide, it is possible to obtain the optical wave length L which satisfies the light power extremum inversion condition.

For example, the shape of the multi-mode waveguide can be optimized by optimizing lengths of three sides of a rectangular solid along an optical axis or optimizing a distance between opposed side faces in directions toward which light is separated, so as to change along the optical axis.

The material refractive index of the multi-mode waveguide can be optimized by, for example, using a material having optimum chromatic dispersion of the refractive index or using a material having an optimum refractive index profile.

In the case of using a material having large chromatic dispersion of the material refractive index, a difference between propagation coefficients of wavelengths becomes large, and therefore it is possible to realize a shorter optical path length L.

In the first embodiment, length $L_2$ or $L_3$ shown in FIGS. 3A and 3B, which does not satisfy the light power extremum inversion condition, may be set as the optical path length since the length $L_2$ is in the neighborhood of the length $L_1$, which cause the phase difference between maximum powers of light to be an integral multiple π, and the length $L_3$ causes the phase difference between maximum powers of light to be in the neighborhood of an integral multiple of π. As can be seen from FIG. 4, the length $L_2$ is in the neighborhood range of the length $L_1$, which corresponds to the range where the power of light becomes half the maximum power (e.g., decrements of 3 dB from the maximum power) and also corresponds to the range of a phase difference between maximum powers of light with ±π/2, i.e., the range of mπ±π/2, where m is a natural integer. The neighborhood range of the length $L_3$ also corresponds to the range where the power of light becomes half the maximum power (e.g., decrements of 3 dB from the maximum power), i.e., the range of mπ±π/2.

Note that even when the light power extremum inversion condition is not completely satisfied, a satisfactory extinction ratio can be obtained if the multi-mode waveguide has such an optical path length as to cause the power of light of at least one wavelength to be maximized or minimized at each output end.

For clarification, although the first embodiment has been described with respect to the case where the maximum order mode is the first-order mode, modes of higher orders, such as a second-order mode and a third-order mode, are actually present. Accordingly, the actual variation of modes is complicated. In principle, the chromatic dispersion occurs along with modal dispersion of each wavelength, and therefore by determining the shape of the multi-mode waveguide such that a phase difference in movement between powers of light caused by the modal dispersion of each wavelength becomes substantially an integral multiple of π, it is made possible to maximize the powers of light of desired wavelengths in their respective output positions.

(Second Embodiment)

An optical demultiplexer according to a second embodiment of the present invention has a structure similar to that of the optical demultiplexer according to the first embodiment, and therefore is described with reference to FIG. 1. The first embodiment has been described mainly with respect to how the optical path length of the multi-mode waveguide 102a is determined. In the second embodiment, there is proposed an optical demultiplexer capable of cutting off an unnecessary wavelength and obtaining only a desired wavelength in the case where the multi-mode waveguide 102a has an optical path length determined in a manner as described in the first embodiment. Accordingly, the second embodiment will be described with respect to positions on the output end face of the multi-mode waveguide 102a at which the first and second output waveguides 103a and 104a are connected to the multi-mode waveguide 102a.

Figure 5:
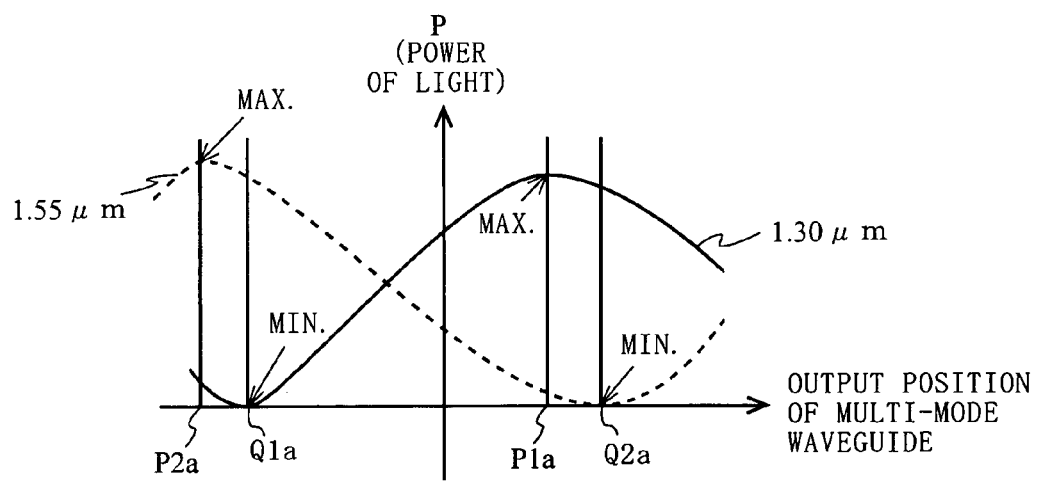

FIG. 5 is a graph illustrating distribution of the power of light at output positions of the multi-mode waveguide 102a. In FIG. 5, output positions corresponding to the output positions indicated in FIGS. 3A and 3B are denoted by the same reference characters. The output positions indicated in FIG. 5 are present on the output end face of the multi-mode waveguide 102a. As can be seen from FIG. 5, extremums of a longer wavelength of 1.55 μm are located farther away from the vertical axis as compared to extremums of a shorter wavelength of 1.33 μm. In the case where only transmission loss is considered, as described above, it is adequate to connect the first and second output waveguides 103a and 104a to the multi-mode waveguide 102a at points $P_{1a}$ and $P_{2a}$, respectively. However, a wavelength to be cut off is not minimized at each of the points $P_{1a}$ and $P_{2a}$, and therefore wavelengths other than desired wavelengths are output. In such a case, the extinction ratio becomes less than or equal to 30 dB, and therefore is not satisfactory.

In the optical demultiplexer according to the second embodiment, accordingly, the first output waveguide is connected at a point $Q_{2a}$, where the power of light of a wavelength of 1.55 μm is minimized, and the second output waveguide is connected at a point $Q_{1a}$, where the power of light of a wavelength of 1.30 μm is minimized. This allows the decreasing ratio of the power of the light of a wavelength of 1.55 μm to become large at the connecting end of the first output waveguide as compared to the decreasing ratio of the power of the light of a wavelength of 1.30 μm. Therefore, it is possible to obtain an optimum extinction ratio of 30 dB or more, while keeping the transmission loss less than or equal to 1 dB. Similarly, the decreasing ratio of the power of the light of a wavelength of 1.30 μm to become large at the connecting end of the second output waveguide as compared to the decreasing ratio of the power of the light of a wavelength of 1.55 μm. Therefore, it is possible to obtain an optimum extinction ratio of 30 dB or more, while keeping the transmission loss less than or equal to 1 dB. In accordance with Expression 5 below, the extinction ratio is obtained as a value corresponding to ten times the natural logarithm of the quotient obtained by dividing the power of light of a desired wavelength to be outputted, by the power of light of a wavelength to be cut off. In the case of defining the extinction ratio in accordance with Expression 5 below, the extinction ratio becomes equal to or more than 30 dB at the position on the output end face of the multi-mode waveguide 102a where the maximum possible extinction ratio can be obtained.

$$\text{EXTINCTION RATIO} = 10 \log \left( \frac{\text{POWER OF LIGHT OF DESIRED WAVELENGTH}}{\text{POWER OF LIGHT OF WAVELENGTH TO BE CUT OFF}} \right) \quad \text{Expression 5}$$

Thus, the second embodiment provides an optical demultiplexer which demultiplexes light of a desired wavelength to be outputted, by connecting output waveguides from which desired wavelengths are outputted to the multi-mode waveguide at positions where a wavelength to be cut off is minimized, i.e., at positions where the extinction ratio is maximized.

For example, as shown in (1) of Table 2 below, when the output waveguide from which light of a desired wavelength is outputted is provided at a position where a wavelength to be cut off is minimized, the extinction ratio becomes equal to or more than 50 dB. On the other hand, when the output waveguide is provided at a position where the light of a desired wavelength to be outputted is maximized, the extinction ratio becomes about 25 dB. Thus, when the output waveguide from which the light of a desired wavelength to be outputted is provided at the position where the wavelength to be cut off is minimized, the extinction ratio is significantly enhanced, and therefore it is possible to provide an optical demultiplexer which demultiplexes only light of a desired wavelength to be outputted.

TABLE 2 relationships between extinction ratio and connecting positions (X, $X_1$, and $X_2$) of input/output waveguides

| input/output waveguide arrangement [μm] | output | loss [dB] underlined: transmission loss unlined: cut-off loss | | extinction ratio [dB] |
|---|---|---|---|---|
| | | 1.30 μm wavelength | 1.55 μm wavelength | |
| (1) minimum arrangement x = 5.7, $x_1$ = 4.6 ($X_1$ = $Q_{1a}$), $x_2$ = 5.1 ($X_2$ = $Q_{2a}$) | X1 X2 | <u>0.80</u> 55.54 | 58.30 <u>0.65</u> | 57.50 54.89 |
| (2) maximum arrangement x = 5.7, $x_1$ = 5.1 ($X_1$ = $P_{1a}$), $x_2$ = 4.6 ($X_2$ = $P_{2a}$) | X1 X2 | <u>0.68</u> 25.75 | 28.09 <u>0.56</u> | 27.41 25.19 |
| (3) output mirror symmetric arrangement x = $x_3$ = $x_4$ = 5.7 | X1 X2 | <u>1.04</u> 14.26 | 13.67 <u>0.75</u> | 12.63 13.51 |
| (4) output mirror symmetic arrangement x = $x_3$ = $x_4$ = Wm/4 = 4.875 | X1 X2 | <u>0.60</u> 29.33 | 22.10 <u>0.40</u> | 21.49 28.93 |
| (5) output mirror symmetric arrangement x = $x_3$ = $x_4$ = W/3 = 6.5 | X1 X2 | <u>1.87</u> 10.09 | 9.10 <u>1.55</u> | 7.23 8.54 |
| (6) output mirror symmetric arrangement x = $x_3$ = $x_4$ = W/6 = 3.25 | X1 X2 | 3.03 4.96 | 4.36 2.92 | 1.33 2.04 |

Note:
multi-mode waveguide shape: Wm = 19.5 μm, Lm = 6550 μm; X: input waveguide connecting position; X1: first output waveguide connecting position; X2: second output waveguide connecting position; $P_{1a}$: maximum point of 1.30 μm; $Q_{1a}$: minimum point of 1.30 μm; $P_{2a}$: maximum point of 1.55 μm; $Q_{2a}$: minimum point of 1.55 μm.

In Table 2, small letter "x" denotes a distance of offset between the input waveguide and the center axis of the multi-mode waveguide; "$x_1$" denotes a distance of offset between the first output waveguide and the center axis of the multi-mode waveguide; and "$x_2$" denotes a distance of offset between the second output waveguide and the center axis of the multi-mode waveguide. In table 2, the term "transmission loss" refers to a loss of a desired wavelength to be outputted, and the term "cut-off loss" refers to a loss of a wavelength to be cut off.

Note that in addition to connecting the output waveguides to the multi-mode waveguide at maximum or minimum points on the output ends thereof where the power of the wavelength to be cut off is maximized or minimized, the distances of offset between the center axis and the input and output waveguides are also equalized by providing the output waveguides mirror-symmetrically with respect to the center axis of the multi-mode waveguide. In the case of providing the output waveguides mirror-symmetrically, however, as is appreciated from (3) through (6) of Table 2, a satisfactory extinction ratio cannot be obtained unless a maximum or minimum point of each wavelength is selected in consideration of the distribution of the power of light of each wavelength on the output ends.

As can be seen from Table 2, variations of the transmission loss are slight, and thus it is understood that the second embodiment provides an optimum structure in which the output waveguides are connected to the multi-mode waveguide at minimum points of wavelengths to be cut off where the cut-off loss of the wavelengths, which regulates the extinction ratio, is maximized.

As described above, it is effective to provide the output waveguides at positions where the extinction ratio is maximized, in particular, when the multi-mode waveguide has a refractive index of 2.0 or less, or a width of 15 $\mu$m or more. In the case of using a multi-mode waveguide formed of a semiconductor material having a refractive index greater than 2.0, the entire demultiplexer itself is required to become significantly compact, and therefore the width of the multi-mode waveguide is required to become about 5 $\mu$m to 12.6 $\mu$m. Thus, the width of the fundamental mode of each wavelength becomes small. Accordingly, in the case of the distribution of the power of light when the refractive index is greater than 2.0, in each output position, a point at which the power of light of a desired wavelength to be outputted is maximized (hereinafter, such a point is referred to as the "maximum light power point") is in proximity to a point at which the power of light of a wavelength to be cut off is minimized (hereinafter, such a point is referred to as the "minimum light power point"), and therefore a satisfactory extinction ratio can be obtained at the maximum light power point of the desired wavelength. On the other hand, in the case of using a multi-mode waveguide formed of a semiconductor material having a refractive index of 2.0 or less, the entire demultiplexer itself is required to become relatively large, and therefore the width of the multi-mode waveguide is required to become about 15 $\mu$m or more. As a result, the maximum light power point of the desired wavelength is made apart from the minimum light power point of the wavelength to be cut off. In this case, by selecting the minimum light power point of the wavelength to be cut off, it is made possible to output light from the position at which a satisfactory extinction ratio is obtained.

(Third Embodiment)

Figure 6:
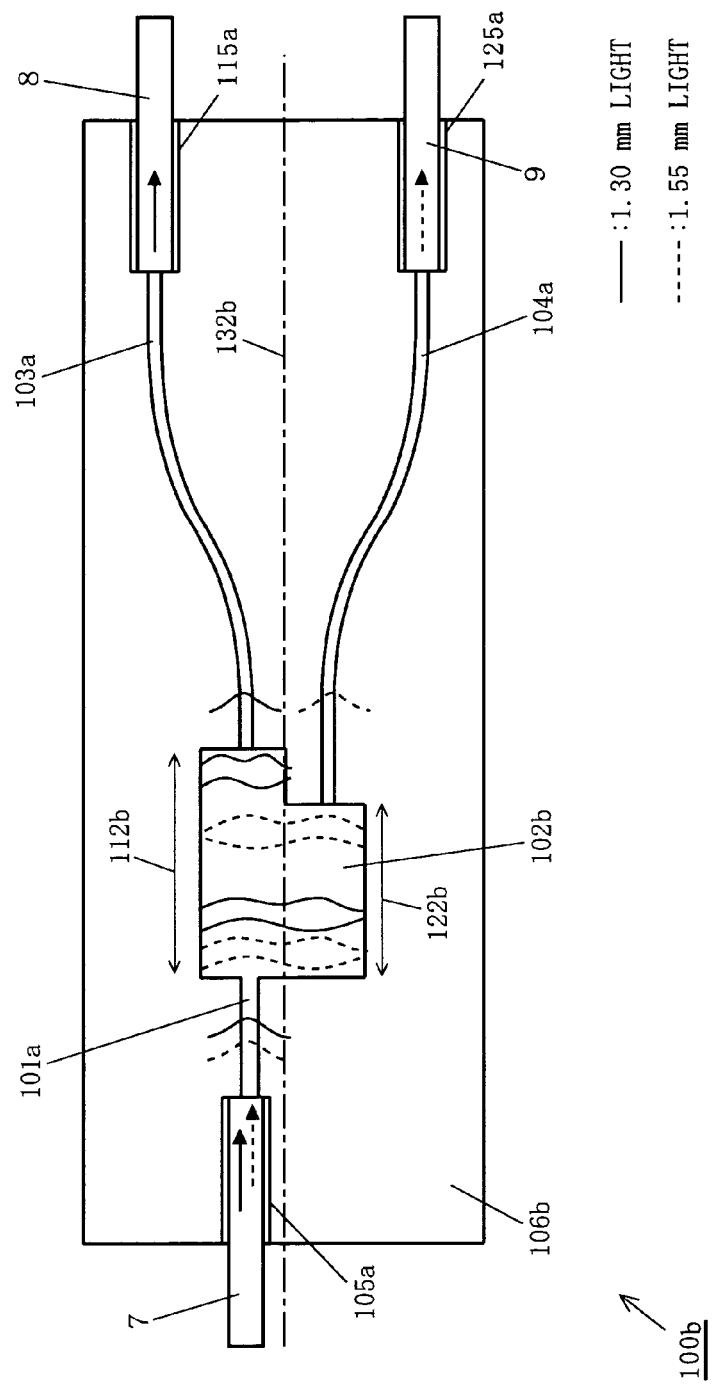
FIG. 6 is a diagram schematically illustrating the structure of an optical demultiplexer 100b according to a third embodiment of the present invention.

FIG. 6 is a diagram schematically illustrating the structure of an optical demultiplexer 100b according to a third embodiment of the present invention. In FIG. 6, elements having similar functions to those of the optical demultiplexer 100a according to the first embodiment are denoted by the same reference numerals, and the descriptions thereof are omitted.

In FIG. 6, the optical demultiplexer 100b includes: an input waveguide 101a; a multi-mode waveguide 102b (which includes optical paths having different lengths); a first output waveguide 103a; a second output waveguide 104a; a substrate 106b for securing the above waveguides; and V-grooves 105a, 115a and 125a.

The multi-mode waveguide 102b includes a first optical path length portion 112b having a rectangular solid-like shape, and a second optical path length portion 122b having a rectangular solid-like shape. The optical path length of the first optical path length portion 112b is longer than that of the second optical path length portion 122b.

In the case where a phase difference between zero- and first-order modes at a wavelength of 1.30 $\mu$m is $\theta_1$ and a phase difference between zero- and first-order modes at a wavelength of 1.55 $\mu$m is $\theta_2$, the first optical path length portion 112b has such an optical path length as to cause a difference between $\theta_1$ and $\theta_2$ to become substantially an integral multiple of $\pi$. The first optical path length portion 112b outputs light of a wavelength of 1.30 $\mu$m from the output end thereof.

Similar to the first optical path length portion 112b, the second optical path length portion 122b has such an optical path length as to cause a difference between $\theta_1$ and $\theta_2$ to become substantially an integral multiple of $\pi$. The second optical path length portion 122b outputs light of a wavelength of 1.55 $\mu$m from the output end thereof.

Similar to the first embodiment, the input waveguide 101a is provided in such a position that the optical axis thereof becomes offset from a center line 132b of the multi-mode waveguide 102b. Light of wavelengths of 1.30 $\mu$m and 1.55 $\mu$m inputted from the input waveguide 101a propagates through the multi-mode waveguide 102b, while the powers of the light of wavelengths of 1.30 $\mu$m and 1.55 $\mu$m vary in accordance with different propagation coefficients.

In the optical demultiplexer 100a according to the first embodiment, an output end from which light of a wavelength of 1.30 $\mu$m is outputted and an output end from which light of a wavelength of 1.55 $\mu$m is outputted are formed on the same output end face of the multi-mode waveguide 102a, resulting in along optical length of 5000 $\mu$m or more.

On the other hand, in the optical demultiplexer 100b according to the third embodiment, the output ends from which light of wavelengths of 1.30 $\mu$m and 1.55 $\mu$m is outputted are not formed on the same output end face of the multi-mode waveguide 102b. The multi-mode waveguide 102b is provided so as to have two different optical path lengths such that the powers of light of wavelengths of 1.30 $\mu$m and 1.55 $\mu$m move in opposite phases. Specifically, the output end from which the light of a wavelength of 1.30 $\mu$m is outputted is provided at such a position as to set an optical path length such that the power of the light of a wavelength of 1.30 $\mu$m is maximized in an upper part of the multi-mode waveguide 102b (i.e., the first optical path length portion 112b), while the output end from which the light of a wavelength of 1.55 $\mu$m is outputted is provided at such a position as to set another optical path length such that the power of the light of a wavelength of 1.55 $\mu$m is maximized in a lower part of the multi-mode waveguide 102b (i.e., the second optical path length portion 122b).

Unlike the first embodiment, light at each wavelength is not necessarily outputted from the same output face, and therefore it is possible to provide the multi-mode waveguide 102b so as to have optical path lengths of 5000 $\mu$m or less, thereby making it possible to provide a compact optical demultiplexer.

In the third embodiment, the multi-mode waveguide 102b is provided such that the power of light of a wavelength of 1.30 $\mu$m is maximized in the first optical path length portion 112b provided in the upper part of the multi-mode waveguide 102b, and the power of light of a wavelength of 1.55 $\mu$m is maximized in the second optical path length portion 122b provided in the lower part of the multi-modewaveguide 102b. However, the same effect can be achieved even if the positions of the first and second optical path length portions 112b and 122b are reversed.

Further, in the third embodiment, as in the case of the second embodiment, the output waveguides may be provided in positions where a wavelength to be cut off is maximized, i.e., positions where the extinction ratio is maximized.

(Fourth Embodiment)

Figure 7:
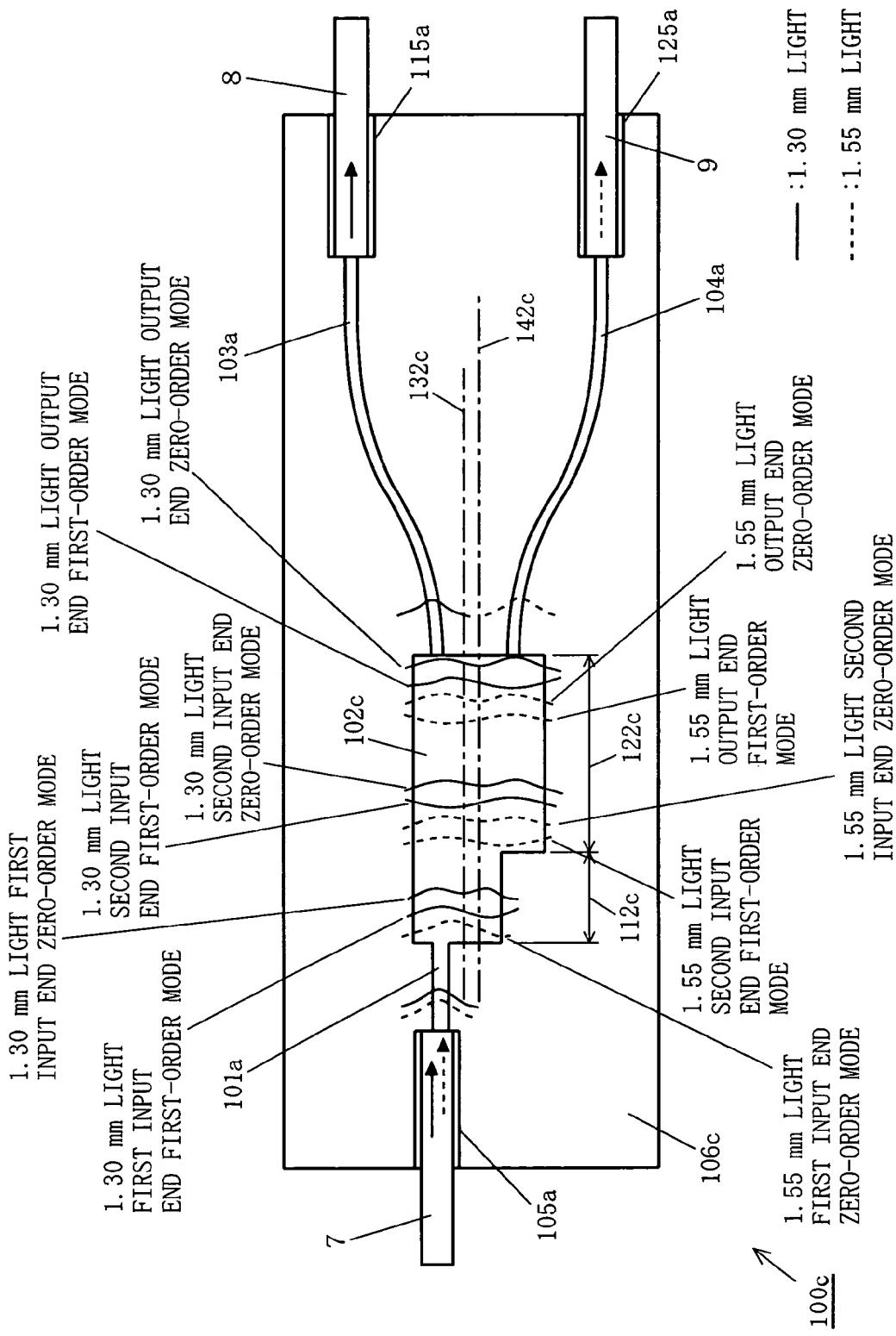
FIG. 7 is a diagram schematically illustrating the structure of an optical demultiplexer 100c according to a fourth embodiment of the present invention.

FIG. 7 is a diagram schematically illustrating the structure of an optical demultiplexer 100c according to a fourth embodiment of the present invention. In FIG. 7, elements having similar functions to those of the optical demultiplexer 100a shown in FIG. 1 are denoted by the same reference numerals, and the descriptions thereof are omitted.

In FIG. 7, the optical demultiplexer 100c includes: an input waveguide 101a; a multi-mode waveguide 102c (which includes a plurality of stages); a first output waveguide 103a; a second output waveguide 104a; a substrate 106b for securing the above waveguides; and V-grooves 105a, 115a and 125a.

The multi-mode waveguide 102c includes a first multi-mode region 112c and a second multi-mode region 122c. A center line 132c of the first multi-mode region 112c is offset from a center line 142c of the second multi-mode region 122c.

In the first multi-mode region 112c, zero- and first-order modes are normal modes of light of a wavelength of 1.30 μm, and the zero-order mode is the normal mode of light of a wavelength of 1.55 μm. In the first multi-mode region 122c, light of wavelengths of 1.30 μm and 1.55 μm can be normally present under zero- and first-order modes.

The entire length of the multi-mode waveguide 102c is determined such that, with respect to lateral movement of the power of light due to modal dispersion between zero- and first-order modes, a phase difference between wavelengths of 1.30 μm and 1.55 μm becomes substantially an integral multiple of π.

The width of the waveguide required for generating a higher mode increases/decreases with the length of a wavelength, and therefore the first multi-mode region 112c through which light of 1.30 μm propagates is narrower than the second multi-mode region 122c through which light of 1.55 μm propagates. In the case of separating wavelengths based on mode interference, multi-mode light at each wavelength is required at the output end of the multi-mode waveguide. In order to cause multi-mode light of a plurality of wavelengths to be generated in different positions, it is effective to broaden the width of the multi-mode waveguide 102c in a light propagation direction.

Next, the behavior of light in the optical demultiplexer 100c according to the fourth embodiment will be described. Consider a case where single-mode light of a wavelength of 1.30 μm enters from the input waveguide 101a connected to the multi-mode waveguide 102c in such a position that the optical axis thereof becomes offset from the center line 132c of the narrower first multi-mode region 112c. In the first multi-mode region 102c, the light of a wavelength of 1.30 μm is divided into light under the zero- and first-order modes characteristic of the first multi-mode region 112c. The light of a wavelength of 1.30 μm propagates through the first multi-mode region 112c, accompanied by lateral movement of the power of light due to modal dispersion between the zero- and first-order modes.

On the other hand, in the first multi-mode region 112c, the light of a wavelength of 1.55 μm is present only under the zero-order mode, and therefore no modal dispersion is caused. Consequently, the light of a wavelength of 1.55 μm propagates through the first multi-mode region 112c without being accompanied by the lateral movement of the power of light. As a result, at the output end of the first multi-mode region 112c, there occurs a phase difference φ in movement between the powers of light of wavelengths of 1.30 μm and 1.55 μm.

Next, consider a case where light of a wavelength of 1.30 μm under the zero- and first-order modes enters from the input waveguide 101a connected to the multi-mode waveguide 102c in such a position that the optical axis thereof becomes offset from the center line 142c of the wider second multi-mode region 122c. In the second multi-mode region 122c, the light of a wavelength of 1.30 μm under the zero- and first-order modes is divided into light under the zero- and first-order modes characteristic of the second multi-mode region 122c. In accordance with a propagation coefficient different from the propagation coefficient of the first multi-mode region 112c, the light of a wavelength of 1.30 μm propagates through the second multi-mode region 122c, accompanied by lateral movement of the power of light due to modal dispersion between the zero- and first-order modes.

Next, consider a case where light of a wavelength of 1.55 μm under the zero-order mode enters from the input waveguide 101a connected to the multi-mode waveguide 102c in such a position that the optical axis thereof becomes offset from the center line 142c of the wider second multi-mode region 122c. In the second multi-mode region 122c, the light of a wavelength of 1.55 μm under the zero-order mode is divided into light under the zero- and first-order modes characteristic of the second multi-mode region 122c. The light of a wavelength of 1.55 μm propagates through the second multi-mode region 122c, accompanied by lateral movement of the power of light due to modal dispersion between the zero- and first-order modes. There is a phase difference φ in movement between the powers of light of wavelengths of 1.30 μm and 1.55 μm in the first multi-mode region 112c, and therefore, in the second multi-mode region 122c, only a phase difference of π-+is required between the light of wavelengths of 1.30 μm and 1.55 μm.

In this manner, the phase difference in movement between powers of light of wavelengths of 1.30 μm and 1.55 μm is determined by only the modal dispersion at a wavelength of 1.30 μm in the first multi-mode region 112c, and is determined by chromatic dispersion resulted from the modal dispersion (i.e., a difference between the modal dispersion) between the wavelengths of 1.30 μm and 1.55 μm. Accordingly, the phase difference in movement between the powers of light in the first multi-mode region 112c is greater than the phase difference in movement between the powers of light in the second multi-mode region 122c. In the optical demultiplexer 100c according to the fourth embodiment, a large phase difference is obtained in the first multi-mode region 112c, and therefore it is possible to shorten the entire length of the multi-mode waveguide 102c. As a result, it is possible to provide a compact optical demultiplexer as compared to the optical demultiplexer 100a according to the first embodiment.

Further, by narrowing the first multi-mode region 112c as compared to the second multi-mode region 122c, a larger phase difference can be obtained in the second multi-mode region 122c.

Note that in addition to changing the width of each of the first and second multi-mode regions 112c and 122c, a propagation characteristic of the multi-mode waveguide 102c can also be altered by changing the width of the multi-mode waveguide 102c itself so as to become gradually broader in a direction from the input side toward the output side, resulting in a greater phase difference in variations of a shorter wavelength.

In the fourth embodiment, similar to the second embodiment, the output waveguide may be provided in such a position that a loss of a wavelength to be cut off is maximized, i.e., the extinction ratio is maximized.

(Fifth Embodiment)

Figure 8:
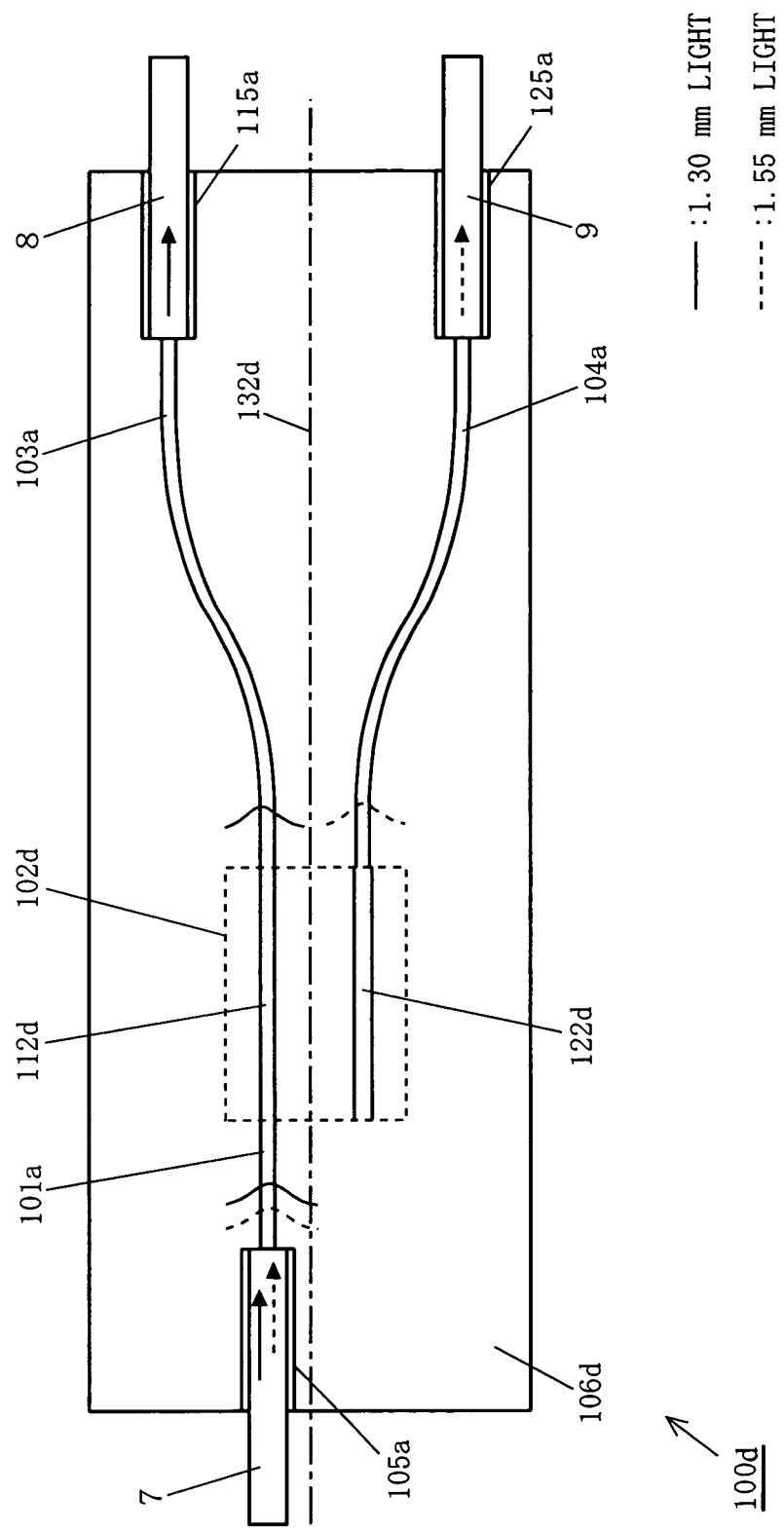
FIG. 8 is a diagram schematically illustrating the structure of an optical demultiplexer 100d according to a fifth embodiment of the present invention.

FIG. 8 is a diagram schematically illustrating the structure of an optical demultiplexer 100d according to a fifth embodiment of the present invention. In FIG. 8, elements having similar functions to those of the optical demultiplexer 10a shown in FIG. 1 are denoted by the same reference numerals, and the descriptions thereof are omitted.

The optical demultiplexer 100d includes a multi-mode propagation portion, which is a single-mode waveguide, and achieves an effect similar to that achieved by the optical demultiplexer 10a according to the first embodiment. Specifically, the optical demultiplexer 100d includes: an input waveguide 101a; a multi-mode propagation portion 102d; a first output waveguide 103a; a second output waveguide 104a; a substrate 106d for securing the above waveguides; and V-grooves 105a, 115a and 125a.

The multi-mode propagation portion 102d includes a first single-mode waveguide 112d and a second single-mode waveguide 122d.

The first and second single-mode waveguides 112d and 122d are arranged in parallel with respect to a center line 132d of the multi-mode propagation portion 102d, such that a space between the first and second single-mode waveguides 112d and 122d becomes 20 µm or less. With such an arrangement, light of wavelengths of 1.30 µm and 1.55 µm can be present under the zero- and first-order modes in the multi-mode propagation section 102d. In the case where a phase difference between the zero- and first-order modes at a wavelength of 1.30 µm is $\theta_1$ and a phase difference between the zero- and first-order modes at a wavelength of 1.55 µm is $\theta_2$, the multi-mode propagation portion 102d has such an optical path length as to cause a difference between $\theta_1$ and $\theta_2$ to become an integral multiple of $\pi$.

The input end of the first single-mode wave guide 112d is optically coupled to the output end of the input waveguide 101a. The output end of the first single-mode waveguide 112d is optically coupled to the input end of the first output waveguide 103a. The input end of the second single-mode wave guide 112d is an open end. The output end of the second single-mode waveguide 122d is optically coupled to the input end of the second output waveguide 104a.

In this manner, in the fifth embodiment, the multi-mode propagation portion 102d is provided by arranging two single-mode waveguides in parallel with each other at such a distance as to enable mode coupling. By arranging the two single-mode waveguides in parallel, mode interference occurs in the multi-mode propagation portion 102d, thereby causing modal dispersion. As a result, light of wavelengths of 1.30 µm and 1.55 µm propagates through the multi-mode propagation portion 102d, such that the powers of the light alternately moves on the first and second single-mode waveguides 112d and 122d. In consideration of chromatic dispersion resulted from the movements of the powers of light, the multi-mode propagation portion 102d is provided so as to have an optical length such that the maximum light power positions of light of wavelengths of 1.30 µm and 1.55 µm are present on the first and second single-mode waveguides 112d and 122d, respectively. In this case, when the light of wavelengths of 1.30 µm and 1.55 µm is guided by the first and second output waveguides 103a and 104a to such a distance that mode coupling does not occur, the light of wavelengths of 1.30 µm and 1.55 µm can be separated.

Figure 9:
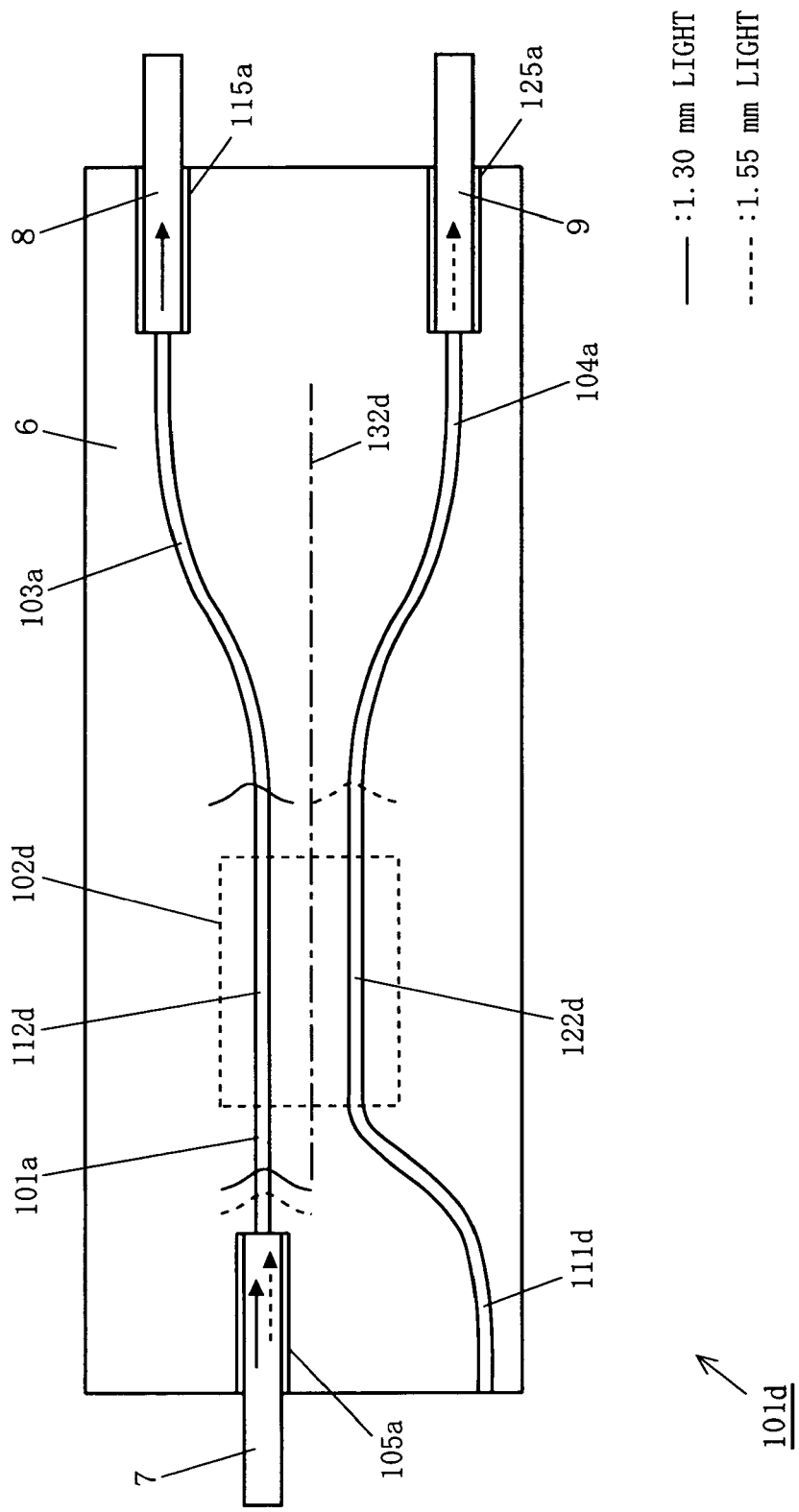
FIG. 9 is a diagram schematically illustrating the structure of the optical demultiplexer 101d illustrated in FIG. 8 to which a dummy single-mode waveguide is connected.

Note that a dummy single-mode waveguide may be connected to the multi-mode propagation portion 102d at such a distance that mode coupling does not occur between the input waveguide 101a and the dummy single-mode waveguide. FIG. 9 is a diagram schematically illustrating the structure of the optical demultiplexer 101d to which a dummy single-mode waveguide 111d is connected. As shown in FIG. 9, the dummy single-mode waveguide 111d is distanced from the input waveguide 101a so as not to cause mode coupling between the dummy single-mode waveguide 111d and the input waveguide 101a.

In the fifth embodiment, similar to the second embodiment, the output waveguide may be provided in such a position that a loss of a wavelength to be cut off is maximized, i.e., the extinction ratio is maximized.

(Sixth Embodiment)

Figure 10:
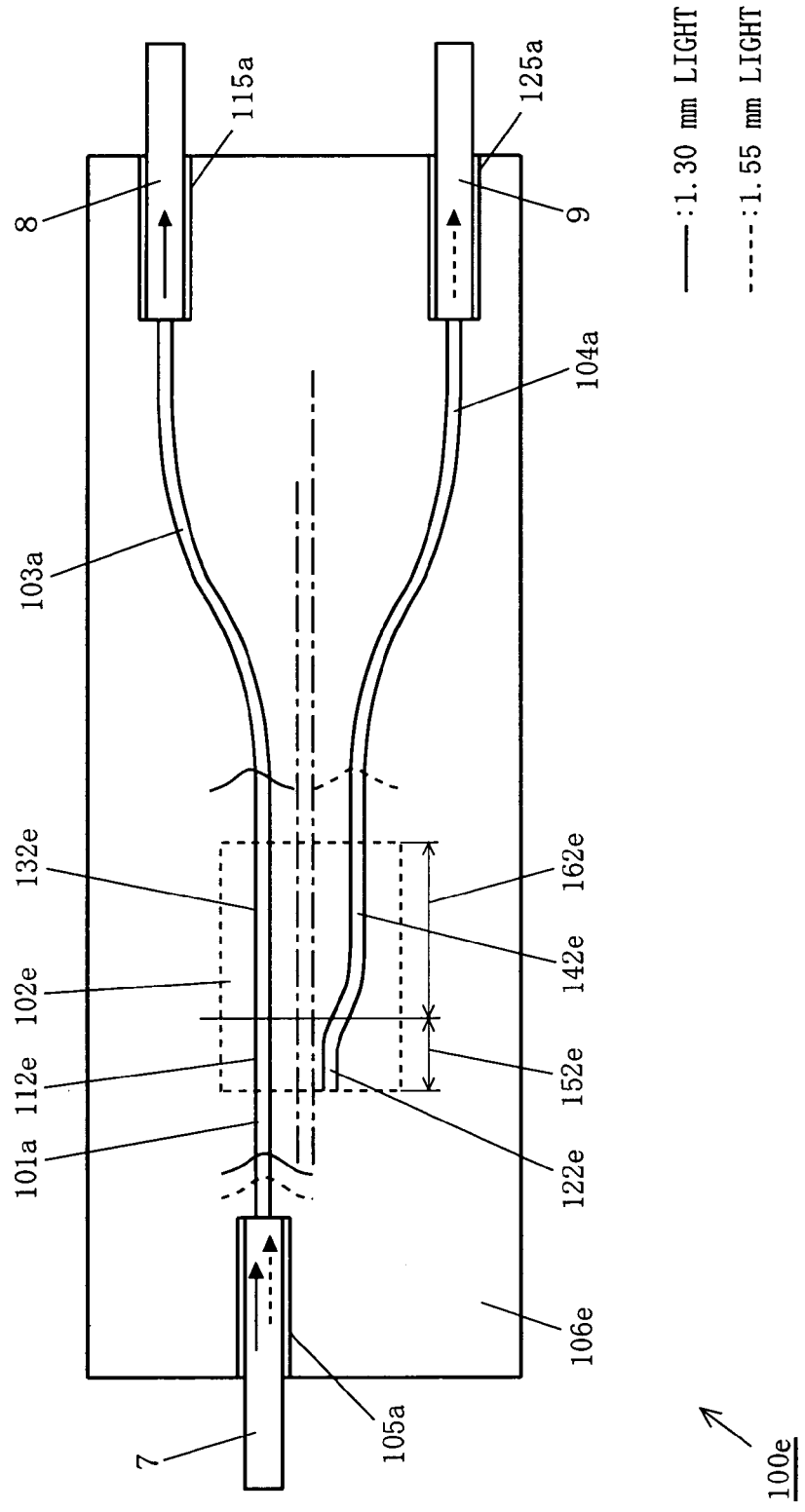
FIG. 10 is a diagram schematically illustrating the structure of an optical demultiplexer 100e according to a sixth embodiment of the present invention.

FIG. 10 is a diagram schematically illustrating the structure of an optical demultiplexer 100e according to a sixth embodiment of the present invention. In FIG. 10, elements having similar functions to those of the optical demultiplexer 100a shown in FIG. 1 are denoted by the same reference numerals, and the descriptions thereof are omitted.

In FIG. 10, the optical demultiplexer 100e includes: an input waveguide 101a; a multi-mode propagation portion 102e having a plurality of stages; a first output waveguide 103a; a second output waveguide 104a; a substrate 106e for securing the above waveguides; and V-grooves 105a, 115a, and 125a. The multi-mode propagation portion 102e includes a first multi-mode region 152e and a second multi-mode propagation portion 162e. The first multi-mode region 152e includes a first single-mode waveguide 112e and a second single-mode waveguide 122e. The second multi-mode region 162e includes a third single-mode waveguide 132e and a fourth single-mode waveguide 142e.

The first and second single-mode waveguides 112e and 122e included in the first multi-mode region 152e are arranged in parallel with each other at the input side of the multi-mode propagation portion 102e, and are spaced apart from each other by a distance of less than 20 µm. In a strict sense, the first single-mode waveguide 122e is not entirely parallel with the second single-mode waveguide 122e since an output side portion of the second single-mode waveguide 122e is curved so as to connect to the fourth single-mode waveguide 142e.

The third and fourth single-mode waveguides 132e and 142e included in the second multi-mode region 162e are arranged in parallel with each other, and are spaced apart from each other by a distance less than or equal to 20 µm and longer than the distance between the first and second single-mode waveguides 112e and 122e. In a strict sense, the fourth single-mode waveguide 142e is not entirely parallel with the third single-mode waveguide 132e since an input side portion of the fourth single-mode waveguide 142e is curved so as to connect to the second single-mode waveguide 122e.

The first and third single-mode waveguides 112e and 132e are optically and lineally coupled to each other at one end thereof. The second and fourth single-mode waveguides 122e and 142e are optically and smoothly coupled to each other at one end thereof. The other end of the second single mode waveguide 122e is an open end.

The input end of the first single-mode wave guide 112e is optically and linearly coupled to the output end of the input waveguide 101a. The output end of the third single-mode waveguide 132e is optically coupled to the input end of the first output waveguide 103a. The output end of the fourth single-mode wave guide 142e is optically coupled to the input end of the second output waveguide 104a.

The optical path length of the multi-mode propagation portion 102e is set such that, with respect to lateral movement of the power of light due to modal dispersion between zero- and first-order modes, a phase difference between wavelengths of 1.30 μm and 1.55 μm becomes substantially an integral multiple of π.

In the multi-mode propagation portion 102e having a plurality of stages consisting of two parallel single-mode waveguides, modal dispersion of each wavelength is determined by the distance between the parallel single-mode waveguides. In the sixth embodiment, a large phase difference between the powers of light of a wavelength of 1.30 μm is obtained in the first multi-mode region 152e, and therefore it is possible to shorten the entire optical path length of the second multi-mode waveguide 162e. As a result, it is possible to shorten the entire length of the multi-mode propagation portion 102e, whereby it is possible to provide a compact optical demultiplexer.

In the sixth embodiment, similar to the second embodiment, the output waveguide may be provided in such a position that a loss of a wavelength to be cut off is maximized, i.e., the extinction ratio is maximized.

(Seventh Embodiment)

Figure 11:
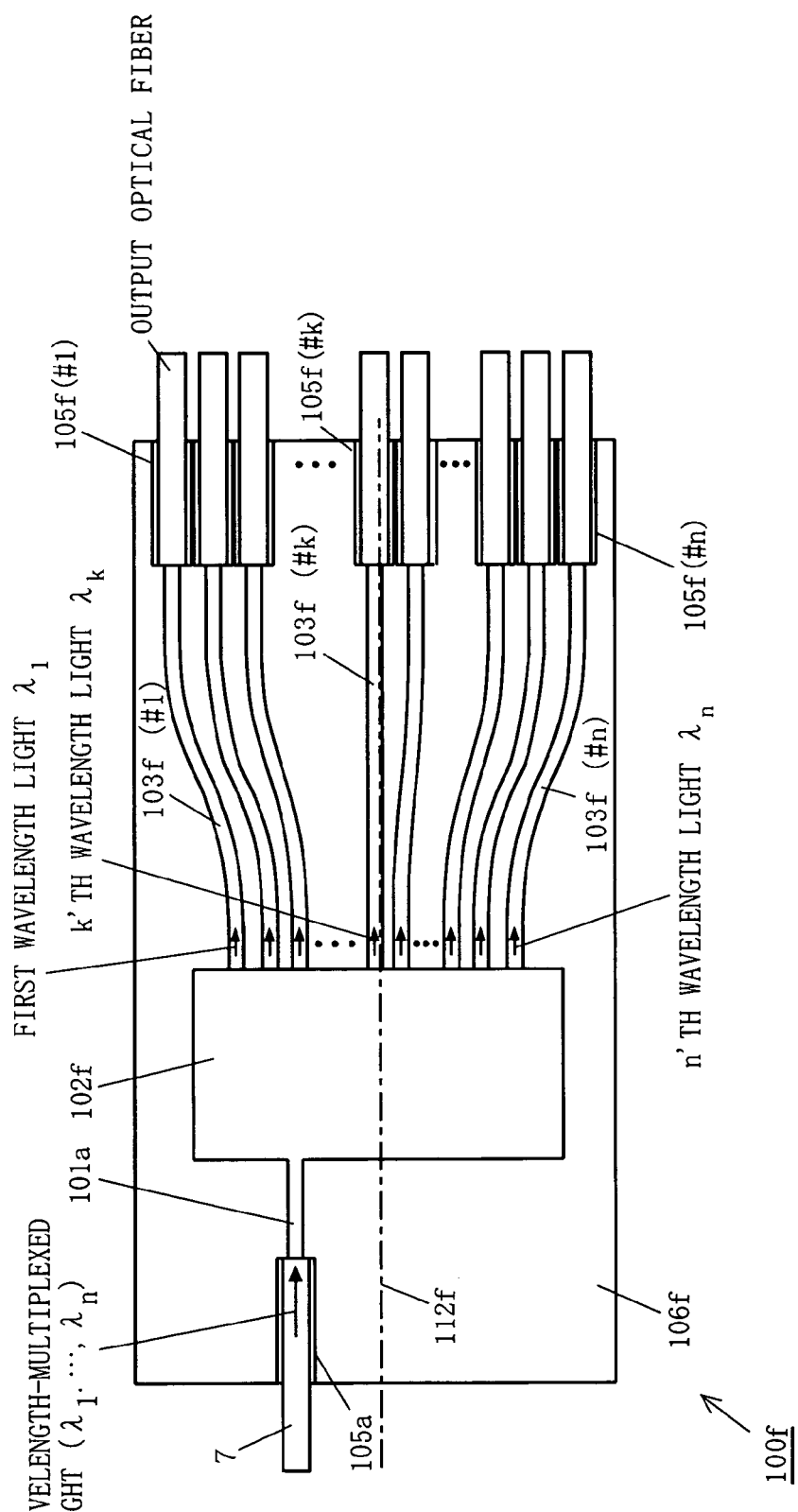
FIG. 11 is a diagram schematically illustrating the structure of an optical demultiplexer 100f according to a seventh embodiment of the present invention.

FIG. 11 is a diagram schematically illustrating the structure of an optical demultiplexer 100f according to a seventh embodiment of the present invention. In FIG. 11, elements having similar functions to those of the optical demultiplexer 100a shown in FIG. 1 are denoted by the same reference numerals, and the descriptions thereof are omitted.

In FIG. 11, the optical demultiplexer 100f includes: an input waveguide 101a; a multi-mode waveguide 102f; first through n'th output waveguides $103_{f\text{-}1}$ through $103_{f\text{-}n}$; a substrate 106f for securing the above waveguides; and V-grooves 105a and $105_{f\text{-}1}$ through $105_{f\text{-}n}$ formed in the substrate 106f. In FIG. 11, for simplicity of illustration, the first through n'th output waveguides $103_{f\text{-}1}$ through $103_{f\text{-}n}$ and the V-grooves $105_{f\text{-}1}$ through $105_{f\text{-}n}$ are not shown in their entirety.

In the multi-mode waveguide 102f, light under n types of multi-modes (zero- to n–1'th-order modes, where n is an integer) at wavelengths $\lambda_1$ through $\lambda_n$ propagates therethrough. In the case where k=1, 2, . . . , n–1, when a phase difference between i'th-order (i=0, 1, . . . , k–2) and i+1'th-order modes at a k'th wavelength $\lambda_k$ is $\theta_k$ and a phase difference between i'th-order and i+1'th-order modes at a k+1'th wavelength $\lambda_{k+1}$ is $\theta_{k+1}$, the multi-mode waveguide 102f has such an optical path length as to cause a difference between $\theta_k$ and $\theta_{k+1}$ to become substantially an integral multiple of π.

The input waveguide 101a is optically coupled to the input side of the multi-mode waveguide 102f in such a position that the optical axis of the input waveguide 101a becomes offset from a center line 112f of the multi-mode waveguide 102f. The output waveguides $103_{f\text{-}1}$ through $103_{f\text{-}n}$ are optically coupled to the output side of the multi-mode waveguide 102f at different positions.

Next, the behavior of light in the optical demultiplexer 100f will be described. Consider a case where single-mode light of a k'th wavelength $\lambda_k$ enters from the input waveguide 101a. In the multi-mode waveguide 102f, the light of the k'th wavelength $\lambda_k$ is divided into light under the zero- to n–1'th-order modes characteristic of the multi-mode waveguide 102f. Due to modal dispersion among the zero- to n–1'th-order modes, the light of the k'th wavelength $\lambda_k$ propagates through the multi-mode waveguide 102f, such that the power of the light moves sequentially on n parallel straight lines in accordance with a certain propagation coefficient. Note that the n parallel straight lines pass a connecting position of the k'th output waveguide $103_{f\text{-}k}$ to the multi-mode waveguide 102f.

In the multi-mode waveguide 102f, similar to the light of the k'th wavelength $\lambda_k$, the light of the k+1'th wavelength $\lambda_{k+1}$ is divided into light under the zero- to n–1'th-order modes characteristic of the multi-mode waveguide 102f. Due to modal dispersion among the zero- to n–1'th-order modes, the light of the k+1'th wavelength $\lambda_{k+1}$ propagates through the multi-mode waveguide 102f, such that the power of the light moves sequentially on n parallel straight lines in accordance with a certain propagation coefficient. Note that the n parallel straight lines passes a connecting position of the k+1'th output waveguide $103_{f\text{-}k+1}$ to the multi-mode waveguide 102f.

The propagation coefficients for the movement of the power of light differ between the k'th and k+1'th wavelengths $\lambda_k$ and $\lambda_{k+1}$ due to chromatic dispersion resulted from modal dispersion of each wavelength, i.e., due to wavelength characteristics of propagation coefficients of all modes of wavelengths. Accordingly, in the case of an optical path length which causes the powers of light of the k'th and k+1'th wavelengths $\lambda_k$ and $\lambda_{k+1}$ to move in opposite phases (i.e., the phase difference between the powers is an integral multiple of π), the powers of the light of the k'th and k+1'th wavelengths $\lambda_k$ and $\lambda_{k+1}$ separately move on different lines among the n parallel straight lines.

Thus, in the seventh embodiment, the multi-mode waveguide 102f has the optical path length determined such that the output waveguide $103_{f\text{-}k}$, which guides the light of the k'th wavelength $\lambda_k$, and the k+1'th output waveguide $103_{f\text{-}k+1}$, which guides the light of the k+1 wavelength $\lambda_{k+1}$, are provided in the vicinity of the location at which the light of the k'th and k+1'th wavelength $\lambda_k$ and $\lambda_{k+1}$ are separated, thereby making it possible to allow the optical demultiplexer 100f simply structured with the waveguides to separate the light of the n types of wavelengths $\lambda_1, \ldots, \lambda_n$.

Figure 12:
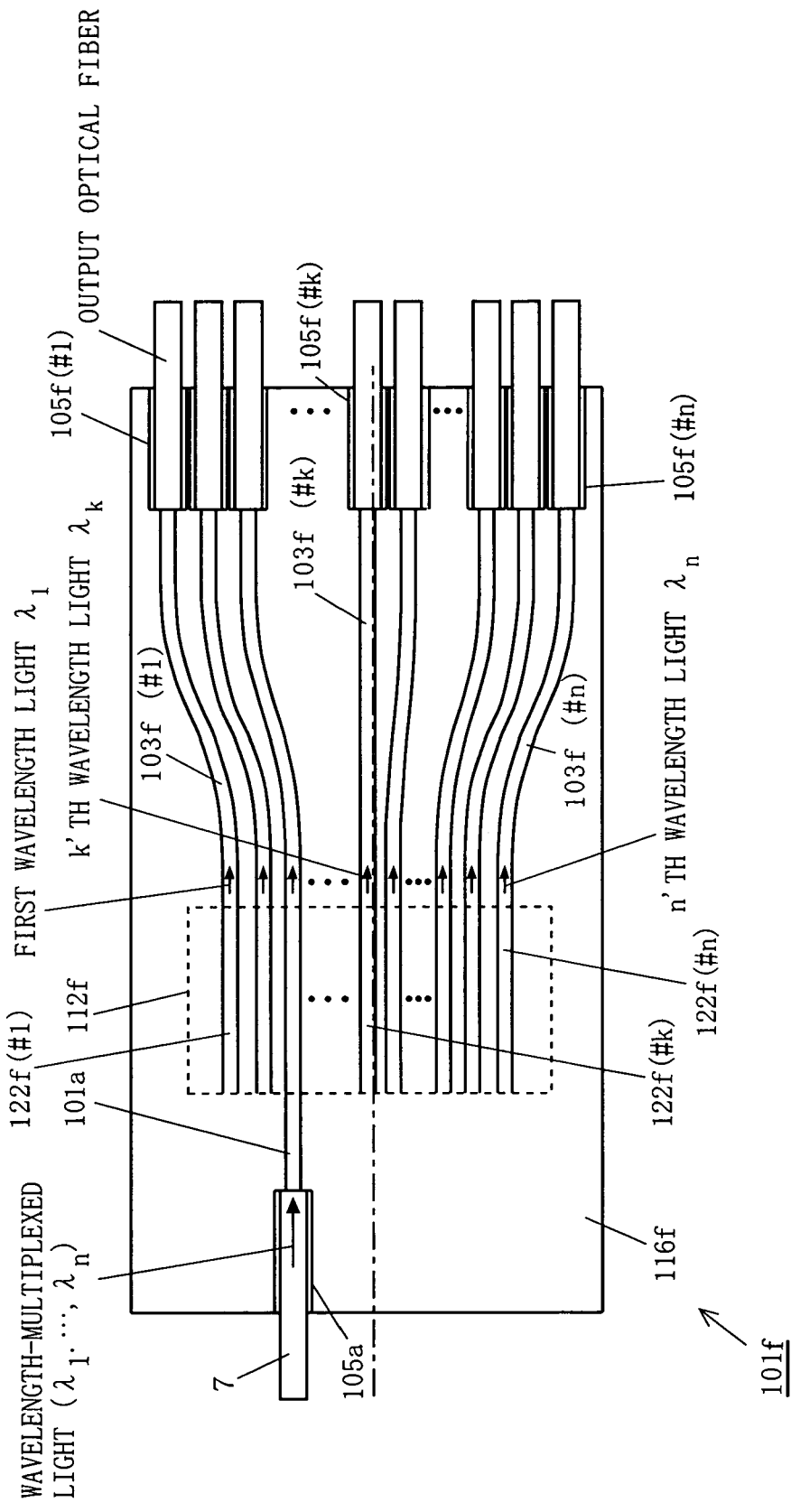
FIG. 12 is a diagram schematically illustrating the structure of an optical demultiplexer 101f including n parallel single-mode waveguides $122_{f-1}$ through $122_{f-n}$, instead of including a multi-mode waveguide 102f of the optical demultiplexer 100f according to the seventh embodiment.

Similar to the fifth embodiment where two parallel single-mode waveguides 112d and 122d are used instead of using the multi-mode waveguide 102a of the optical demultiplexer 100a according to the first embodiment, the multi-mode waveguide 102f may be replaced with n parallel single-mode waveguides. FIG. 12 is a diagram schematically illustrating the structure of an optical demultiplexer 101f including n parallel single-mode waveguides $122_{f\text{-}1}$ through $122_{f\text{-}n}$, instead of including the multi-mode waveguide 102f of the optical demultiplexer 100f according to the seventh embodiment. In FIG. 12, the optical demultiplexer 101f includes single-mode waveguides $122_{f\text{-}1}$ through $122_{f\text{-}n}$ which form a high-order multi-mode propagation portion 112f, and other elements of the optical demultiplexer 101f are similar to elements of the optical demultiplexer 100f illustrated in FIG. 11.

In the seventh embodiment, similar to the second embodiment, the output waveguide may be provided in such a position that a loss of a wavelength to be cut off is maximized, i.e., the extinction ratio is maximized.

(Eighth Embodiment)

Figure 13:
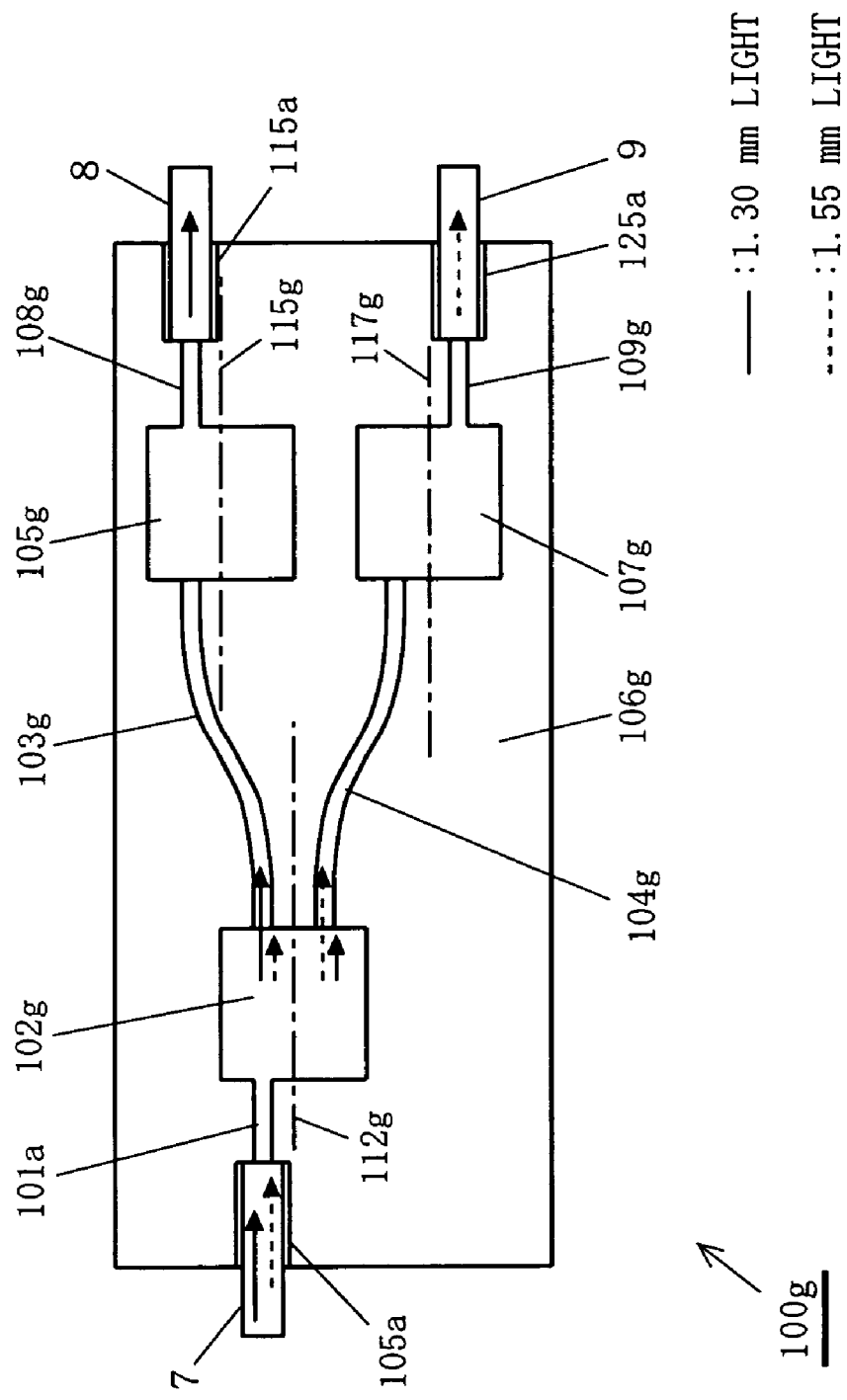
FIG. 13 is a diagram schematically illustrating the structure of an optical demultiplexer 100g according to an eighth embodiment of the present invention.

FIG. 13 is a diagram schematically illustrating the structure of an optical demultiplexer 100g according to an eighth embodiment of the present invention. In FIG. 13, elements having similar functions to those of the optical demultiplexer 100*a* shown in FIG. 1 are denoted by the same reference numerals, and the descriptions thereof are omitted.

In FIG. 13, the optical demultiplexer 100*g* includes: an input waveguide 101*a*; a first multi-mode waveguide 102*g*; a first relay waveguide 103*g*; a second relay waveguide 104*g*; a second multi-mode waveguide 105*g*; a third multi-mode waveguide 107*g*; a first output waveguide 108*g*; a second output waveguide 109*g*; a substrate 106*g* for securing the above waveguides; and V-grooves 105*a*, 115*a*, and 125*a*.

The first multi-mode waveguide 102*g*, the second multi-mode waveguide 105*g*, and the third multi-mode waveguide 107*g* have a function and an optical path length similar to those of the multi-mode waveguide 102*a* according to the first embodiment.

The first relay waveguide 103*g* runs between the first multi-mode waveguide 102*g* and the second multi-mode waveguide 105*g*. The input end of the first relay waveguide 103*g* is optically coupled to a 1.30 µm wavelength output end of the first multi-mode waveguide 102*g*. This output end is located in a position similar to the position of the output end of the multi-mode waveguide 102*a* from which light of a wavelength of 1.30 µm is outputted as described in the first embodiment. On the other hand, the output end of the first relay waveguide 103*g* is optically coupled to the second multi-mode waveguide 105*g* in such a position that the optical axis of the first relay waveguide 103*g* becomes offset from a center line 115*g* of the second multi-mode waveguide 105*g*.

The second relay waveguide 104*g* runs between the first multi-mode waveguide 102*g* and the third multi-mode waveguide 107*g*. The input end of the second relay waveguide 104*g* is optically coupled to a 1.55 µm wavelength output end of the first multi-mode waveguide 102*g*. This output end is located in a position similar to the position of the output end of the multi-mode waveguide 102*a* from which light of a wavelength of 1.55 µm is outputted as described in the first embodiment. On the other hand, the output end of the second relay waveguide 104*g* is optically coupled to the third multi-mode waveguide 107*g* in such a position that the optical axis of the second relay waveguide 104*g* becomes offset from a center line 117*g* of the third multi-mode waveguide 107*g*.

The first output waveguide 108*g* is operable to relay light of a wavelength of 1.30 µm from the second multi-mode waveguide 105*g* to a first output optical fiber 8. The input end of the first output waveguide 108*g* is optically coupled to a 1.30 µm wavelength output end of the second multi-mode waveguide 105*g*. This output end is located in a position similar to the position of the output end of the multi-mode waveguide 102*a* from which light of a wavelength of 1.30 µm is outputted as described in the first embodiment.

The second output waveguide 109*g* is operable to relay light of a wavelength of 1.55 µm from the third multi-mode waveguide 107*g* to a second output optical fiber 9. The input end of the second output waveguide 109*g* is optically coupled to a 1.55 µm wavelength output end of the third multi-mode waveguide 107*g*. This output end is located in a position similar to the position of the output end of the multi-mode waveguide 102*a* from which light of a wavelength of 1.55 µm is outputted as described in the first embodiment.

As described above, in a multi-stage demultiplexer according to the eighth embodiment, the output from the first multi-mode waveguide 102*g* is inputted to the second multi-mode waveguide 105*g* and further inputted to the third multi-mode waveguide 107*g*. Accordingly, the extinction ratio between wavelengths of 1.30 µm and 1.55 µm is further enhanced in the second and third multi-mode waveguides 105*g* and 107*g*. Thus, it is possible to provide an optical demultiplexer capable of enhancing the extinction ratio as compared to the optical demultiplexer 10*a* according to the first embodiment.

Note that although a three-stage multi-mode waveguide is able to obtain a higher extinction ratio than a two-stage multi-mode waveguide, the entire optical path is lengthened, resulting in an increase in loss of light. Thus, the number of stages of the multi-mode waveguides should be determined in accordance with whether the prime importance is placed on a reduction in loss of light or on an enhancement of the extinction ratio.

No light of a wavelength of 1.55 µm is required to be outputted from the second multi-mode waveguide 105*g*, and no light of a wavelength of 1.30 µm is required to be outputted from the third multi-mode waveguide 107*g*. Accordingly, as is apparent from FIG. 13, no waveguides for outputting such light are provided in the optical demultiplexer 100*g*.

In the case of enhancing the extinction ratio, the first relay waveguide 103*g* may be optically coupled to the first output optical fiber 8 via a filter, which allows only light of a wavelength in the neighborhood of 1.30 µm to transmit therethrough, rather than the second multi-mode waveguide 105*g*, and the second relay waveguide 104*g* maybe optically coupled to the second output optical fiber 9 via a filter, which allows only light of a wavelength in the neighborhood of 1.55 µm to transmit therethrough, rather than the third multi-mode waveguide 107*g*.

Note that in the optical demultiplexer as described in the first through eighth embodiments, the modal dispersion and chromatic dispersion are fixed in a multi-mode propagation portion. That is, a refractive index of the multi-mode propagation portion is kept constant. However, a multi-mode propagation portion having a variable refractive index may be used.

Figure 14:
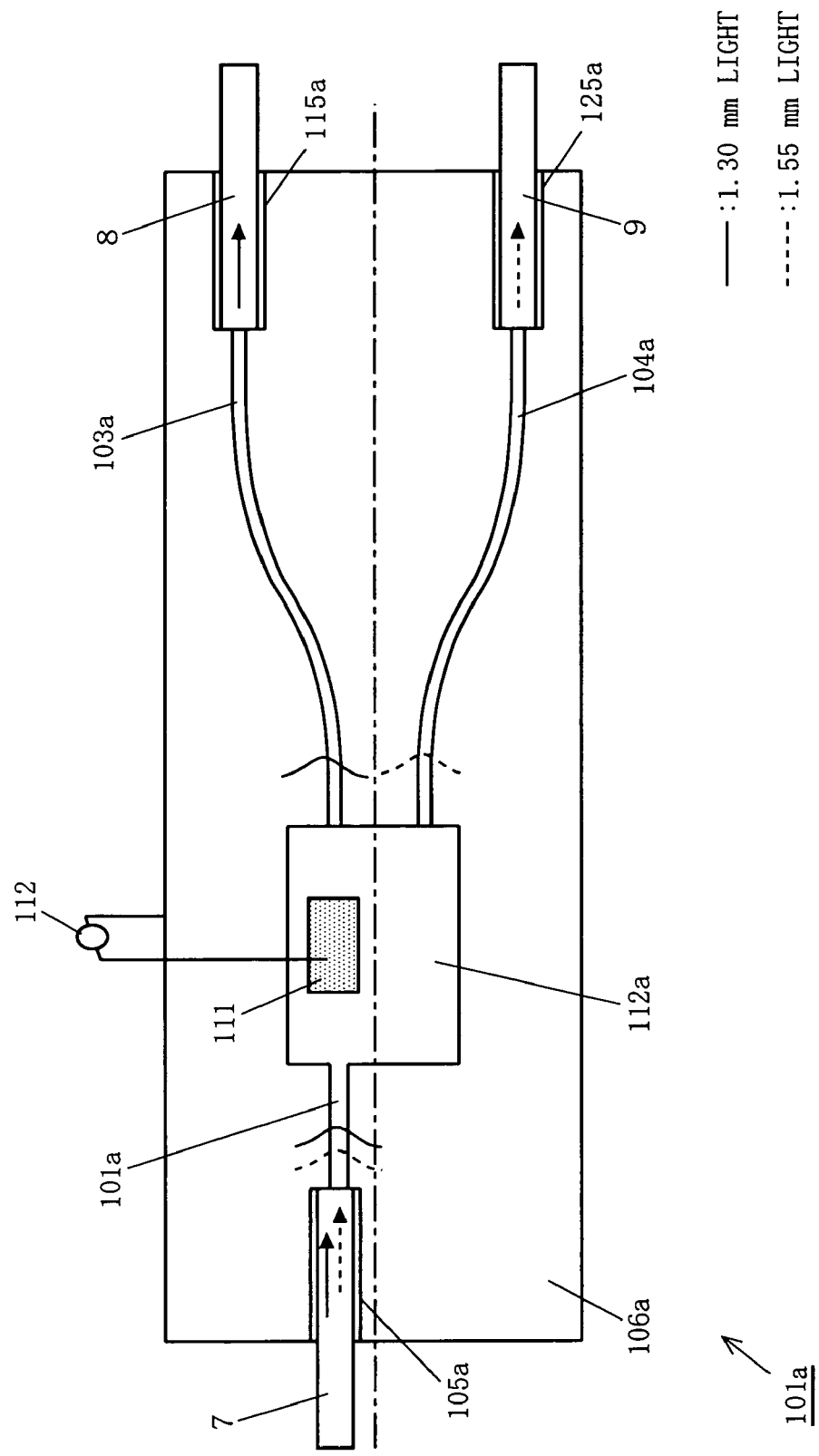
FIG. 14 is a diagram schematically illustrating the structure of an optical demultiplexer 101a in an exemplary case where a refractive index of a multi-mode propagation portion is changed by applying an electro-optic effect.

FIG. 14 is a diagram schematically illustrating the structure of an optical demultiplexer 101*a* in an exemplary case where a refractive index of a multi-mode propagation portion is changed by applying an electro-optic effect. In the optical demultiplexer 101*a* illustrated in FIG. 14, a material having an electro-optic effect is used as a core material of a multi-mode waveguide 112*a*, and two electrodes 111 are provided on front and back faces of an upper portion of the multi-mode waveguide 112*a* (in FIG. 14, only an electrode 111 provided on the front face is shown). A voltage applied to the electrodes 111 is controlled by a voltage control section 112 provided outside the optical demultiplexer 101*a*. Accordingly, the refractive index of the multi-mode waveguide 112*a* can be arbitrarily changed on a real-time basis, and therefore the extinction ratio at wavelengths of 1.30 µm and 1.55 µm can be dynamically controlled. Note that the distribution of the refractive index of the multi-mode waveguide 112*a* can be changed by changing the shape and positions of the electrodes 111 provided on the multi-mode waveguide 112*a*. The positions of the electrodes 111 are not limited to the front and back faces in the upper portion of the multi-mode waveguide 112*a* as shown in FIG. 14. The electrodes 111 may be provided on front and back faces in a lower portion of the multi-mode waveguide 112*a* or may provided on the front face in the upper and lower portions of the multi-mode waveguide 112*a*. That is, the electrodes 111 can be provided in any positions on the multi-mode waveguide 112a so long as the refractive index of the multi-mode waveguide 112a can be changed.

Figure 15:
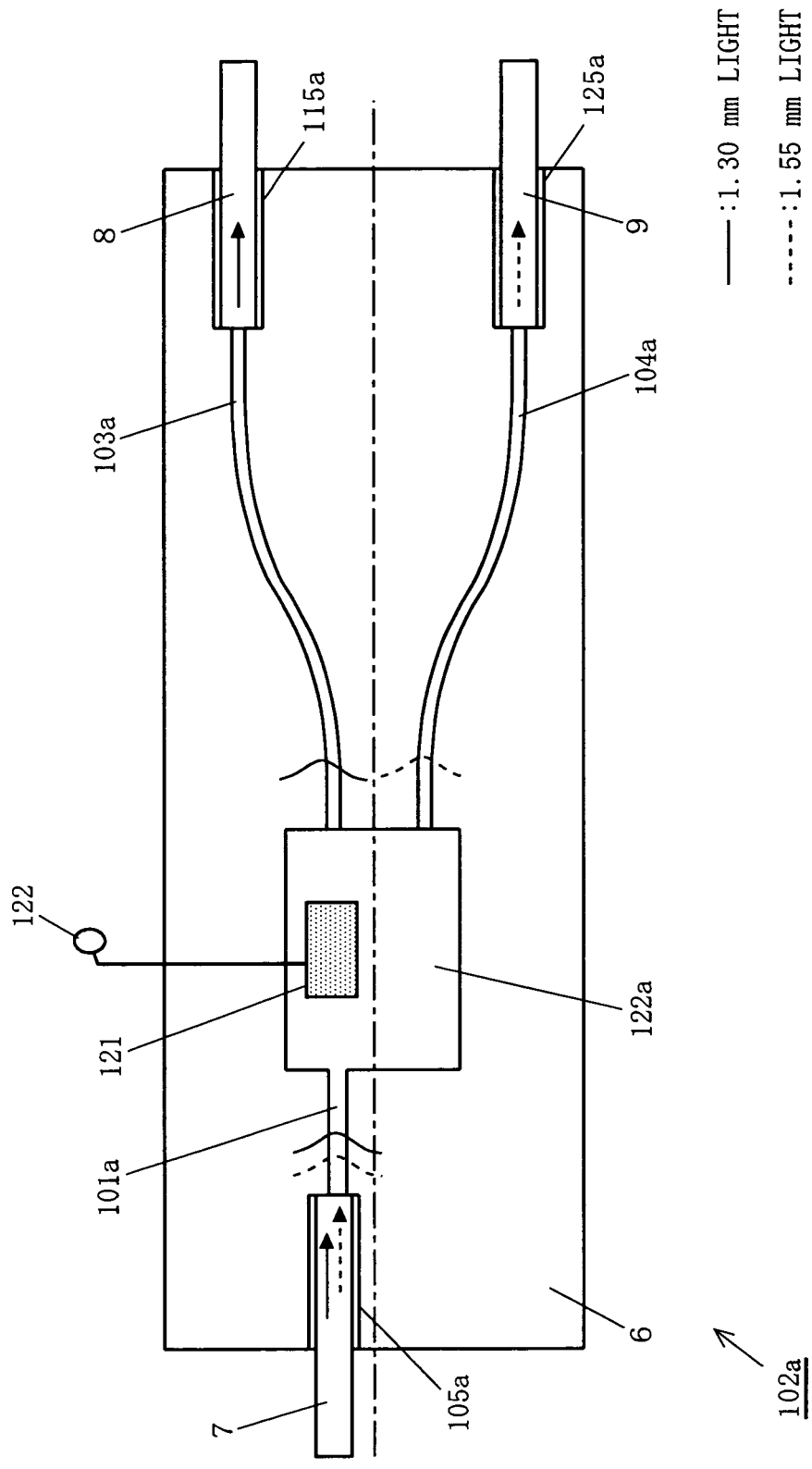
FIG. 15 is a diagram schematically illustrating the structure of an optical demultiplexer 102a in an exemplary case where a refractive index of a multi-mode propagation portion is changed by applying a thermo-optic effect.

FIG. 15 is a diagram schematically illustrating the structure of an optical demultiplexer 102a in an exemplary case where a refractive index of a multi-mode propagation portion is changed by applying a thermo-optic effect. In the optical demultiplexer 102a illustrated in FIG. 15, a material having a thermo-optic effect is used as a core material of a multi-mode waveguide 122a, and a heat conducting portion 121 is provided on a front face in the upper portion of the multi-mode waveguide 122a. A temperature control section 122 provided outside the optical demultiplexer 102a supplies heat to the heat conducting portion 121 so as to control the temperature of heat conducted from the heat conducting portion 121 to the multi-mode waveguide 122a. Accordingly, the refractive index of the multi-mode waveguide 122a can be arbitrarily changed on a real-time basis, and therefore the extinction ratio at wavelengths of 1.30 μm and 1.55 μm can be dynamically controlled. In an alternative manner of heat control, a Peltier device is provided on the multi-mode waveguide 122a, and a current is applied to the Peltier device so as to control the temperature of the multi-mode waveguide 122a. Note that the distribution of the refractive index of the multi-mode waveguide 122a can be changed by changing the shapes and positions of the heat conducting portion 121 and the Peltier device on the multi-mode waveguide 122a. The positions of the heat conducting portion 121 and the Peltier device are not limited to the front face in the upper portion of the multi-mode waveguide 122a as shown in FIG. 15. The heat conducting portion 121 and the Peltier device may be provided on the back face in the upper portion of the multi-mode waveguide 122a or may be provided on the front or back face in the lower portion or the entire front or back face of the multi-mode waveguide 122a. That is, the heat conducting portion 121 and the Peltier device can be provided in any position on the multi-mode waveguide 122a so long as the refractive index of the multi-mode waveguide 122a can be changed.

Similarly, in the case where a plurality of parallel single-mode waveguides are used instead of using the multi-mode waveguide, by using a material having an electro-optic or thermo-optic effect as the core material of the single-mode waveguides, an effect similar to that described above in conjunction with FIG. 14 or 15 can be achieved.

In the eighth embodiment, similar to the second embodiment, the output waveguide may be provided in such a position that a loss of a wavelength to be cut off is maximized, i.e., the extinction ratio is maximized.

Further, it is possible to provide a compact optical demultiplexer by applying the principle of the optical demultiplexer described in the third through sixth embodiment and the eighth embodiment to separation of n types of wavelengths.

Hereinbelow, embodiments of an optical multiplexer of the present invention will be described. Note that the optical multiplexer is structured so as to function in a manner opposite to the above-described demultiplexers, and because of the reversibility of light, the behavior of light in the optical multiplexer simply becomes opposite to the behavior of light described in the above embodiments. Accordingly, in the following ninth through twelfth embodiments, elements of optical multiplexers are described in brief, rather than in detail, with reference to drawings schematically illustrating structures of the optical multiplexers.

(Ninth Embodiment)

Figure 16:
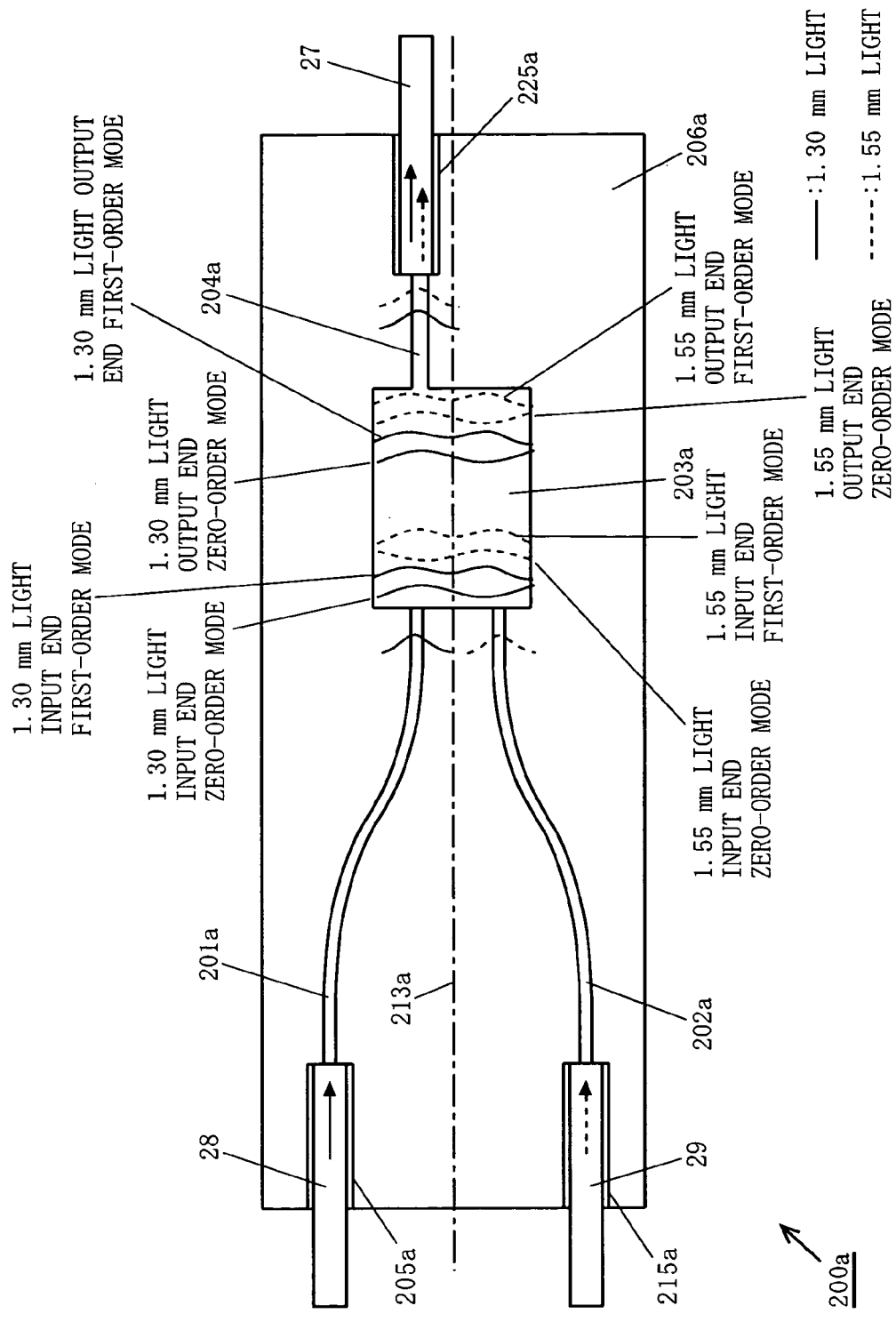
FIG. 16 is a diagram schematically illustrating the structure of an optical multiplexer 200a according to a ninth embodiment of the present invention.

FIG. 16 is a diagram schematically illustrating the structure of an optical multiplexer 200a according to a ninth embodiment of the present invention. The optical multiplexer 200a is structured so as to function in a manner opposite to the optical demultiplexer 100a according to the first embodiment.

In FIG. 16, the optical multiplexer 200a includes: a first input waveguide 201a; a second input waveguide 202a; a multi-mode waveguide 203a; an output waveguide 204a; a substrate 206a for securing the above waveguides; a V-groove 205a for securing a first input optical fiber 28; a V-groove 215a for securing a second input optical fiber 29; and a V-groove 225a for securing an output optical fiber 27.

In the case where a phase difference between zero- and first-order modes at a wavelength of 1.30 μm is $\theta_1$ and a phase difference between zero- and first-order modes at a wavelength of 1.55 μm is $\theta_2$, similar to the multi-mode waveguide 102a of the optical demultiplexer 100a, the multi-mode waveguide 203a has such an optical path length as to cause a difference between $\theta_1$ and $\theta_2$ to become substantially an integral multiple of $\pi$.

The first and second input waveguides 201a and 202a are provided on the substrate 206a in opposite positions with respect to a center line 213a of the multi-mode waveguide 203a. The output waveguide 204a is positioned such that the optical axis thereof becomes offset from the center line 213a of the multi-mode waveguide 203a. The optical multiplexer 200a is structured in a manner opposite to the optical demultiplexer 100a in that the optical multiplexer 200a includes two waveguides in the input side and one waveguide in the output side, while the optical demultiplexer 100a includes one waveguide in the input side and two waveguides in the output side. Thus, the optical multiplexer 200a functions in a manner opposite to the optical demultiplexer 10a.

In the multi-mode waveguide 203a, light of a wavelength of 1.30 μm, which has entered the first input waveguide 201a via the first input optical fiber 28, is divided into light under the zero- and first-order modes. Similarly, in the multi-mode waveguide 203a, light of a wavelength of 1.55 μm, which has entered the second input waveguide 202a via the second input optical fiber 29, is divided into light under the zero- and first-order modes. Due to mode interference caused in the multi-mode waveguide 203a, both the powers of the light of wavelengths of 1.30 μm and 1.55 μm are maximized at the output end of the multi-mode waveguide 203a (i.e., the input end of the output waveguide 204a). Wavelength-multiplexed light obtained by the output waveguide 203a is inputted to the output optical fiber 27 via the output waveguide 204a.

As described above, in the ninth embodiment, in the case where a phase difference between the zero- and first-order modes at a wavelength of 1.30 μm is $\theta_1$ and a phase difference between the zero- and first-order modes at a wavelength of 1.55 μm is $\theta_2$, the optical multiplexer 200a is provided with the multi-mode waveguide 203a which has such an optical path length as to cause a difference between $\theta_1$ and $\theta_2$ to become substantially an integral multiple of $\pi$. Further, the output waveguide 204a is connected to the multi-mode waveguide 203a in such a position that the optical axis thereof becomes offset from the center line 213a of the multi-mode waveguide 203a, and the first and second input waveguides 201a and 202a are provided in opposite positions with respect to the center line 213a. Thus, it is possible to combine light of wavelengths of 1.30 μm and 1.55 μm. The optical multiplexer according to the ninth embodiment is simply structured with the multi-mode optical waveguide, and therefore can be provided at low cost.

As is apparent from the above description, it is understood that the optical demultiplexer 100a described in the first embodiment can be configured to function as an optical multiplexer. Accordingly, an optical multiplexer according to the present invention can be configured to function as a multi-demultiplexer capable of separating and combining a plurality of wavelengths.

In the case of the multiplexer, the performance thereof is determined by a transmission loss of light since it is not necessary to consider the extinction ratio. Accordingly, it is optimum to connect two input waveguides to the multi-mode waveguide at positions where corresponding wavelengths are maximized, such that the light power extremum inversion condition is completely satisfied.

(Tenth Embodiment)

Figure 17:
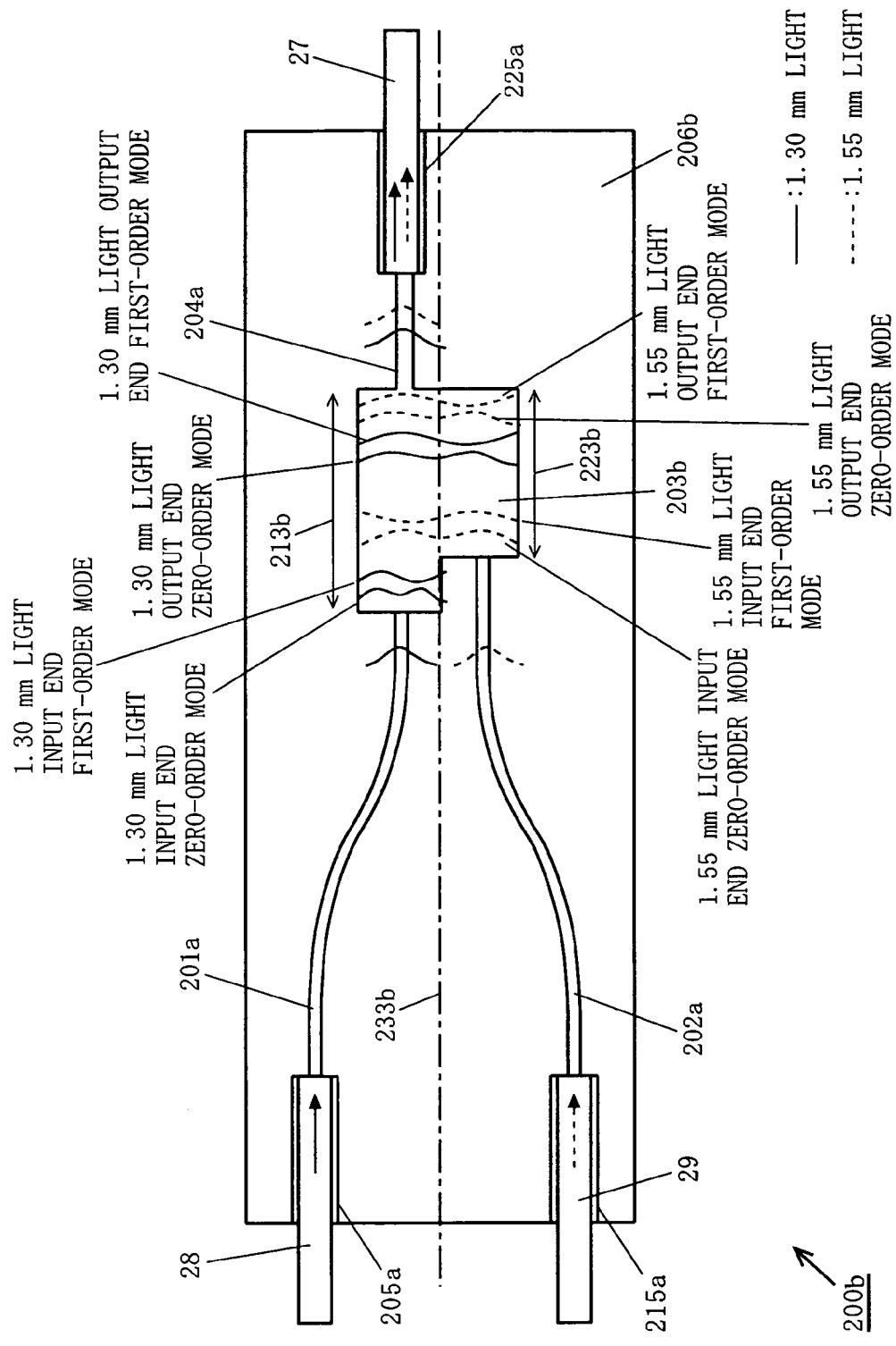
FIG. 17 is a diagram schematically illustrating the structure of an optical multiplexer 200b according to a tenth embodiment of the present invention.

FIG. 17 is a diagram schematically illustrating the structure of an optical multiplexer 200b according to a tenth embodiment of the present invention. In FIG. 17, elements having similar functions to those of the optical multiplexer 200a according to the ninth embodiment are denoted by the same reference numerals, and the descriptions thereof are omitted. The optical multiplexer 200b is structured so as to function in a manner opposite to the optical demultiplexer 100b according to the third embodiment.

In FIG. 17, the optical multiplexer 200b includes: a first input waveguide 201a; a second input waveguide 202a; a multi-mode waveguide 203b (which includes optical paths having different lengths); an output waveguide 204a; a substrate 206b for securing the above waveguides; and V-grooves 205a, 215a and 225a.

The multi-mode waveguide 203b includes a first optical path length portion 213b and a second optical path length portion 223b. The first optical path length portion 213b has a characteristic similar to that of the first optical path length portion 112b of the optical demultiplexer 100b according to the third embodiment. The first optical path length portion 213b causes mode interference of light of a wavelength of 1.30 μm inputted via the first input waveguide 201a, such that the power of such light is maximized at the output end of the multi-mode waveguide 203b (i.e., a location offset from the center line 233b).

The second optical path length portion 223b has a characteristic similar to that of the second optical path length portion 122b of the optical demultiplexer 100b according to the third embodiment. The second optical path length portion 223b causes mode interference of light of a wavelength of 1.55 μm inputted via the second input waveguide 202a, such that the power of such light is maximized at the output end of the multi-mode waveguide 203b (i.e., a location offset from the center line 233b).

As described above, the tenth embodiment uses the multi-mode waveguide 203b having an optical length, which can be less than or equal to 5000 μm as described in the third embodiment, whereby it is possible to provide a compact optical multiplexer.

As in the case of the third embodiment, in the tenth embodiment, the multi-mode waveguide 203b may be structured by two single-mode waveguides placed in parallel to each other (see FIGS. 8 and 9).

(Eleventh Embodiment)

Figure 18:
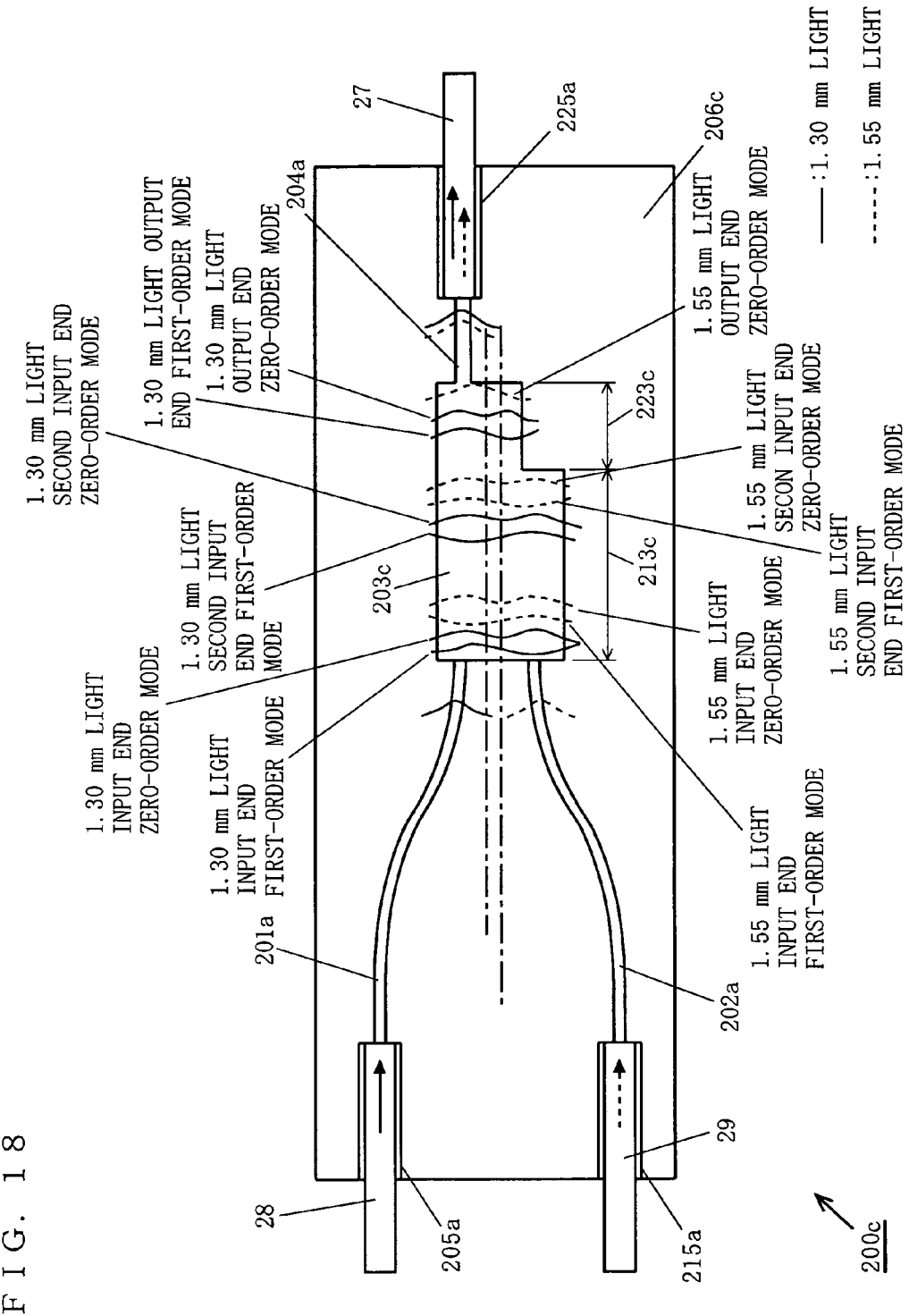
FIG. 18 is a diagram schematically illustrating the structure of an optical multiplexer 200c according to an eleventh embodiment of the present invention.

FIG. 18 is a diagram schematically illustrating the structure of an optical multiplexer 200c according to an eleventh embodiment of the present invention. In FIG. 18, elements having similar functions to those of the optical multiplexer 200a according to the ninth embodiment are denoted by the same reference numerals, and the descriptions thereof are omitted. The optical multiplexer 200c is structured so as to function in a manner opposite to the optical demultiplexer 100c according to the fourth embodiment.

In FIG. 18, the optical multiplexer 200c includes: a first input waveguide 201a; a second input waveguide 202a; a multi-mode waveguide 203c (which includes a plurality of stages); an output waveguide 204a; a substrate 206c for securing the above waveguides; and V-grooves 205a, 215a and 225a.

The multi-mode waveguide 203c includes a first multi-mode region 213c and a second multi-mode region 223c. The first multi-mode region 213c has a characteristic similar to that of the second multi-mode region 122c of the multi-mode waveguide 102c included in the optical demultiplexer 100c according to the fourth embodiment. That is, the first multi-mode region 213c causes mode interference of light of a wavelength of 1.55 μm inputted via the second input waveguide 202a, such that the power of such light is maximized at the interface with the multi-mode region 223c.

The second multi-mode region 223c has a characteristic similar to that of the first multi-mode region 112c of the multi-mode waveguide 102c included in the optical demultiplexer 100c according to the fourth embodiment. That is, the second multi-mode region 223c causes mode interference of only light of a wavelength of 1.30 μm, such that the power of such light is maximized at the output end face (i.e., the input end of the output waveguide 204a).

As described above, the eleventh embodiment uses the multi-mode waveguide 203c including a plurality of stages, and therefore as in the case of the fourth embodiment, it is possible to provide a compact optical multiplexer.

Further, as in the case of the fourth embodiment, in the eleventh embodiment, the multi-mode waveguide 203c may be structured by two single-mode waveguides placed in parallel to each other (see FIG. 10).

(Twelfth Embodiment)

Figure 19:
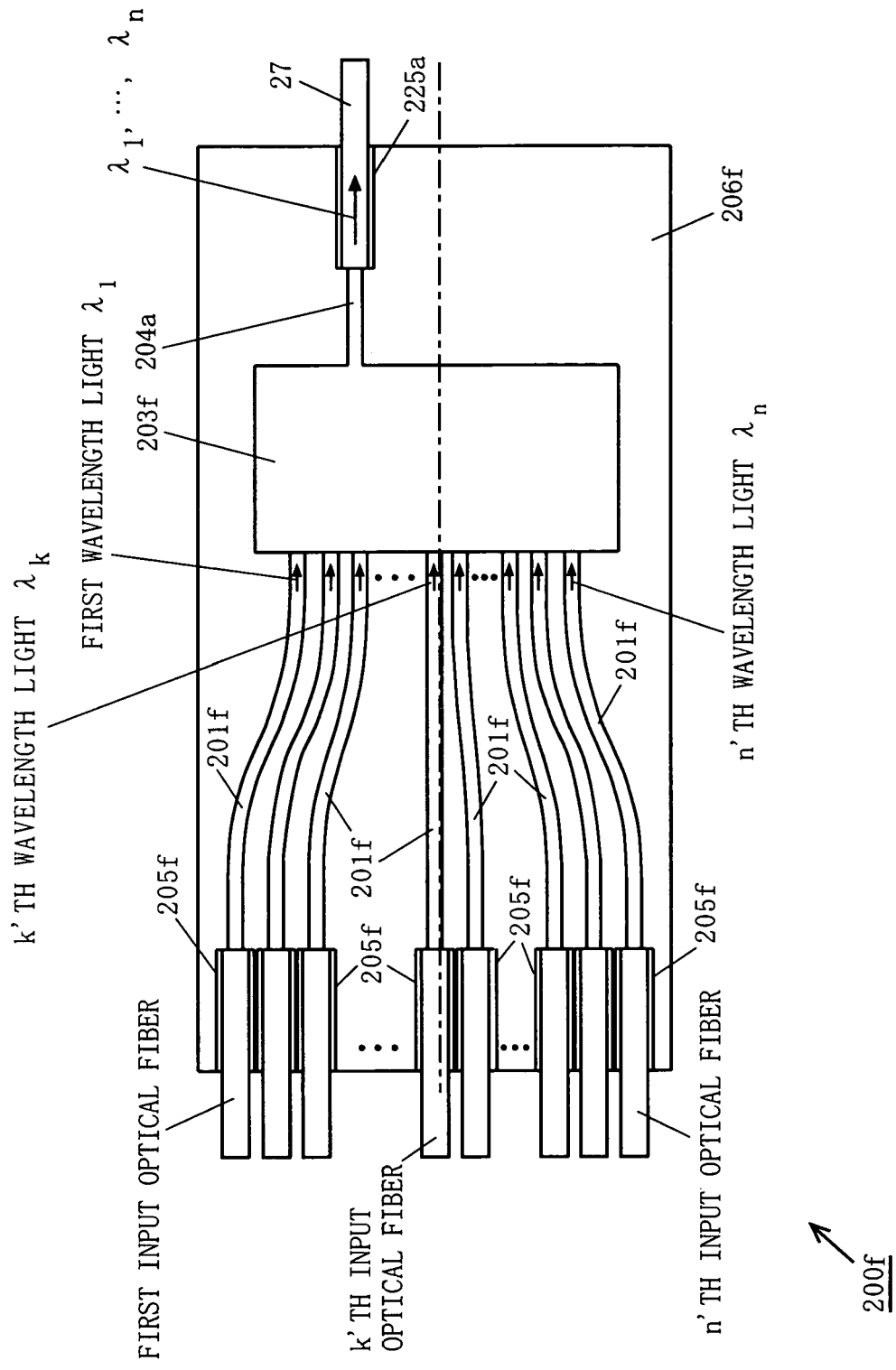
FIG. 19 is a diagram schematically illustrating the structure of an optical multiplexer 200f according to a twelfth embodiment of the present invention.

FIG. 19 is a diagram schematically illustrating the structure of an optical multiplexer 200f according to a twelfth embodiment of the present invention. In FIG. 19, elements having similar functions to those of the optical multiplexer 200a according to the ninth embodiment are denoted by the same reference numerals, and the descriptions thereof are omitted. The optical multiplexer 200f is structured so as to function in a manner opposite to the optical demultiplexer 100f according to the seventh embodiment.

In FIG. 19, the optical multiplexer 200f includes: n input waveguides 201f; a high-order multi-mode waveguide 203f; an output waveguide 204a; a substrate 206f for securing the above waveguides; and n V-grooves 205f; and a V-groove 225a. In FIG. 19, for clarity of illustration, the input waveguides 201f and the V-grooves 205f are not shown in their entirety.

The high-order multi-mode waveguide 203f has a characteristic similar to that of the multi-mode waveguide 102f of the optical demultiplexer 100f according to the seventh embodiment.

Thus, according to the twelfth embodiment, it is possible to provide a multiplexer capable of combining light of n types of wavelengths $\lambda_1, \ldots, \lambda_n$ inputted from first through n'th input optical fibers.

Figure 20:
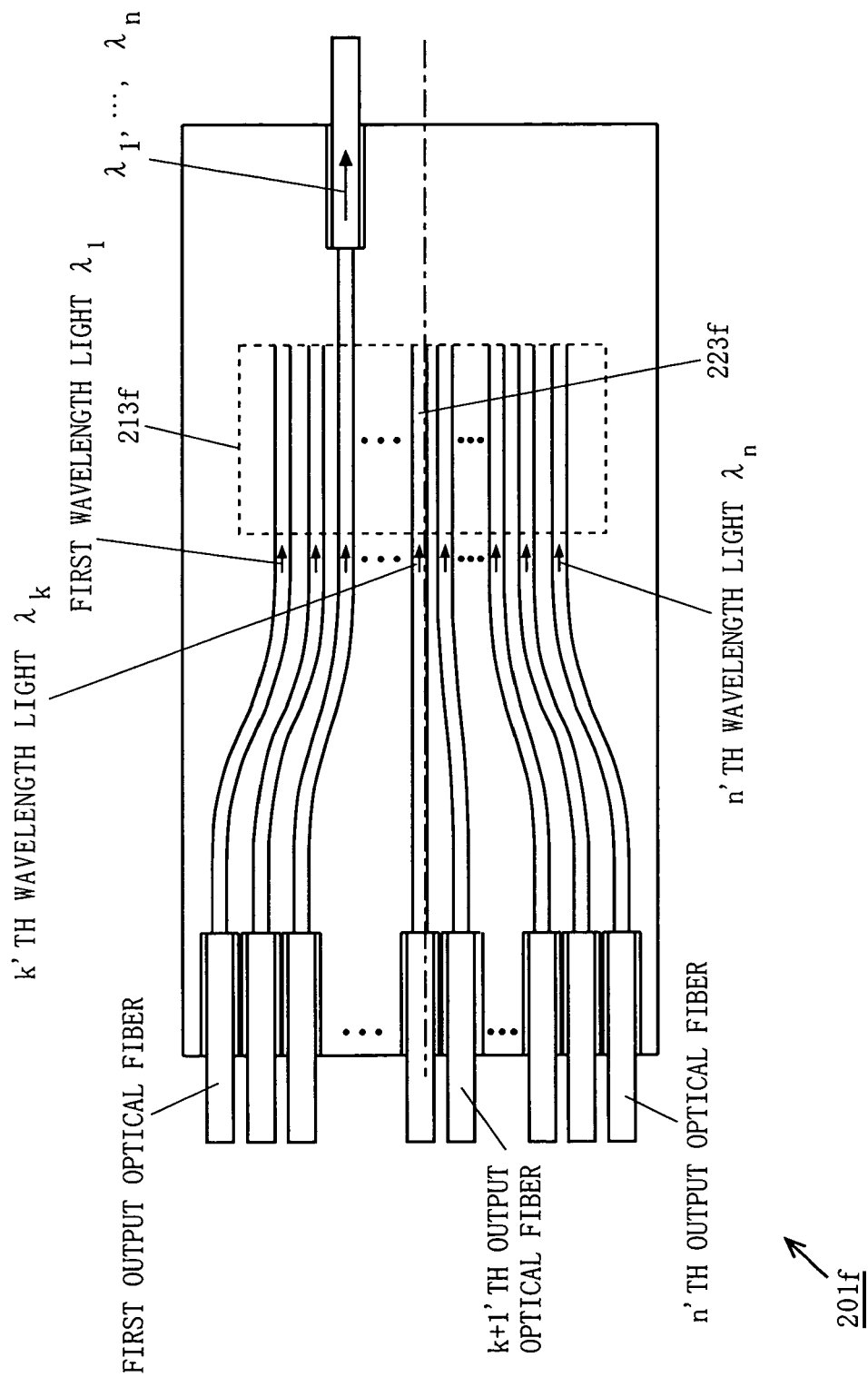
FIG. 20 is a diagram schematically illustrating the structure of an optical multiplexer 201f including a high-order multi-mode propagation portion 213f consisting of n single-mode waveguides 223f.

Note that a high-order multi-mode propagation portion may be used as a coupler including single-mode waveguides. FIG. 20 is a diagram schematically illustrating the structure of an optical multiplexer 201f including a high-order multi-mode propagation portion 213f consisting of n single-mode waveguides 223f. The optical multiplexer 201f operates in a manner opposite to the optical demultiplexer 101f illustrated in FIG. 12, and therefore the principle of the operation of the optical multiplexer 201f is readily understood by considering that light in the optical multiplexer 201f behaves in a manner opposite to the behavior of light in the optical demultiplexer 101f.

As in the case of the demultiplexer, the principle of the optical multiplexer as shown in FIGS. 16–18, as well as in FIGS. 19 and 20, may be applied to an n-wavelength optical multiplexer. In such a case, it is apparent that the multi-mode waveguide may be used as a coupler including single-mode waveguides.

It is also apparent that the above-mentioned n-wavelength optical demultiplexer can be configured to function as an optical multi-demultiplexer.

Further, the optical demultiplexer illustrated in FIG. 13 may be applied to an optical multi-demultiplexer. In such case, a first multi-mode waveguide is provided to one of two input ends of the multi-mode waveguide, and a second multi-mode waveguide is provided to the other input end.

Figure 21:
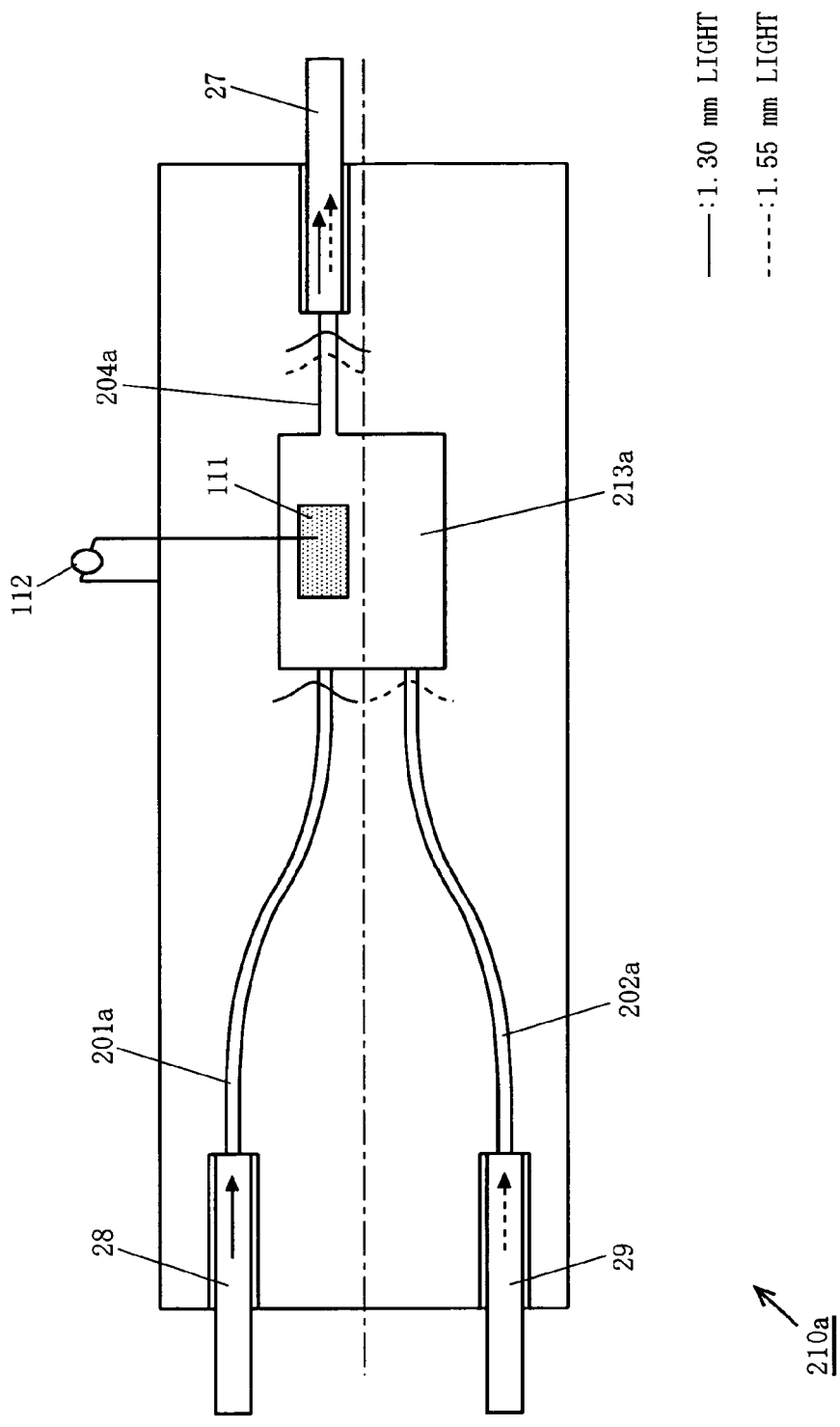
FIG. 21 is a diagram schematically illustrating the structure of an optical multiplexer 210a in an exemplary case where a refractive index of a multi-mode propagation portion is changed by applying an electro-optic effect.

Note that as in the case of an optical multiplexer 210a illustrated in FIG. 21, a multi-mode waveguide 213a may be formed of a material having an electro-optic effect, such that the refractive index of the multi-mode waveguide 213a can be changed by a voltage control section 112 and electrodes 111 so as to dynamically control a ratio between wavelengths in multiplexed light. The voltage control section 112 and the electrodes 111 are the same as those described in conjunction with FIG. 14.

Alternatively, the refractive index may be changed by providing an external electric field control section for applying an external electric field to the multi-mode waveguide, rather than providing the voltage control section.

Figure 22:
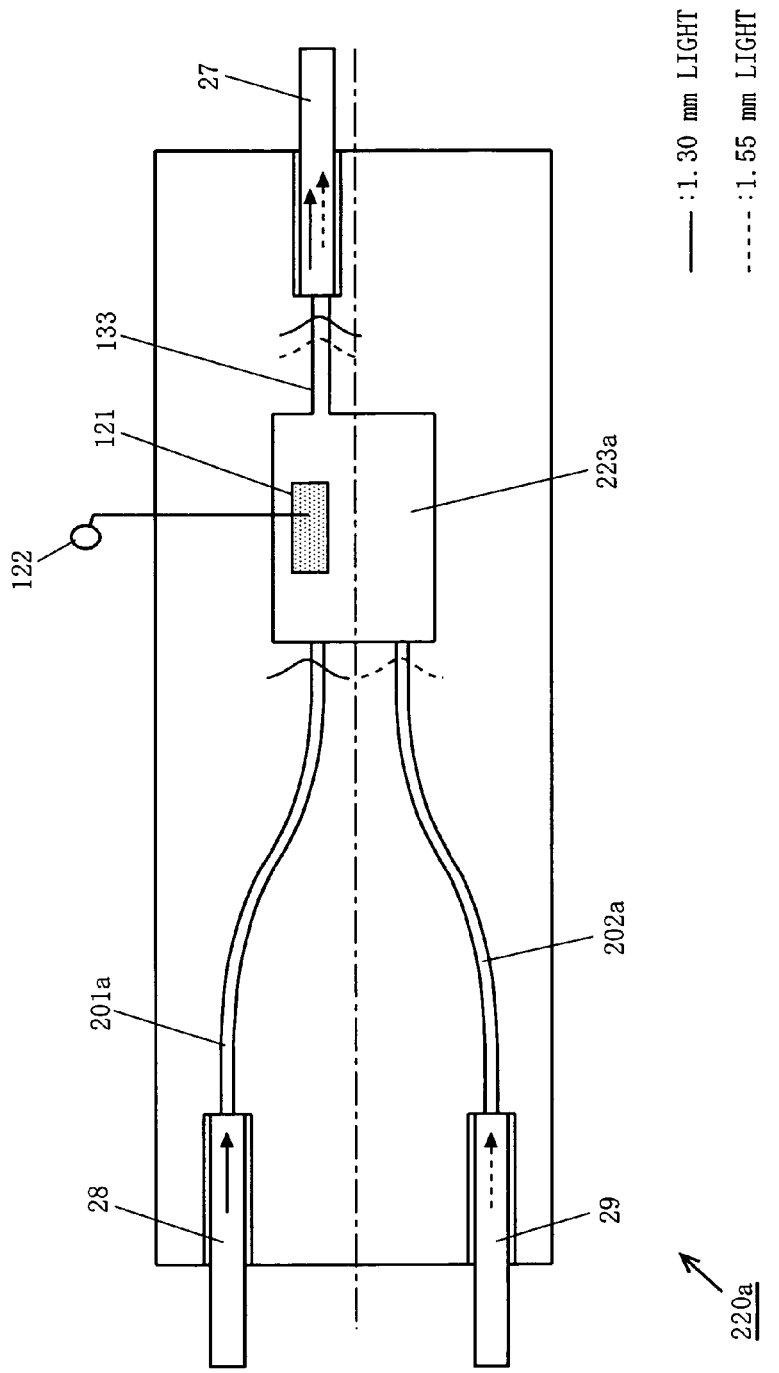
FIG. 22 is a diagram schematically illustrating the structure of an optical multiplexer 220a in an exemplary case where a refractive index of a multi-mode propagation portion is changed by applying a thermo-optic effect.

Further, as in the case of an optical multiplexer 220a illustrated in FIG. 22, a multi-mode waveguide 223a may be formed of a material having a thermo-optic effect, such that the refractive index of the multi-mode waveguide 223a can be changed by a temperature control section 122 and a heat conducting portion 121 so as to dynamically control a ratio between wavelengths in multiplexed light. The temperature control section 122 and the heat conducting portion 121 are the same as those described in conjunction with FIG. 15.

Hereinbelow, embodiments of an optical device including the optical demultiplexer and optical multiplexer as described in the above embodiments will be described.

(Thirteenth Embodiment)

FIG. 23 is a diagram schematically illustrating the structure of a WDM gain adjuster 300a according to a thirteenth embodiment of the present invention. In FIG. 23, the WDM gain adjuster 300a includes: a demultiplexing section 301a including the same elements as those of the optical demultiplexer 100f illustrated in FIG. 11; a multiplexing section 302a including the same elements as those of the optical multiplexer 200f illustrated in FIG. 19; n gain adjusting sections 303a; a substrate 306a for securing the above elements; and V-grooves 105a and 206f. In FIG. 23, powers of light of given wavelengths in principal parts of the WDM gain adjuster 300a are shown, and elements having functions similar to functions of the optical demultiplexer 100f and the optical multiplexer 200f are denoted by the same reference numerals.

The demultiplexing section 301a includes an input waveguide 101a, a multi-mode waveguide 102f, and n input relay waveguides 311a. The multiplexing section 302a includes n output relay waveguides 312a, a multi-mode waveguide 203f, and an output waveguide 204a.

Each gain adjusting section 303a performs gain adjustment such that the power of light at each wavelength inputted from the input relay waveguides 311a of the demultiplexing section 301a becomes constant, and then supplies the light to the output relay waveguide 312a.

Specifically, n types of WDM wavelengths in an optical signal are entirely separated from each another, and combined back into the state of WDM transmission after gain adjustment is performed for each wavelength. In this manner, gains at the n types of wavelengths, which become uneven during transmission, are adjusted, thereby correcting the optical signal so as to become stable.

Alternatively, dynamic gain adjustment may be performed by providing an external control section for controlling the gain adjuster.

Although the unevenness of gains between wavelengths varies depending on conditions of transmitting an optical signal, it is possible to make a correction so as to constantly obtain a stable optical signal by allowing the demultiplexing section 301a to monitor a gain at each wavelength and dynamically control each gain adjusting section 303a so as to obtain a desired gain for each wavelength.

Alternatively, the gain of each wavelength may be monitored in the multiplexing section 302a. In this case, a correction value is fed back to the gain adjusting section 303a until the output of the multiplexing section 302a reaches a desired gain level. In such a case, an external control section and a monitor section may be provided outside the multiplexing section 302a in order to control each gain adjusting section 303a.

Note that an adjusting means other than the gain adjuster may be provided for adjusting at least one of a gain, a phase, and a polarized status for each wavelength.

Further, the multi-mode waveguide 102f of the demultiplexing section 301a and the multi-mode waveguide 203f of the multiplexing section 302a may be formed by n parallel single-mode waveguides.

(Fourteenth Embodiment)

FIG. 24 is a diagram illustrating the structure of a WDM add/drop 300b according to a fourteenth embodiment of the present invention. In FIG. 24, elements having functions similar to functions of the optical demultiplexer 100a illustrated in FIG. 1 and the optical multiplexer 200a illustrated in FIG. 15 are denoted by the same reference numerals.

In FIG. 24, the WDM add/drop 300b includes: a first input waveguide 101a; a demultiplexer multi-mode waveguide 301b; a relay waveguide 302b; a multiplexer multi-mode waveguide 303b; a drop waveguide 304b; an add waveguide 305b; an output waveguide 204a; a substrate 306b for securing the above elements; V-grooves 105a and 225a; a V-groove 307b for securing a drop optical fiber 37; and a V-groove 308b for securing an add optical fiber 38.

The demultiplexer multi-mode waveguide 301b has a characteristic similar to that of the multi-mode waveguide 102a of the optical demultiplexer 100a according to the first embodiment. The multiplexer multi-mode waveguide 303b has a characteristic similar to that of the multi-mode waveguide 203a of the optical multiplexer 200a according to the eighth embodiment. Alternatively, an optical demultiplexer as described in the second embodiment may be used for separating a desired wavelength so as to cut off other wavelengths as much as possible, thereby preventing an adverse effect from being caused to a device at an output destination.

The relay waveguide 302b is operable to relay, to the multiplexer multi-mode waveguide 303b, light of a wavelength of 1.30 μm outputted by the demultiplexer multi-mode waveguide 301b. The drop waveguide 304b is operable to input, to the drop optical fiber 37, light of a wavelength of 1.55 μm outputted by the demultiplexer multi-mode waveguide 301b. The drop optical fiber 37 guides the light of a wavelength of 1.55 μm to the outside of the WDM add/drop 300b. The add optical fiber 38 guides light from outside into the WDM add/drop 300b. The add waveguide 305b is operable to relay, to the multiplexer multi-mode waveguide 303b, light of a wavelength of 1.55 μm outputted from the add optical fiber 38.

In the WDM add/drop 300b, among WDM wavelengths of 1.30 μm and 1.55 μm, only light of a wavelength of 1.55 μm is guided to the outside of the WDM add/drop 300b via the drop waveguide 304b. After being modulated outside of the WDM add/drop 300b, the light of a wavelength of 1.55 μm is guided through the add waveguide 305b and the multiplexer multi-mode waveguide 303b so as to be combined with the light of a wavelength of 1.30 μm. This allows any element to receive a necessary signal.

In the above description, although the wavelength of 1.55 μm is dropped, a wavelength of 1.30 μm may be dropped.

Further, the input and output optical fibers 7 and 27 may be configured so as to be mutually connected in a loop.

Furthermore, each of the demultiplexer multi-mode waveguide 301b and the multiplexer multi-mode waveguide 303b may be formed by two parallel single-mode waveguides.

(Fifteenth Embodiment)

FIG. 25 is a diagram schematically illustrating a WDM transmitter/receiver module 300c according to a fifteenth embodiment of the present invention. In FIG. 25, elements having functions similar to functions of the optical demultiplexer 100a according to the first embodiment are denoted by the same reference numerals.

In FIG. 25, the WDM transmitter/receiver module 300c includes: a first waveguide 301c; a multi-mode waveguide 302c having a characteristic similar to that of the multi-mode waveguide 102a of the optical demultiplexer 100a illustrated in FIG. 1; a second waveguide 303c; a third waveguide 304c; a 1.30 μm wavelength photodiode 305c connected to the output end of the second waveguide 303c; a 1.55 μm wavelength laser diode 307c connected to the output end of the third waveguide 304c; a 1.55 μm wavelength photodiode 308c; a substrate 306c for securing the above elements; and a V-groove 105a for securing an input/output optical fiber 47.

In the case where a wavelength of 1.30 μm is exclusive for use in a receiver application and a wavelength of 1.55 μm is for use in a receiver/transmitter application, when light of wavelengths of 1.30 μm and 1.55 μm is inputted from the input/output optical fiber 47, the light of wavelengths of 1.30 μm and 1.55 μm is separated into light of a wavelength of 1.30 μm and light of a wavelength of 1.55 μm. The light of a wavelength of 1.30 μm is received by the 1.30 μm wavelength photodiode 305c via the second waveguide 303c. The light of a wavelength of 1.55 μm is received by the 1.55 μm wavelength photodiode 308c via the third waveguide 304c. On the other hand, when the light of a wavelength of 1.55 μm is inputted from the 1.55 μm wavelength laser diode 308c to the third waveguide 304c, the multi-mode waveguide 302c functions as a multiplexer, or a deflector which passes light from the third waveguide 304c to the first waveguide 301c, so that the light of a wavelength of 1.55 μm is inputted to the input/output optical fiber 47.

In this manner, in the fifteenth embodiment, it is possible to provide an optical device which receives light of wavelengths of 1.30 μm and 1.55 μm and transmits only the light of a wavelength of 1.55 μm.

An optical demultiplexer as described in the second embodiment may be used for separating a desired wavelength so as to cut off other wavelengths as much as possible, thereby preventing an adverse effect from being caused to a device at an output destination. In such a case, the multi-mode waveguide 302c cuts off the light of a wavelength of 1.30 μm and inputs the light of a wavelength of 1.55 μm to the third waveguide 304c, and therefore the light of a wavelength of 1.30 μm is not inputted to the 1.55 μm wavelength laser diode 307c. Thus, it is possible to prevent malfunction of the 1.55 μm wavelength laser diode 307c.

In the case of using a wavelength of 1.30 μm in a receiver/transmitter application, a 1.30 μm wavelength laser diode may be coupled to the second waveguide 303c.

In the present embodiment, electrical parts, such as the 1.30 μm wavelength photodiode 305c, the 1.55 μm laser diode 307c, and the 1.55 μm photodiode 308c, are all completely separated from any optical parts, such as the multi-mode waveguide 302c and the optical fibers. Thus, the WDM transmitter/receiver module is configured as an integrated unit consisting of an electrical circuit section, which is formed of electrical signal processing circuits integrated into an electrical part unit, and an optical circuit section, which is formed of an integrated unit of optical parts.

(Sixteenth Embodiment)

FIG. 26 is a diagram schematically illustrating a WDM interleaver 300d according to a sixteenth embodiment of the present invention. In FIG. 26, elements having functions similar to functions of the optical demultiplexer 100a according to the first embodiment are denoted by the same reference numerals.

In FIG. 26, the WDM interleaver 300d includes: an input waveguide 101a; a multi-mode waveguide 301d; a first output waveguide 103a; a second output waveguide 104a; a substrate 106a for securing the above waveguides; and V-grooves 105a, 115a and 125a.

In the case where the multi-mode waveguide 301d is able to transmit multi-mode light of 2n (n=1, 2, . . . ) types of equally-spaced wavelengths $\lambda_1, \ldots, \lambda_{2n}$, when a phase difference between zero- and first-order modes at a 2k−1'th wavelength $\lambda_{2k-1}$ (k=1,2, . . . ; hereinafter referred to as the "odd-numbered multiplexed wavelength light") is $\theta_{2k-1}$ and a phase difference between zero- and first-order modes at a 2k'th wavelength $\lambda_{2k}$ (hereinafter referred to as the "even-numbered multiplexed wavelength light") is $\theta_{2k}$, the multi-mode waveguide 301d has such an optical path length as to cause a difference between $\theta_{2k-1}$ and $\theta_{2k}$ to become substantially an integral multiple of π. The multi-mode waveguide 301d is formed of a material having a refractive index which is in linear relationship with a wavelength in a wavelength range of use.

The input waveguide 101a, and the first and second output waveguides 103a and 104a are connected to the multi-mode waveguide 301d in positions as described in the first embodiment.

Next, the behavior of light in the WDM interleaver 300d will be described. Consider a case where single-mode light of n types of odd-numbered wavelengths $\lambda_1, \ldots, \lambda_{2n}$ enters from the input waveguide 101a connected to the multi-mode waveguide 301d in such a position that the optical axis thereof becomes offset from the center line 112a. In the multi-mode waveguide 301d, the odd-numbered wavelength light is divided into light under the zero- and first-order modes characteristic of the multi-mode waveguide 301d. Due to modal dispersion, the odd-numbered wavelength light propagates through the multi-mode waveguide 301d in accordance with a specific propagation coefficient, such that the power of the odd-numbered wavelength light alternately moves on two parallel straight lines.

Similarly, single-mode light of even-numbered wavelengths enters from the input waveguide 101a connected to the multi-mode waveguide 301d. In the multi-mode waveguide 301d, the even-numbered wavelength light is divided into light under the zero- and first-order modes characteristic of the multi-mode waveguide 301d. Due to modal dispersion, the even-numbered wavelength light propagates through the multi-mode waveguide 301d in accordance with a specific propagation coefficient, such that the power of the even-numbered wavelength light alternately moves on the two parallel straight lines.

The propagation coefficients for the movement of light power differ between the odd-numbered wavelength light and the even-numbered wavelength light due to chromatic dispersion resulted from modal dispersion of each wavelength. Accordingly, in the case of an optical path length which causes the powers of the odd-numbered wavelength light and the even-numbered wavelength light to move in opposite phases (i.e., the phase difference between the powers is substantially an integral multiple of $\pi$), the powers of the odd-numbered wavelength light and the even-numbered wavelength light are separated onto the two parallel straight lines.

In this manner, the multi-mode waveguide 301d has such an optical path length as to cause the powers of the odd-numbered wavelength light and the even-numbered wavelength light to be separated onto the two parallel straight lines, and the first and second output waveguides 103a and 104a are provided in the vicinity of the location at which the odd-numbered wavelength light and the even-numbered wavelength light are separated. This allows even a WDM interleaver simply structured with waveguides to readily separate the odd-numbered wavelength light and the even-numbered wavelength light.

Note that as in the case of the optical demultiplexer 100d (FIG. 8), the multi-mode waveguide 301d may be formed by two parallel single-mode waveguides.

As in the case of the third and fourth embodiments, in order to shorten the length of the multi-mode waveguide 301d, the multi-mode waveguide 301d may be structured so as to make a difference between distances from the input end to the output ends from which the odd-numbered wavelength light and the even-numbered wavelength light are outputted. In such a case, different optical path lengths allow the phase difference in movement between powers of odd-numbered wavelength light and the even-numbered wavelength light to become substantially an integral multiple of $\pi$. Alternatively, the multi-mode waveguide 301d may be structured by first and second multi-mode regions having different widths.

(Seventeenth Embodiment)

Figure 27:
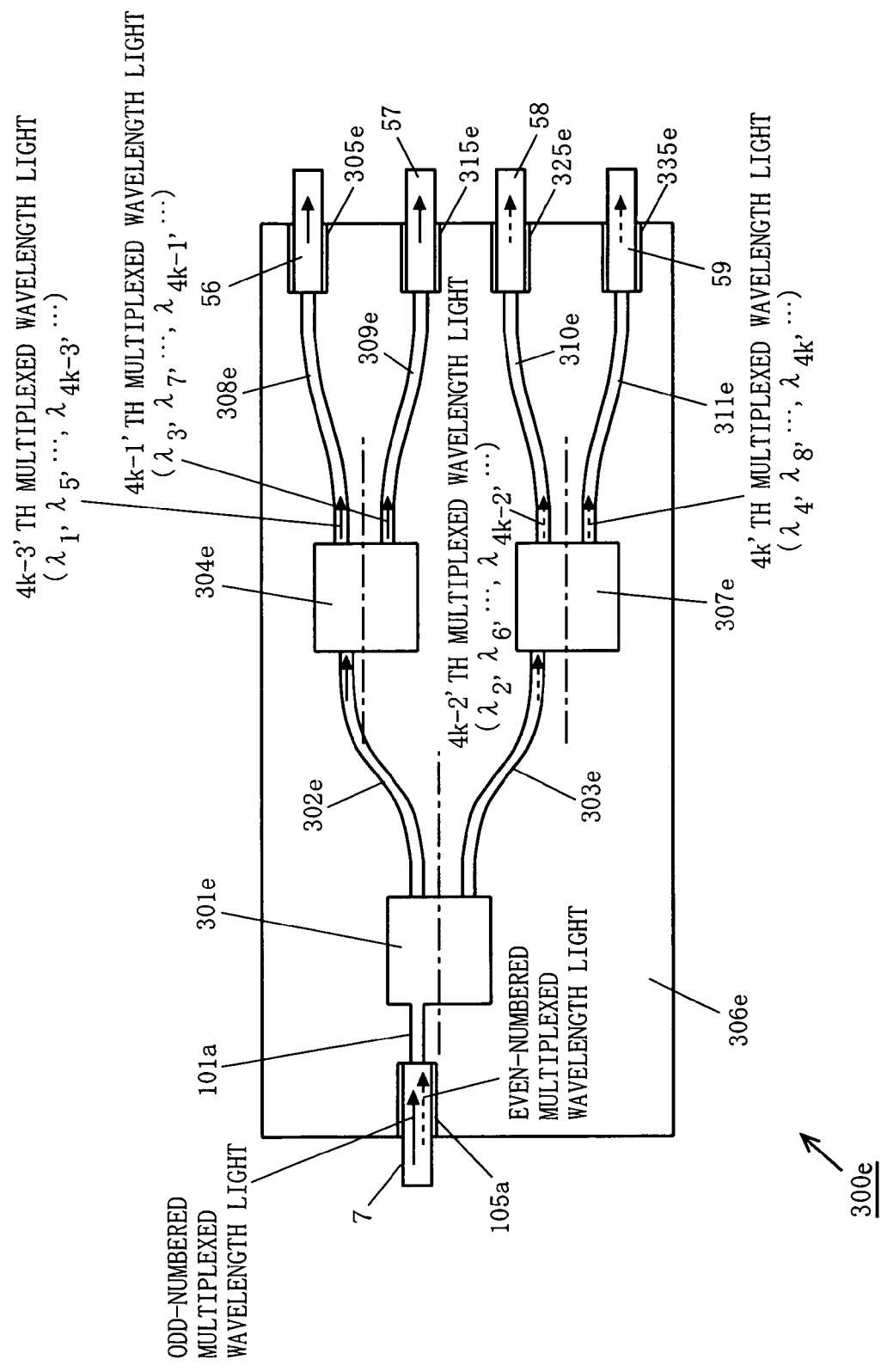
FIG. 27 is a diagram schematically illustrating the structure of a WDM interleaver 300e according to a seventeenth embodiment of the present invention.

FIG. 27 is a diagram schematically illustrating the structure of a WDM interleaver 300e according to a seventeenth embodiment of the present invention. In FIG. 27, elements having functions similar to functions of the optical demultiplexer 100a according to the first embodiment are denoted by the same reference numerals.

In FIG. 27, the WDM interleaver 300e includes: an input waveguide 101a; a former-stage multi-mode waveguide 301d; a first relay waveguide 302e; a second relay waveguide 303e; a first latter-stage multi-mode waveguide 304e; a second latter-stage multi-mode waveguide 307e; a first output waveguide 308e; a second output waveguide 309e; a third output waveguide 310e; a fourth output waveguide 311e; a substrate 306e for securing the above waveguides; a V-groove 105a; a V-groove 305e for securing a first output optical fiber 56; a V-groove 315e for securing a second output optical fiber 57; a V-groove 325e for securing a third output optical fiber 58; and a V-groove 335e for securing a fourth output optical fiber 59.

The former-stage multi-mode waveguide 301e is a first interleaver having the same characteristic as that of the multi-mode waveguide 301d of the optical demultiplexer 300d illustrated in FIG. 26, and has an optical path length such that a phase difference in movement between the powers of light of a 2k−1'th wavelength $\lambda_{2k-1}$ (k=1,2, ...), i.e., the odd-numbered multiplexed wavelength light, and light of a 2k'th wavelength $\lambda_{2k}$, i.e., the even-numbered multiplexed wavelength light, becomes substantially an integral multiple of $\pi$.

The first latter-stage multi-mode waveguide 304e is a second interleaver having an optical path length such that a phase difference in movement between the powers of light of a 4k−3'th wavelength $\lambda_{4k-3}$ (hereinafter, referred to as the "4k−3'th multiplexed wavelength light") and light of a 4k−1'th wavelength $\lambda_{4k-1}$ (hereinafter, referred to as the "4k−1'th multiplexed wavelength light") becomes substantially an integral multiple of $\pi$.

The second latter-stage multi-mode waveguide 307e is a third interleaver having an optical path length such that a phase difference in movement between the powers of light of a 4k−2'th wavelength $\lambda_{4k-2}$ (hereinafter, referred to as the "4k−2'th multiplexed wavelength light") and light of a 4k'th wavelength $\lambda_{4k}$ (hereinafter, referred to as the "4k'th multiplexed wavelength light") becomes substantially an integral multiple of $\pi$.

Note that refractive indices of the multi-mode waveguides 301e, 304e, and 307e, respectively included in the first through third interleavers, are in linear relationship with a wavelength in a wavelength range of use.

The first relay waveguide 302e is operable to relay the odd-numbered multiplexed wavelength light from the former-stage multi-mode waveguide 301e to the first latter-stage multi-mode waveguide 304e. The second relay waveguide 303e is operable to relay the even-numbered multiplexed wavelength light from the former-stage multi-mode waveguide 301e to the second latter-stage multi-mode waveguide 307e.

The first output waveguide 308e is operable to supply the 4k−3'th multiplexed wavelength light to the first output optical fiber 56. The second output waveguide 309e is operable to supply the 4k−1'th multiplexed wavelength light to the second output optical fiber 57. The third output waveguide 310e is operable to supply the 4k−2'th multiplexed wavelength light to the third output optical fiber 58. The fourth output waveguide 311e is operable to supply the 4k'th multiplexed wavelength light to the fourth output optical fiber 59.

As described in the sixteenth embodiment, in the former-stage multi-mode waveguide 301e, 4n (n=1, 2, ...) types of equally-spaced wavelengths $\lambda_1, \ldots, \lambda_{4n}$ are separated into the odd-numbered multiplexed wavelength light and the even-numbered multiplexed wavelength light. The odd-numbered multiplexed wavelength light and the even-numbered multiplexed wavelength light are inputted to the first and second latter-stage multi-mode waveguides 304e and 307e, respectively.

The odd-numbered multiplexed wavelength light inputted into the first latter-stage multi-mode waveguide 304e is separated into the 4k−3'th multiplexed wavelength light and the 4k−1'th multiplexed wavelength light. The even-numbered multiplexed wavelength light inputted into the second latter-stage multi-mode waveguide 307e is separated into the 4 k–2'th multiplexed wavelength light and the 4k'th multiplexed wavelength light.

In this manner, the WDM interleaver 300e finally separates the 4n types of equally-spaced wavelengths $\lambda_1, \ldots, \lambda_{4n}$ into four groups of equally-spaced wavelengths.

Since the refractive indices of the multi-mode waveguides 301e, 304e, and 307e are in linear relationship with a wavelength in the wavelength range of use, the multi-mode waveguides 304e and 307e can have an equal optical path length.

Note that each of the multi-mode waveguides 301e, 304e, and 307e may be formed by two parallel single-mode waveguides.

Although in the interleavers as described in the sixteenth and seventeenth embodiments, modal dispersion and chromatic dispersion in all wavelengths are fixed, i.e., refractive indices of all wavelengths are kept constant, a ratio between powers of light of odd- and even-numbered wavelengths. In such a case, control of such a ratio can be performed by elements as described in conjunction with the optical demultiplexers as illustrated in FIGS. 14 and 15. The material having an electro-optic or thermo-optic effect is required to have a refractive index which is kept in linear relationship with a wavelength in the wavelength range of use even if the refractive index is changed.

Note that it is apparent that the multi-mode waveguides 102b and 102c and the multi-mode propagation portion 102e as used in the third, fourth and sixth embodiments may be used in the thirteenth through seventeenth embodiments when more compact waveguides are required.

(Eighteenth Embodiment)

An optical demultiplexer according to an eighteenth embodiment of the present invention has a structure similar to that of the optical demultiplexer according to the eighth embodiment, and therefore is described with reference to FIG. 13. The optical demultiplexer according to the eighteenth embodiment includes: an input waveguide 101a; a first multi-mode waveguide 102g; a first relay waveguide 103g; a second relay waveguide 104g; a second multi-mode waveguide 105g; a third multi-mode waveguide 107g; a first output waveguide 108g; a second output waveguide 109g; a substrate 106g for securing the above waveguides; and V-grooves 105a, 115a, and 125a.

In the optical demultiplexer according to the eighteenth embodiment, first and second center wavelengths to be separated are 1.30 μm and 1.55 μm, respectively, and therefore the extinction ratio equal to or more than 25 dB can be realized over a wide wavelength band of 100 nm for each center wavelength. Hereinafter, the first multi-mode waveguide 102g is referred to as the "former-stage demultiplexing portion", and the second and third multi-mode waveguides 105g and 107g are collectively referred to as the "latter-stage demultiplexing portion", respectively. The mechanism for realizing the extinction ratio over a such a wide wavelength band will be described below.

Figure 28:
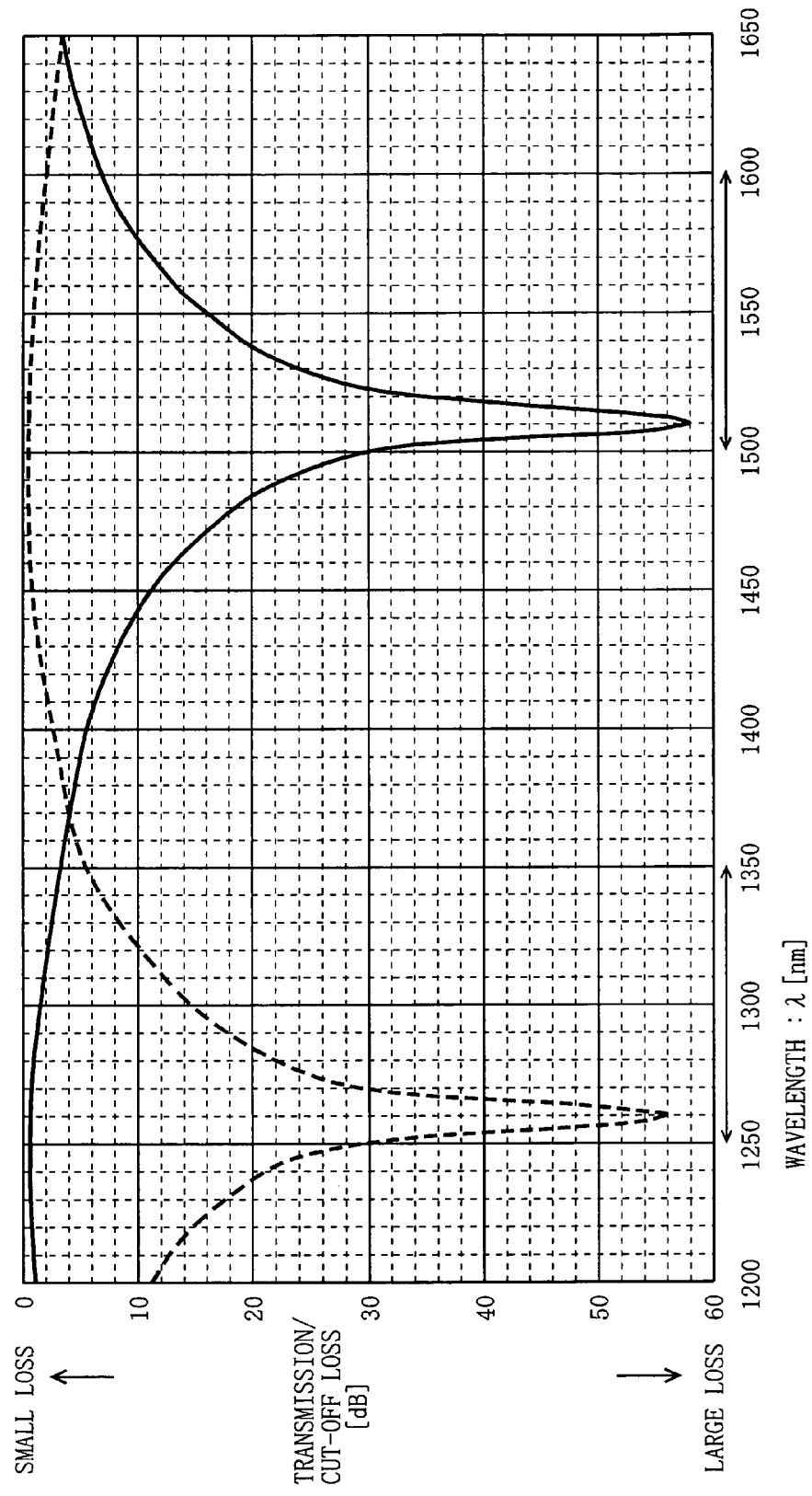
FIG. 28 is a graph illustrating wavelength characteristics of a transmission/cut-off loss in a former-stage demultiplexing portion.

FIG. 28 is a graph illustrating wavelength characteristics of a transmission/cut-off loss in the former-stage demultiplexing portion. In FIG. 28, the vertical axis has values of loss which decreases upwards and increases downwards, the bold curve illustrates a wavelength characteristic of the transmission cut-off loss at a first output end of the former-stage demultiplexing portion (from which a wavelength of 1.30 μm is outputted and at which the output of a wavelength to be cut off is minimized rather than the output of a desired wavelength is maximized), and the dotted curve illustrates a wavelength characteristic of the transmission/cut-off loss at a second output end of the former-stage demultiplexing portion (from which a wavelength of 1.55 μm is outputted and at which the output of a wavelength to be cut off is minimized rather than the output of a desired wavelength is maximized).

As shown in FIG. 28, at the first output end, the loss is maximized at about 58 dB in the vicinity of a wavelength of 1.51 μm slightly offset from the center wavelength of 1.55 μm to the minus side (i.e., the cut-off loss is minimized in the vicinity of the wavelength of 1.51 μm). Further, at the first output end, the loss becomes satisfactorily low at about 0.7 dB in the vicinity of the center wavelength of 1.30 μm (i.e., the transmission loss becomes satisfactorily low in the vicinity of the center wavelength of 1.30 μm). Accordingly, at the first output end, the center wavelengths are satisfactorily transmitted, and the wavelength of 1.51 μm slightly offset from the center wavelength of 1.55 μm is cut off most. Note that a difference between the transmission and cut-off losses corresponds to the extinction ratio.

On the other hand, at the second output end, the loss is maximized at about 56 dB in the vicinity of a wavelength of 1.26 μm slightly offset from the center wavelength of 1.30 μm to the minus side (i.e., the cut-off loss is minimized in the vicinity of the wavelength of 1.26 m). Further, at the first output end, the loss becomes satisfactorily low at about 0.3 dB in the vicinity of the center wavelength of 1.55 μm (i.e., the transmission loss becomes satisfactorily low in the vicinity of the center wavelength of 1.55 μm). Accordingly, at the second output end, the center wavelengths are satisfactorily transmitted, and the wavelength of 1.26 μm slightly offset from the center wavelength of 1.30 μm is cut off most.

Figure 29:
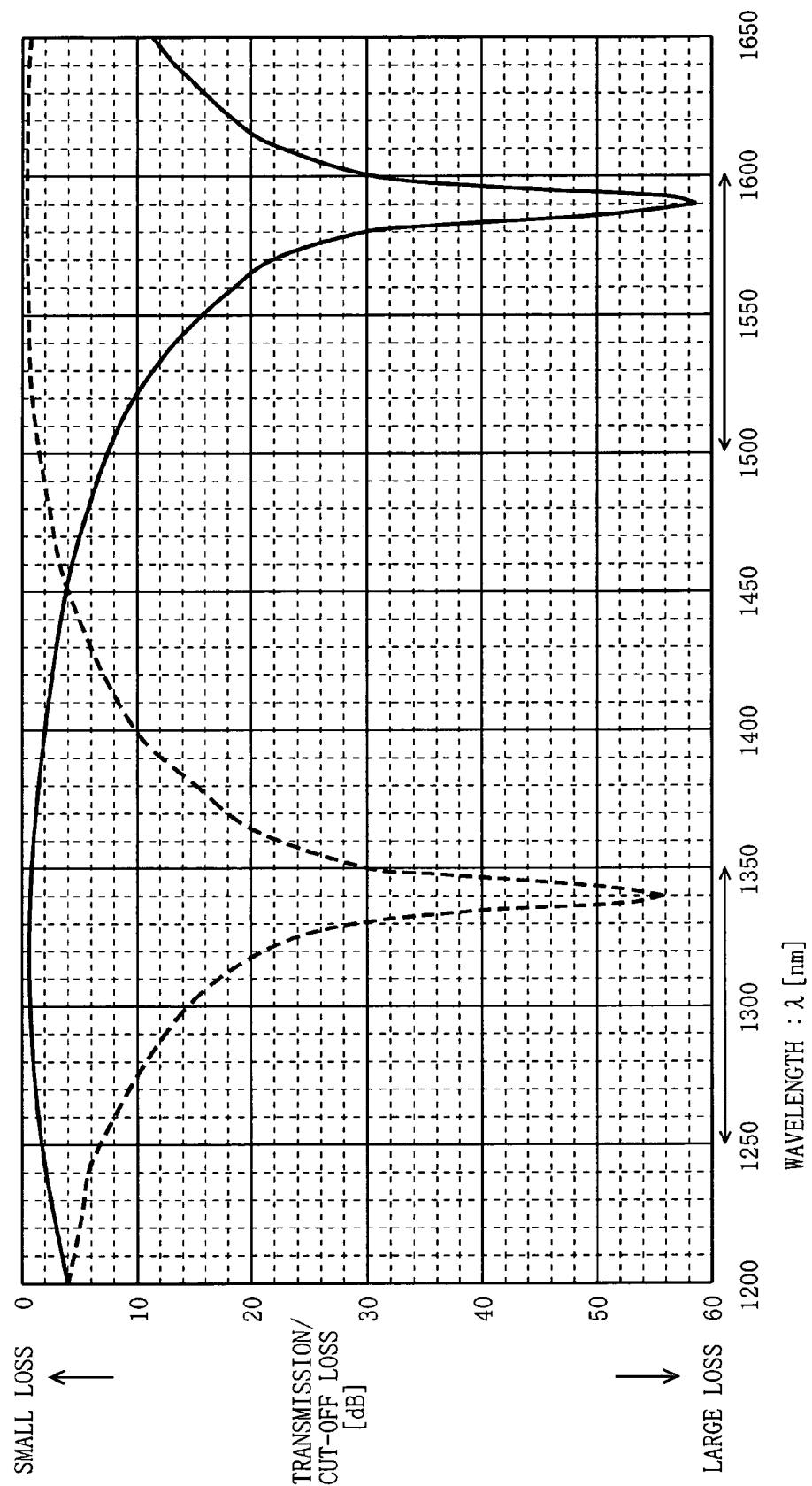
FIG. 29 is a graph illustrating wavelength characteristics of a transmission/cut-off loss in a latter-stage demultiplexing portion.

FIG. 29 is a graph illustrating wavelength characteristics of a transmission/cut-off loss in the latter-stage demultiplexing portion. In FIG. 29, the vertical axis has values of loss which decreases upwards and increases downwards, the bold curve illustrates a wavelength characteristic of the transmission cut-off loss at a first output end of the latter-stage demultiplexing portion (from which a wavelength of 1.30 μm is outputted and at which the output of a wavelength to be cut off is minimized rather than the output of a desired wavelength is maximized), and the dotted curve illustrates a wavelength characteristic of the transmission/cut-off loss at a second output end of the latter-stage demultiplexing portion (from which a wavelength of 1.55 μm is outputted and at which the output of a wavelength to be cut off is minimized rather than the output of a desired wavelength is maximized). Although the latter-stage demultiplexing portion is formed by the multi-mode waveguides 105g and 107g, each multi-mode waveguide has the same wavelength characteristic as illustrated in FIG. 29.

As shown in FIG. 29, at the first output end, the loss is maximized at about 58 dB in the vicinity of a wavelength of 1.59 μm slightly offset from the center wavelength of 1.55 μm to the plus side (i.e., the cut-off loss is maximized in the vicinity of the wavelength of 1.59 μm). Further, at the first output end, the loss becomes satisfactorily low at about 0.7 dB in the vicinity of the center wavelength of 1.30 μm (i.e., the transmission loss becomes satisfactorily low in the vicinity of the center wavelength of 1.30 μm). Accordingly, at the first output end, the center wavelengths are satisfactorily transmitted, and the wavelength of 1.59 μm slightly offset from the center wavelength of 1.55 μm is cut off most.

On the other hand, at the second output end, the loss is maximized at about 56 dB in the vicinity of a wavelength of 1.34 μm slightly offset from the center wavelength of 1.30 μm to the plus side (i.e., the cut-off loss is maximized in the vicinity of the wavelength of 1.34 μm). Further, at the first output end, the loss becomes satisfactorily low at about 0.3 dB in the vicinity of the center wavelength of 1.55 μm (i.e., the transmission loss becomes satisfactorily low in the vicinity of the center wavelength of 1.55 μm). Accordingly, at the second output end, the center wavelengths are satisfactorily transmitted, and the wavelength of 1.34 μm slightly offset from the center wavelength of 1.30 μm is cut off most.

Figure 30:
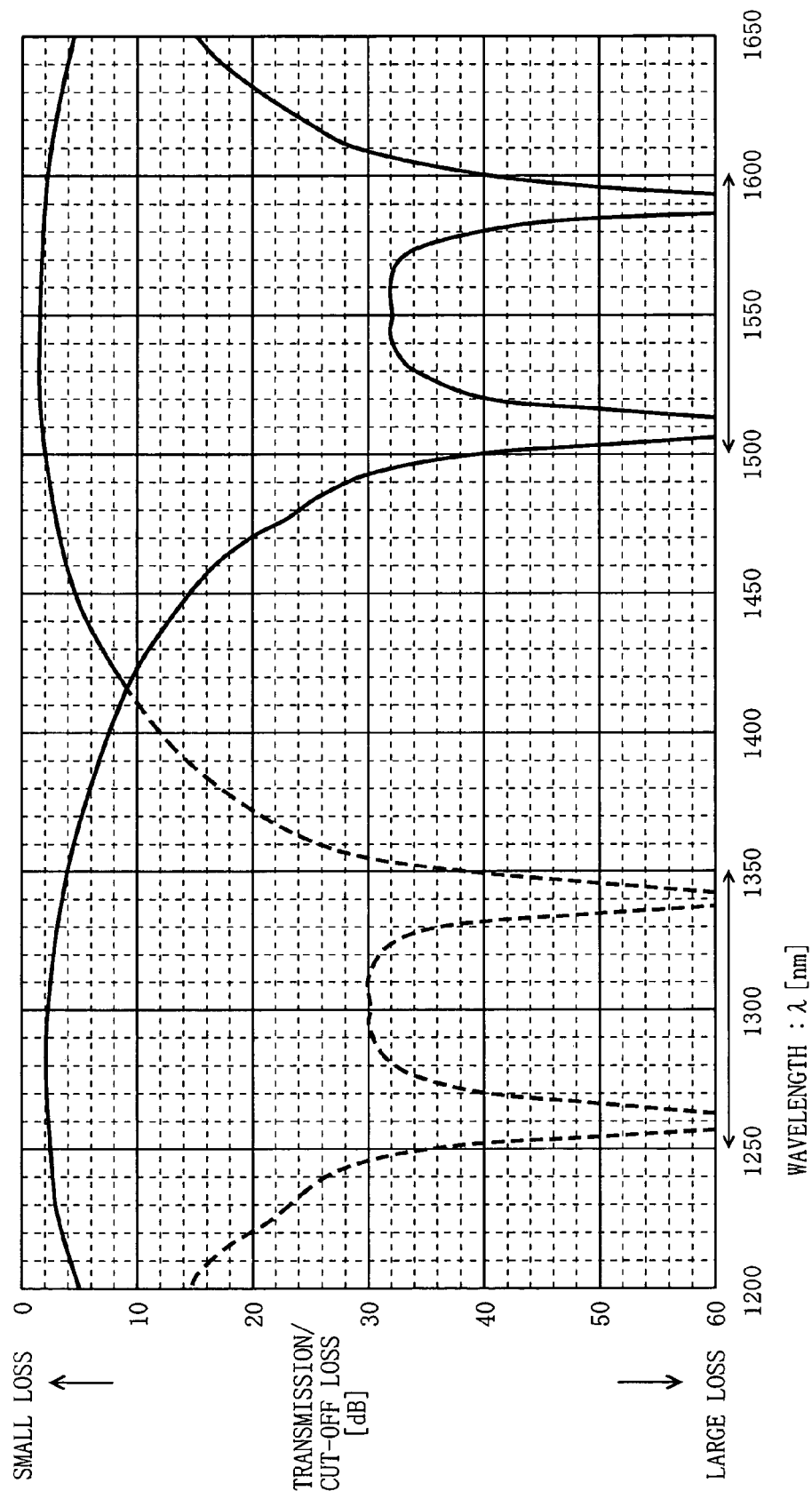
FIG. 30 is a graph illustrating wavelength characteristics of a transmission/cut-off loss in the entire optical demultiplexer according to an eighteenth embodiment of the present invention.

FIG. 30 is a graph illustrating wavelength characteristics of a transmission/cut-off loss in the entire optical demultiplexer according to the eighteenth embodiment. In FIG. 30, the vertical axis has values of loss which decreases upwards and increases downwards, the bold curve illustrates a wavelength characteristic of the transmission/cut-off loss at the output end of the first output waveguide 108g, and the dotted curve illustrates a wavelength characteristic of the transmission/cut-off loss at the output end of the second output waveguide 109g.

As shown in FIG. 30, at the output end of the first output waveguide 108g, the loss becomes significantly high in the range centering around the wavelength of 1.55 μm between wavelengths of 1.50 μm and 1.60 μm. That is, the cut-off loss becomes satisfactorily high in the range between the wavelengths of 1.50 μm and 1.60 μm. Further, at the output end of the first output waveguide 108g, the loss becomes significantly low in the range centering around the wavelength of 1.30 μm between wavelengths of 1.25 μm and 1.35 μm. That is, the transmission loss becomes satisfactorily low in the range between the wavelengths of 1.25 μm and 1.35 μm.

On the other hand, at the output end of the second output waveguide 109g, the loss becomes significantly high in the range centering around the wavelength of 1.30 μm between wavelengths of 1.25 μm and 1.35 μm. That is, the cut-off loss becomes satisfactorily low in the range between the wavelengths of 1.25 μm and 1.35 μm. Further, at the output end of the second output waveguide 109g, the loss becomes significantly high in the range centering around the wavelength of 1.55 μm between wavelengths of 1.50 μm and 1.60 μm. That is, the transmission loss becomes satisfactorily low in the range between the wavelengths of 1.50 μm and 1.60 μm.

As described above, in the case where the extinction ratio equal to or more than 25 dB can be obtained over a wide wavelength band by connecting multi-mode waveguides in multi-stages, such that center wavelengths are set so as to be symmetric with respect to a wavelength to be separated. In the case of using only a single-stage demultiplexer, a high extinction ratio equal to or more than 50 dB can be obtained with respect to the center wavelengths. However, the high extinction ratio can be obtained over only a narrow range of 20 nm. Accordingly, the present embodiment is effective at broadening the range where the extinction ratio becomes high.

Note that a high extinction ratio can be obtained over a wider wavelength band if the number of stages of the multi-mode waveguides for which different center wavelengths are set is increased from two to three. However, in such a case, the entire optical path length is lengthened, leading to an increase of a transmission loss. Accordingly, the number of stages of the multi-mode waveguides should be determined in accordance with whether the prime importance is placed on an increase of a transmission loss or on an enhancement of the extinction ratio. For example, in the case where the prime importance is placed on the enhancement of the extinction ratio, by connecting an additional demultiplexing portion, which includes multi-mode waveguides for which center wavelengths of 1.30 μm and 1.55 μm are set, to each of the second and third multi-mode waveguides 105g and 107g, the extinction ratio can be maximized with respect to first and second wavelengths of 1.30 μm and 1.55 μm to be separated between which the extinction ratio is not maximized by two stages of multi-mode waveguides.

In the case of the optical demultiplexer according to the above eighth embodiment which is configured as a multi-stage optical demultiplexer in which the output of the first multi-mode waveguide 102g is further inputted to the second and third multi-mode waveguides 105g and 107g, unlike the seventeenth embodiment, the former- and latter-stage demultiplexing portions have the same transmission and cut-off losses. Accordingly, the optical demultiplexer according to the eighth embodiment is effective at enhancing the extinction ratio between wavelengths in narrow wavelength bands centering the first and second wavelengths of 1.30 μm and 1.55 μm.

Similar to the eighth embodiment, in the eighteenth embodiment, no light of a wavelength of 1.55 μm is required to be outputted from the second multi-mode waveguide 105g, and no light of a wavelength of 1.30 μm is required to be outputted from the third multi-mode waveguide 107g. Accordingly, as is apparent from FIG. 13, no waveguides for outputting such light are provided in the optical demultiplexer 10g.

In the optical demultiplexer according to the eighteenth embodiment, modal dispersion and chromatic dispersion in the multi-mode propagation portion are fixed. That is, the refractive index of the multi-mode propagation portion is kept constant. However, a multi-mode propagation portion having a variable refractive index may be used.

As is apparent from the above description, the present invention achieves an effect of realizing a demultiplexer/multiplexer simply structured with waveguides which has the same performance capabilities as those of a conventional demultiplexer/multiplexer without requiring a dielectric multilayer film filter.

Note that in each of the above-described embodiments, although single-mode optical fibers are used for the purpose of inputting/outputting light, multi-mode optical fibers may be used for such a purpose.

While the invention has been described in detail, the foregoing description is in all aspects illustrative and not restrictive. It is understood that numerous other modifications and variations can be devised without departing from the scope of the invention.

What is claimed is:

1. An optical demultiplexer for separating input wavelength-multiplexed light of first and second wavelengths, said optical demultiplexer comprising:

a multi-mode propagation portion having a characteristic of allowing multi-mode propagation of light of the first and second wavelengths, and separating powers of the light of first and second wavelengths by causing internal mode interference;

an input portion for inputting light to said multi-mode propagation portion from such an input position as to cause separation of the powers of light in said multi-mode propagation portion; and first and second output portions for outputting the light of first and second wavelengths from said multi-mode propagation portion via such positions on an output end face as to cause separation of the powers of the light of first and second wavelengths and to maximize an extinction ratio indicating the size of the power of light of a desired wavelength with respect to the power of light of a wavelength to be cut off.

2. The optical demultiplexer according to claim 1, wherein when a value of the extinction ratio corresponds to ten times the natural logarithm of the quotient obtained by dividing the power of light of the desired wavelength by the power of light of the wavelength to be cut off, the extinction ratio is equal to or more than 30 dB at a position where the extinction ratio is maximized.

3. The optical demultiplexer according to claim 1, wherein a refractive index of said multi-mode propagation portion is less than or equal to 2.0.

4. The optical demultiplexer according to claim 1, wherein a width of said multi-mode propagation portion is equal to or more than 15 $\mu$m.

5. The optical demultiplexer according to claim 1, wherein said first output portion is located in a position where the power of light of the second wavelength is minimized, and
wherein said second output portion is located in a position where the power of light of the first wavelength is minimized.

6. The optical demultiplexer according to claim 1, wherein in a case where a phase difference between zero- and first-order modes of the first wavelength is $\theta_1$ and a phase difference between zero- and first-order modes of the second wavelength is $\theta_2$, said multi-mode propagation portion has such an optical path length in a propagation direction as to cause a difference between $\theta_1$ and $\theta_2$ to be in the range of $m\pi \pm \pi/2$, where m is a natural integer.

7. The optical demultiplexer according to claim 6, wherein said multi-mode propagation portion has such an optical path length in the propagation direction as to cause at least one of the powers of the light of first and second wavelengths to be minimized or maximized at an output end of each of the first and second wavelengths.

8. The optical demultiplexer according to claim 7, wherein said multi-mode propagation portion has such an optical path length in the propagation direction as to cause the difference between $\theta_1$ and $\theta_2$ to become an integral multiple of $\pi$.

9. The optical demultiplexer according to claim 8, wherein said multi-mode propagation portion has such an optical path length in the propagation direction as to cause the powers of the light of first and second wavelengths to become minimum or maximum values inverted with respect to each other at the output end of each of the first and second wavelengths.

10. The optical demultiplexer according to claim 6, wherein said multi-mode propagation portion has such an optical path length in the propagation direction as to cause the extinction ratio at the output end of each of the first and second wavelengths to become equal to or more than 30 dB.

11. The optical demultiplexer according to claim 6, wherein said multi-mode propagation portion has such an optical path length in the propagation direction as to cause the difference between $\theta_1$ and $\theta_2$ to become an integral multiple of $\pi$.

12. The optical demultiplexer according to claim 6, wherein said multi-mode propagation portion is formed by one multi-mode waveguide,
wherein a center line of the multi-mode waveguide corresponds to an optical axis of said multi-mode propagation portion, and
wherein the input position is offset from the optical axis.

13. The optical demultiplexer according to claim 6, wherein said multi-mode propagation portion is formed by two single-mode waveguides,
wherein an axis of symmetry between said two multi-mode waveguides corresponds to an optical axis of said multi-mode propagation portion, and
wherein the input position is an input end of either of said two single-mode waveguides.

14. The optical demultiplexer according to claim 1, wherein the multi-mode propagation portion includes:
a first optical path length portion having an optical path length in a propagation direction such that, in a case where a phase difference between zero- and first-order modes of the first wavelength is $\theta_1$ and a phase difference between zero- and first-order modes of the second wavelength is $\theta_2$, a difference between $\theta_1$ and $\theta_2$ is in the range of $m\pi \pm \pi/2$, where m is a natural integer; and
a second optical path length portion having an optical path length in the propagation direction such that the difference between $\theta_1$ and $\theta_2$ is in the range of $m\pi \pm \pi/2$,
wherein light of the first wavelength is outputted from said first optical path length portion,
wherein light of the second wavelength is outputted from said second optical path length portion, and
wherein said first and second optical path length portions have different optical path lengths.

15. The optical demultiplexer according to claim 14, wherein said first optical path length portion has such an optical path length in the propagation direction as to cause the difference between $\theta_1$ and $\theta_2$ to become an integral multiple of $\pi$, and
wherein said second optical path length portion has such an optical path length in the propagation direction as to cause the difference between $\theta_1$ and $\theta_2$ to become an integral multiple of $\pi$.

16. The optical demultiplexer according to claim 14, wherein said multi-mode propagation portion is formed by one multi-mode waveguide,
wherein a center line of said multi-mode waveguide corresponds to an optical axis of said multi-mode propagation portion, and
wherein the input position is offset from the optical axis.

17. The optical demultiplexer according to claim 14, wherein said multi-mode propagation portion is formed by two single-mode waveguides having different lengths, and
wherein an axis of symmetry between said two multi-mode waveguides corresponds to an optical axis of said multi-mode propagation portion.

18. The optical demultiplexer according to claim 1, wherein said multi-mode propagation portion has an optical path length in a propagation direction such that, in a case where a phase difference between zero- and first-order modes of the first wavelength is $\theta_1$ and a phase difference between zero- and first-order modes of the second wavelength is $\theta_2$, a difference between $\theta_1$ and $\theta_2$ is in the range of $m\pi \pm \pi/2$, where m is a natural integer, and
wherein said multi-mode propagation portion includes:
a first multi-mode region operable to transmit therethrough only multi-mode light of a shorter one of the first and second wavelengths; and
a second multi-mode region operable to transmit therethrough multi-mode light of the first and second wavelengths, said second multi-mode region being located downstream in a traveling direction of light from said first multi-mode region.

19. The optical demultiplexer according to claim 18, wherein said multi-mode propagation portion has such an optical path length in the propagation direction as to cause the difference between $\theta_1$ and $\theta_2$ to become an integral multiple of $\pi$.

20. The optical demultiplexer according to claim 18, wherein said multi-mode propagation portion is formed by one multi-mode waveguide, and
wherein said first and second multi-mode regions are formed by cutting out a portion having a rectangular solid-shape from the input side of said multi-mode waveguide, such that said first multi-mode region becomes partially narrower than said second multi-mode region.

21. The optical demultiplexer according to claim 20, wherein the input position is offset from the optical axes of said first and second multi-mode regions.

22. The optical demultiplexer according to claim 18, wherein said first multi-mode region is formed by two former-stage single-mode waveguides used as a former-stage multi-mode region,
wherein said second multi-mode region is formed by two latter-stage single-mode waveguides used as a latter-stage multi-mode region, and
wherein a space between said former-stage single-mode waveguides is narrower than a space between said latter-stage single-mode waveguides.

23. The optical demultiplexer according to claim 18, wherein the centers of the axes of said first and second multi-mode regions are offset from each other.

24. The optical demultiplexer according to claim 1, wherein in a case where a phase difference between zero- and first-order modes of the first wavelength is $\theta_1$ and a phase difference between zero- and first-order modes of the second wavelength is $\theta_2$, said multi-mode propagation portion has such an optical path length in a propagation direction as to cause a difference between $\theta_1$ and $\theta_2$ to be in the range of $m\pi \pm \pi/2$, where m is a natural integer, and
wherein a width of said multi-mode propagation portion varies along a direction of an optical axis of said optical demultiplexer.

25. The optical demultiplexer according to claim 24, wherein said multi-mode propagation portion has such an optical path length in the propagation direction as to cause the difference between $\theta_1$ and $\theta_2$ to become an integral multiple of $\pi$.

26. The optical demultiplexer according to claim 24, wherein said multi-mode propagation portion is formed by one multi-mode waveguide, and
wherein a center line of said multi-mode waveguide corresponds to an optical axis of said multi-mode propagation portion.

27. The optical demultiplexer according to claim 24, wherein said multi-mode propagation portion is formed by two single-mode waveguides, and
wherein an axis of symmetry between said two multi-mode waveguides corresponds to an optical axis of said multi-mode propagation portion.

28. The optical demultiplexer according to claim 1, further comprising:
a first latter-stage multi-mode propagation portion provided at an output end of said first output portion, said first latter-stage multi-mode propagation portion having the same characteristic as that of said multi-mode propagation portion;
a second latter-stage multi-mode propagation portion provided at an output end of said second output portion, said second latter-stage multi-mode propagation portion having the same characteristic as that of said multi-mode propagation portion;
a first latter-stage output portion for outputting light of the first wavelength to be separated by said first latter-stage multi-mode propagation portion; and
a second latter-stage output portion for outputting light of the second wavelength to be separated by said second latter-stage multi-mode propagation portion.

29. The optical demultiplexer according to claim 1, further comprising an external electric field control section for applying an external electric field to said multi-mode propagation portion, wherein said multi-mode propagation portion is formed of an electro-optic material.

30. The optical demultiplexer according to claim 29, wherein said external electric field control section includes:
a pair of electrodes provided on a surface of the multi-mode propagation portion; and
an external voltage control section for controlling a voltage between said pair of electrodes.

31. The optical demultiplexer according to claim 1, further comprising an external temperature control section for controlling the temperature of said multi-mode propagation portion, wherein said multi-mode propagation portion is formed of a thermo-optic material having a temperature dependence.

32. The optical demultiplexer according to claim 31, wherein said external temperature control section includes:
a heat conducting member provided on a surface of said multi-mode propagation portion; and
a temperature control member for controlling the temperature of said multi-mode propagation portion by at least one of heating and cooling said heat conducting member.

33. The optical demultiplexer according to claim 31, wherein said external temperature control section includes:
a Peltier device provided on a surface of said multi-mode propagation portion; and a temperature control member for controlling the temperature of said multi-mode propagation portion by applying a current to said Peltier device.

34. The optical demultiplexer according to claim 1, wherein said input portion is a waveguide optically coupled to the input side of said multi-mode propagation portion, and
wherein each of said first and second output portions is a waveguide optically coupled to the output side of said multi-mode propagation portion.

35. An optical device for transmitting/receiving light of first and second wavelengths, said optical device comprising:
a multi-mode propagation portion allowing multi-mode propagation of light of the first and second wavelengths, and separating powers of the light of first and second wavelengths by causing internal mode interference;
an input portion for inputting light to said multi-mode propagation portion from such an input position as to cause separation of the powers of light in said multi-mode propagation portion;
first and second output portions for outputting the light of first and second wavelengths from said multi-mode propagation portion via such positions on an output end face as to cause separation of the powers of the light of first and second wavelengths and to maximize an extinction ratio indicating the size of the power of light of a desired wavelength with respect to the power of light of a wavelength to be cut off;

a first optical element for at least one of receiving and emitting light of the first wavelength, said first optical element being provided at an output end of said first output portion; and a second optical element for at least one of receiving and emitting light of the second wavelength, said second optical element being provided at an output end of said second output portion.

36. The optical device according to claim 35, wherein said second optical element includes:

a light emitting portion for emitting light of the second wavelength; and a light receiving portion for receiving light of the second wavelength.

37. An optical demultiplexer for separating input wavelength-multiplexed light of n types of different wavelengths, where n is a natural integer, said optical demultiplexer comprising:

a multi-mode propagation portion allowing multi-mode propagation of the input wavelength-multiplexed light of n types of different wavelengths, and separating powers of the light of n types of different wavelengths by causing internal mode interference;

an input portion for inputting light to said multi-mode propagation portion from such an input position as to cause separation of the powers of light in said multi-mode propagation portion; and n output portions for outputting the light of n types of different wavelengths from said multi-mode propagation portion via such positions on an output end face as to cause separation of the powers of the light of n types of different wavelengths and to maximize an extinction ratio indicating the size of the power of light of a desired wavelength with respect to the power of light of a wavelength to be cut off.

38. The optical demultiplexer according to claim 37, wherein in a case where i=0, 1, ..., n and k=1, 2, ..., n−1, when a phase difference between i'th- and i+1'th-order modes of a k'th wavelength $\lambda_k$ is $\theta_k$ and a phase difference between i'th- and i+1'th-order modes of a k+1'th wavelength $\lambda_{k+1}$ is $\theta_{k+1}$, said multi-mode propagation portion has such an optical path length in a propagation direction as to cause a difference between $\theta_k$ and $\theta_{k+1}$ to be in the range of $m\pi \pm \pi/2$, where m is a natural integer.

39. The optical demultiplexer according to claim 38, wherein said multi-mode propagation portion is formed by one multi-mode waveguide, wherein a center line of said multi-mode waveguide corresponds to an optical axis of said multi-mode propagation portion, and wherein the input position is offset from the optical axis.

40. The optical demultiplexer according to claim 38, wherein said multi-mode propagation portion is formed by n single-mode waveguides, and wherein an axis of symmetry between outermost single-mode waveguides among said n single-mode waveguides corresponds to an optical axis of said multi-mode propagation portion.

41. The optical demultiplexer according to claim 40, wherein said n single-mode waveguides are equally spaced.

42. The optical demultiplexer according to claim 37, wherein the n types of different wavelengths are equally spaced.

43. An optical multi-/demultiplexer for combining/separating light of first and second wavelengths, said optical multi-/demultiplexer comprising:

a multi-mode propagation portion allowing multi-mode propagation of the light of first and second wavelengths, and separating powers of the light of first and second wavelengths by causing internal mode interference;

an input portion for inputting light to said multi-mode propagation portion from such an input position as to cause separation of the powers of light in said multi-mode propagation portion; and first and second output portions for outputting the light of first and second wavelengths from said multi-mode propagation portion via such positions on an output end face as to cause separation of the powers of the light of first and second wavelengths and to maximize an extinction ratio indicating the size of the power of light of a desired wavelength with respect to the power of light of a wavelength to be cut off.

44. An optical multi-/demultiplexer for combining/separating light of n types of different wavelengths, where n is a natural integer, said optical multi-/demultiplexer comprising:

a multi-mode propagation portion allowing multi-mode propagation of the light of n types of different wavelengths, and separating powers of the light of n types of different wavelengths by causing internal mode interference;

an input portion for inputting light to said multi-mode propagation portion from such an input position as to cause separation of the powers of light in said multi-mode propagation portion; and n output portions for outputting the light of n types of different wavelengths from said multi-mode propagation portion via such positions on an output end face as to cause separation of the powers of the light of n types of different wavelengths and to maximize an extinction ratio indicating the size of the power of light of a desired wavelength with respect to the power of light of a wavelength to be cut off.

45. An optical device for adjusting wavelength-multiplexed light of n types of wavelengths, where n is a natural integer, said optical device comprising:

a demultiplexing section for separating the light of n types of wavelengths;

a multiplexing section for combining the light of n types of wavelengths; and n adjusting sections for adjusting light of the n types of wavelengths separated by said demultiplexing section and inputting the light of the n types of wavelengths to said multiplexing section, wherein said demultiplexing section includes a demultiplexer multi-mode propagation portion allowing multi-mode propagation of the light of n types of wavelengths, and separating powers of the light of n types of wavelengths by causing internal mode interference, wherein said multiplexing section includes a multiplexer multi-mode propagation portion allowing multi-mode propagation of the light of n types of wavelengths, and combining powers of light of the n types of wavelengths by causing internal mode interference, and wherein in a case where i=0, 1, ..., n and k=1, 2, ..., n−1, when a phase difference between i'th- and i+1'th-order modes of a k'th wavelength $\lambda_k$ is $\theta_k$ and a phase difference between i'th- and i+1'th-order modes of a k+1'th wavelength $\lambda_{k+1}$ is $\theta_{k+1}$, each of said demultiplexer and multiplexer multi-mode propagation portions has such an optical path length in a propagation direction as to cause a difference between $\theta_k$ and $\theta_{k+1}$ to be in the range of $m\pi\pm\pi/2$, where m is a natural integer.

46. The optical device according to claim 45, wherein each of said n adjusting sections adjusts at least one of a gain, a phase, and a polarized status for each wavelength.

47. The optical device according to claim 45, further comprising an external control section, wherein said external control section is able to communicate with each of said n adjusting sections so as to dynamically adjust at least one of a gain, a phase, and a polarized status for each wavelength.

48. The optical device according to claim 45, further comprising:
   an external control section; and
   a monitor section for monitoring the output of said multiplexer multi-mode propagation portion,
   wherein said external control section is able to communicate with each of said n adjusting sections and said monitor section and to feed back an output status of said multiplexer multi-mode propagation portion so as to dynamically adjust at least one of a gain, a phase, and a polarized status for each wavelength.

49. An optical device having an add/drop function of extracting one of two wavelengths multiplexed in light and recombining the two wavelengths, said optical device comprising:
   a demultiplexer for separating light of the two wavelengths;
   a multiplexer for combining light of the two wavelengths;
   a relay waveguide for relaying light of a first wavelength in wavelength-multiplexed light to said multiplexer, said relay waveguide being connected to the output side of said demultiplexer;
   a drop waveguide for guiding light of a second waveguide in the wavelength-multiplexed light to the outside of said demultiplexer, said drop waveguide being connected to the output side of said demultiplexer; and
   an add waveguide for guiding the light of the second wavelength back into said demultiplexer and relaying the light to said multiplexer,
   wherein said demultiplexer includes a demultiplexer multi-mode propagation portion allowing multi-mode propagation of light of the first and second wavelengths, and separating powers of the light of the first and second wavelengths by causing internal mode interference,
   wherein said multiplexer includes a multiplexer multi-mode propagation portion allowing multi-mode propagation of the light of the first and second wavelengths, and combining the powers of the light of the first and second wavelengths by causing internal mode interference, and
   wherein in a case where a phase difference between zero- and first-order modes of the first wavelength is $\theta_1$ and a phase difference between zero- and first-order modes of the second wavelength is $\theta_2$, each of said demultiplexer and multiplexer multi-mode propagation portions has such an optical path length in a propagation direction as to cause a difference between $\theta_1$ and $\theta_2$ to be in the range of $m\pi\pm\pi/2$, where m is a natural integer.

50. An optical demultiplexer for separating, into two groups of wavelengths, input wavelength-multiplexed light of 2n types of different wavelengths $\lambda_1, \ldots, \lambda_{2n}$, where n is a natural integer, said optical demultiplexer comprising:
   a multi-mode propagation portion having a characteristic of allowing multi-mode propagation of light of the 2n types of different wavelengths in the input wavelength-multiplexed light, and separating powers of light of the two groups of wavelengths by causing internal mode interference;
   an input portion for inputting light to said multi-mode propagation portion from such an input position as to cause separation of powers of light in said multi-mode propagation portion; and
   two output portions for outputting the light of the two groups of wavelengths from such positions as to cause separation of the powers of the light of the two groups of wavelengths,
   wherein the two groups of wavelengths consist of the group of odd-numbered multiplexed wavelengths and the group of even-numbered multiplexed wavelengths.

51. The optical demultiplexer according to claim 50, wherein in a case where k=1, 2, . . . , n−1, when a phase difference between zero- and first-order modes of a 2k−1'th wavelength $\lambda_{2k-1}$ is $\theta_{2k-1}$ and a phase difference between zero- and first-order modes of a 2k'th wavelength $\lambda_{2k}$ is $\theta_{2k}$, said multi-mode propagation portion has such an optical path length in a propagation direction as to cause a difference between $\theta_{2k-1}$ and $\theta_{2k}$ to be in the range of $m\pi\pm\pi/2$, where m is a natural integer.

52. The optical demultiplexer according to claim 51, wherein said multi-mode propagation portion is formed by one multi-mode waveguide,
   wherein a center line of said multi-mode waveguide corresponds to an optical axis of said multi-mode propagation portion, and
   wherein the input position is offset from the optical axis.

53. The optical demultiplexer according to claim 51, wherein said multi-mode propagation portion is formed by two single-mode waveguides having different lengths, and
   wherein an axis of symmetry between said two single-mode waveguides corresponds to an optical axis of said multi-mode propagation portion.

54. The optical demultiplexer according to claim 50, wherein in a case where k=1, 2, . . . , n−1, when a phase difference between zero- and first-order modes of a 2k−1'th wavelength $\lambda_{2k-1}$ is $\theta_{2k-1}$ and a phase difference between zero- and first-order modes of a 2k'th wavelength $\lambda_{2k}$ is $\theta_{2k}$ said multi-mode propagation portion includes:
   a first optical path length portion having such an optical path length in a propagation direction as to cause a difference between $\theta_{2k-1}$ and $\theta_{2k}$ to be in the range of $m\pi\pm\pi/2$, where m is a natural integer; and
   a second optical path length portion having such an optical path length in the propagation direction as to cause a difference between $\theta_{2k-1}$ and $\theta_{2k}$ to be in the range of $m\pi\pm\pi/2$,
   wherein the group of the odd-numbered multiplexed wavelengths is outputted from said first optical path length portion,
   wherein the group of the even-numbered multiplexed wavelengths is outputted from said second optical path length portion, and
   wherein said first and second optical path length portions have different optical path lengths.

55. The optical demultiplexer according to claim 54, wherein said multi-mode propagation portion is formed by one multi-mode waveguide, wherein a center line of said multi-mode waveguide corresponds to an optical axis of said multi-mode propagation portion, and wherein the input position is offset from the optical axis.

56. The optical demultiplexer according to claim 54, wherein said multi-mode propagation portion is formed by two single-mode waveguides having different lengths, and wherein an axis of symmetry between said two single-mode waveguides corresponds to an optical axis of said multi-mode propagation portion.

57. The optical demultiplexer according to claim 50, wherein the 2n types of wavelengths are equally spaced.

58. The optical demultiplexer according to claim 50, wherein a refractive index of said multi-mode propagation portion is in linear relationship with a wavelength in at least n types of wavelength ranges.

59. The optical demultiplexer according to claim 50, wherein n is a number which satisfies n=4k, where k is a natural integer, and wherein said optical demultiplexer further comprises:
  a first latter-stage multi-mode propagation portion optically connected to an output end of one of said output portions for guiding the group of odd-numbered multiplexed wavelengths and having the same characteristic as that of said multi-mode propagation portion;
  a second latter-stage multi-mode propagation portion optically connected to an output end of the other one of said output portions for guiding the group of even-numbered multiplexed wavelengths and having the same characteristic as that of said multi-mode propagation portion;
  a first latter-stage output portion for outputting the group of 4k–3'th wavelengths separated by said first latter-stage multi-mode propagation portion;
  a second latter-stage output portion for outputting the group of 4k–1'th wavelengths separated by said first latter-stage multi-mode propagation portion;
  a third latter-stage output portion for outputting the group of 4k–2'th wavelengths separated by said second latter-stage multi-mode propagation portion; and
  a fourth latter-stage output portion for outputting the group of 4k'th wavelengths separated by said second latter-stage multi-mode propagation portion.

60. An optical demultiplexer for separating input wavelength-multiplexed light of first and second wavelengths, said optical demultiplexer comprising:
  a first multi-mode propagation portion for separating powers of light of third and fourth wavelengths by causing internal mode interference, the third wavelength being offset from the first wavelength by a prescribed wavelength, the fourth wavelength being offset from the second wavelength by a prescribed wavelength,
  an input portion for inputting light to said first multi-mode propagation portion from such an input position as to cause separation of powers of light in said first multi-mode propagation portion;
  a first output portion provided to an output end face of said first multi-mode propagation portion in such a position as to cause separation of the powers of light of the third and fourth wavelengths and to maximize an extinction ratio indicating the size of the power of light of the fourth wavelength with respect to the power of light of the third wavelength;
  a second output portion provided to the output end face of said first multi-mode propagation portion in such a position as to cause separation of the powers of light of the third and fourth wavelengths and to maximize the extinction ratio indicating the size of the power of light of the fourth wavelength with respect to the power of light of the third wavelength;
  second and third multi-mode propagation portions each separating powers of light of fifth and sixth wavelengths by causing internal mode interference, the fifth wavelength being offset from the first wavelength by a prescribed wavelength in a direction opposite to a direction of the offset of the third wavelength, the sixth wavelength being offset from the second wavelength by a prescribed wavelength in a direction opposite to a direction of the offset of the fourth wavelength;
  a third output portion provided to an output end face of said second multi-mode propagation portion in such a position as to cause separation of powers of light of the fifth and sixth wavelengths and to maximize the extinction ratio indicating the size of the power of light of the sixth wavelength with respect to the power of light of the fifth wavelength; and
  a fourth output portion provided to an output end face of said third multi-mode propagation portion in such a position as to cause separation of the powers of light of the fifth and sixth wavelengths and to maximize the extinction ratio indicating the size of the power of light of the sixth wavelength with respect to the power of light of the fifth wavelength.

61. The optical demultiplexer according to claim 60, wherein the third and fifth wavelengths are symmetric with respect to the first wavelength, and wherein the forth and sixth wavelengths are symmetric with respect to the second wavelength.

* * * * *